US011981077B2

(12) United States Patent
Gifford et al.

(10) Patent No.: US 11,981,077 B2
(45) Date of Patent: *May 14, 2024

(54) SYSTEMS AND METHODS FOR 3D PRINTING WITH MULTIPLE EXCHANGEABLE PRINTHEADS

(71) Applicants: Karl Joseph Gifford, Norcross, GA (US); Tai Dung Nguyen, Fremont, CA (US); Tue Nguyen, Fremont, CA (US)

(72) Inventors: Karl Joseph Gifford, Norcross, GA (US); Tai Dung Nguyen, Fremont, CA (US); Tue Nguyen, Fremont, CA (US)

(*) Notice: Subject to any disclaimer, the term of this patent is extended or adjusted under 35 U.S.C. 154(b) by 200 days.

This patent is subject to a terminal disclaimer.

(21) Appl. No.: 17/515,701

(22) Filed: Nov. 1, 2021

(65) Prior Publication Data
US 2022/0055300 A1    Feb. 24, 2022

Related U.S. Application Data

(63) Continuation of application No. 15/810,014, filed on Nov. 11, 2017, now Pat. No. 11,161,298, which is a continuation-in-part of application No. 14/578,309, filed on Dec. 19, 2014, now abandoned.

(60) Provisional application No. 61/972,613, filed on Mar. 31, 2014, provisional application No. 61/929,136, filed on Jan. 20, 2014, provisional application No. 61/929,114, filed on Jan. 19, 2014, provisional application No. 61/918,650, filed on Dec. 19, 2013.

(51) Int. Cl.
*B29C 64/209*    (2017.01)
*B29C 64/112*    (2017.01)
*B29C 64/118*    (2017.01)
*B29C 64/241*    (2017.01)
*B29C 64/245*    (2017.01)
*B29C 64/336*    (2017.01)
*B33Y 40/00*    (2020.01)
*B33Y 10/00*    (2015.01)
*B33Y 30/00*    (2015.01)

(52) U.S. Cl.
CPC .......... *B29C 64/209* (2017.08); *B29C 64/112* (2017.08); *B29C 64/118* (2017.08); *B29C 64/241* (2017.08); *B29C 64/245* (2017.08); *B29C 64/336* (2017.08); *B33Y 40/00* (2014.12); *B33Y 10/00* (2014.12); *B33Y 30/00* (2014.12)

(58) Field of Classification Search
CPC ... B29C 64/109; B29C 64/112; B29C 64/118; B29C 64/245; B33Y 10/00; B33Y 30/00; B33Y 40/00; B33Y 50/00; B33Y 50/02
See application file for complete search history.

(56) References Cited

U.S. PATENT DOCUMENTS 11,161,298 B2 * 11/2021 Gifford ................. B29C 64/209

* cited by examiner

*Primary Examiner* — Ryan M Ochylski

(57) ABSTRACT

A modular 3D printer system can include a base subsystem and multiple exchangeable components. The base subsystem can have a 3D motion module, a printhead module and a platform module. The multiple exchangeable components can include printheads having different configurations and functionalities, which can be exchangeably installed in the printhead module. The multiple exchangeable components can include platform supports having different configurations and functionalities, which can be exchangeably installed in the platform module.

20 Claims, 47 Drawing Sheets

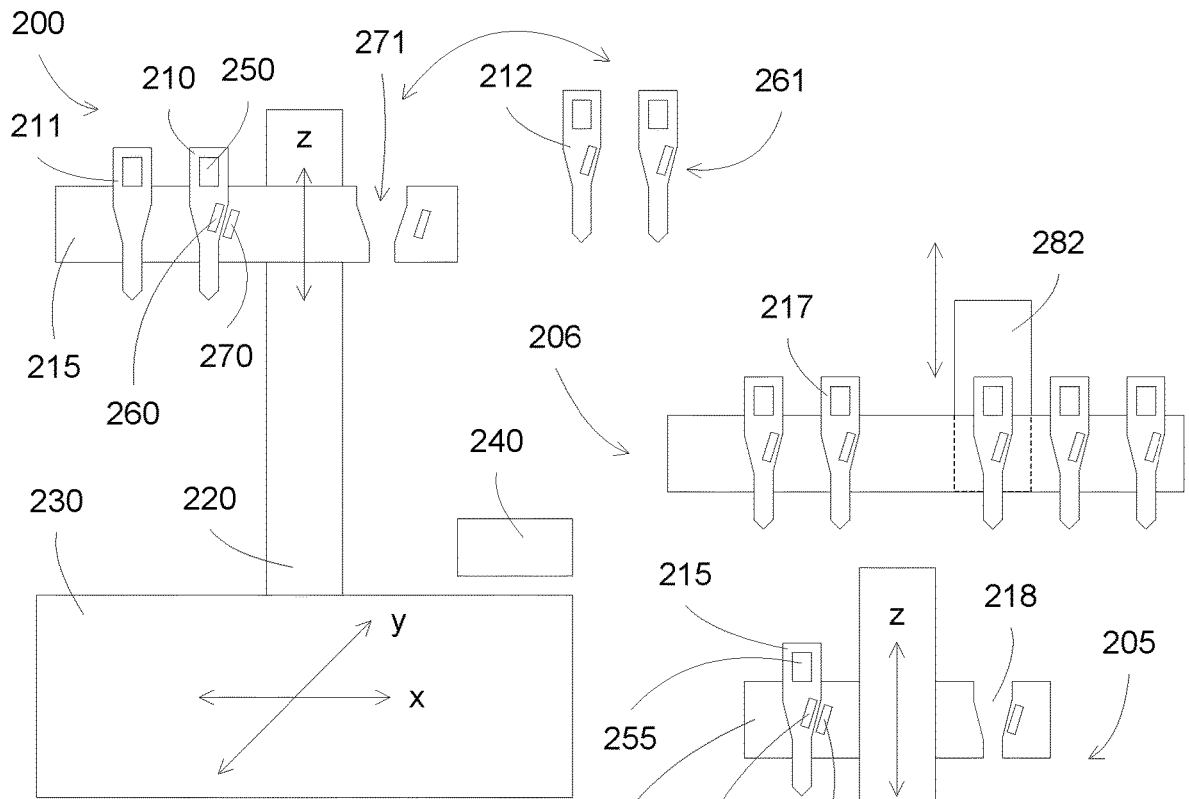
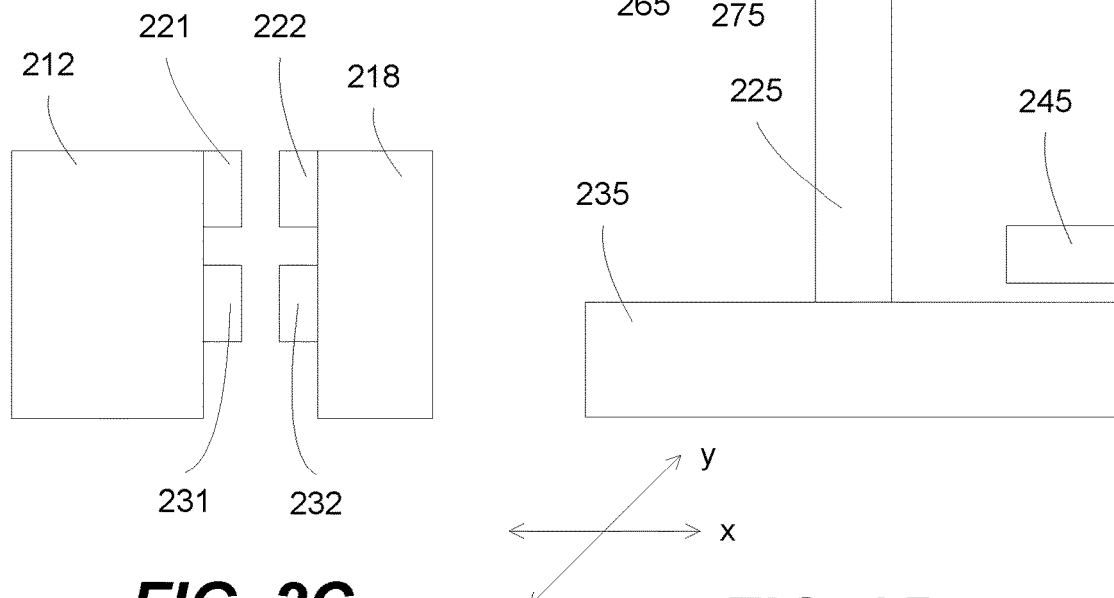
FIG. 2A
FIG. 2C
FIG. 2B

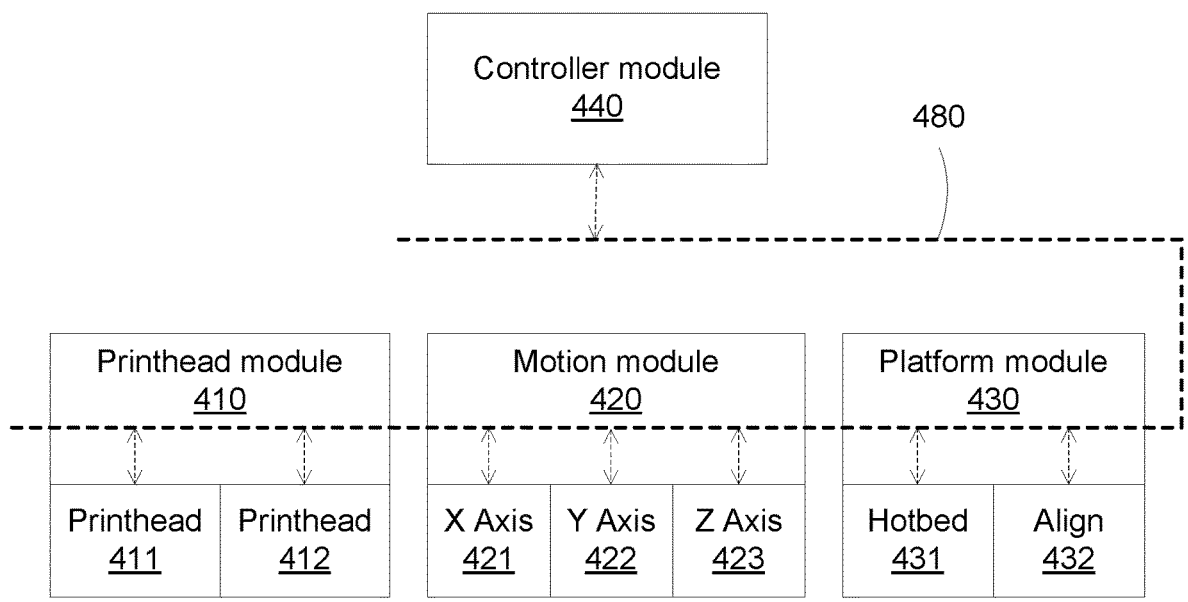
FIG. 4A
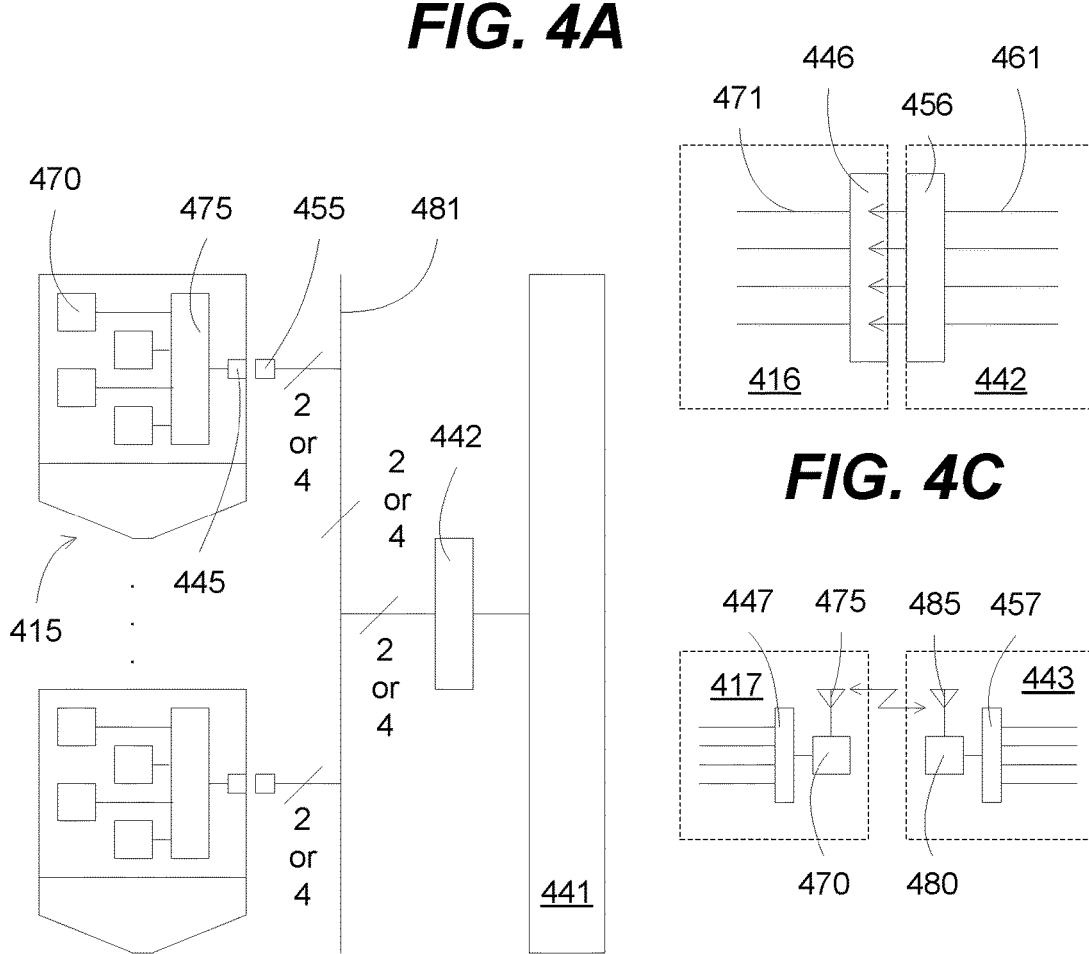
FIG. 4B     FIG. 4C     FIG. 4D

Providing a system for forming a workpiece, wherein the system comprises a platform module for supporting the workpiece, a head module configured to support one or more heads for processing the workpiece, and a 3D motion module for moving the head module with respect to the platform module
600

Installing or exchanging a first head to the head module
610

Electrically configuring the first head to be recognized by the system
620

Aligning the first head to be recognized by the system
630

FIG. 6A

Providing a system for forming a workpiece, wherein the system comprises a platform module for supporting the workpiece, a head module configured to support one or more heads for processing the workpiece, and a 3D motion module for moving the head module with respect to the platform module
650

Determining one or more heads to meet a requirement of processing the workpiece
660

Installing or exchanging heads to the head module
670

FIG. 6B

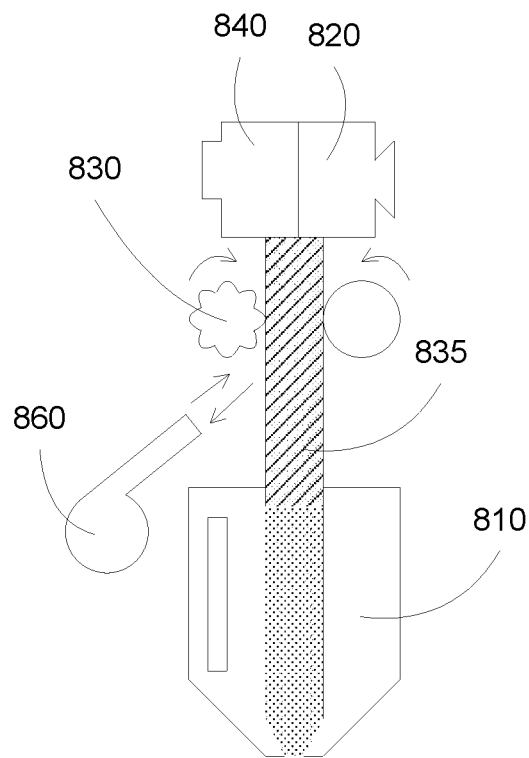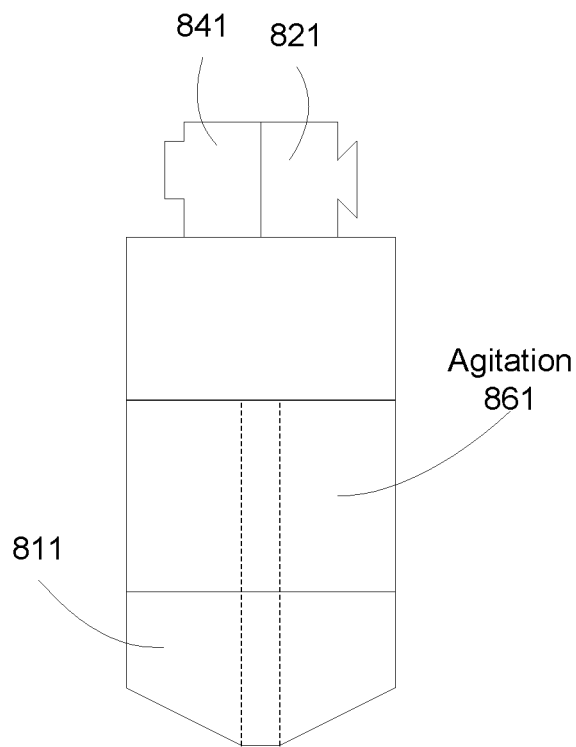
FIG. 8A
FIG. 8B
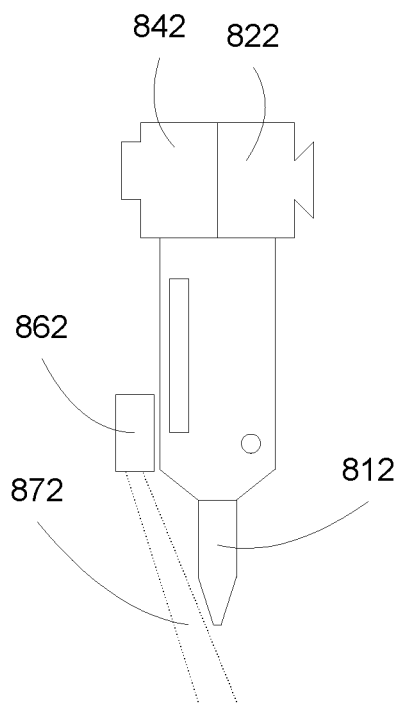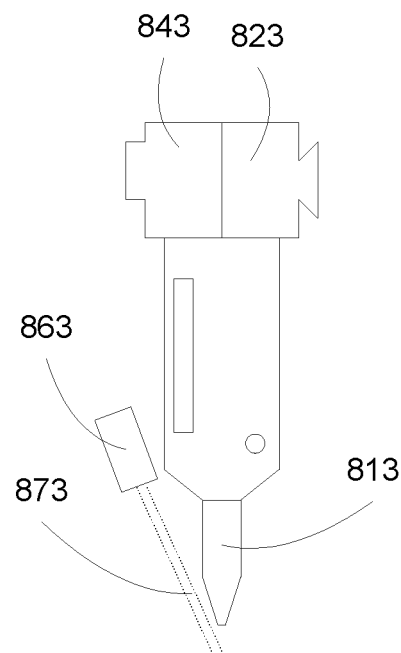
FIG. 8C
FIG. 8D

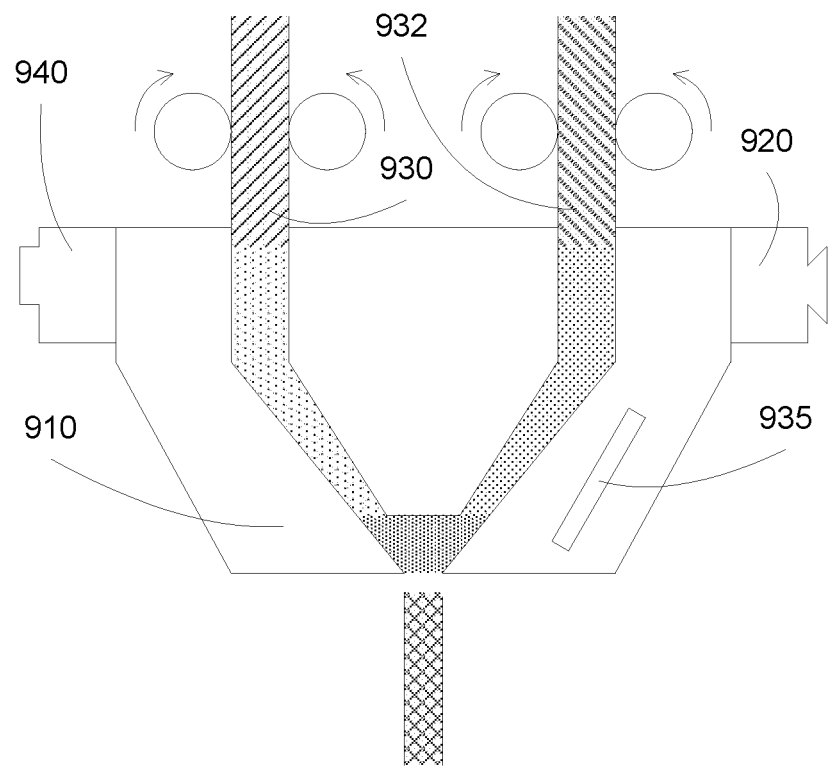
FIG. 9A
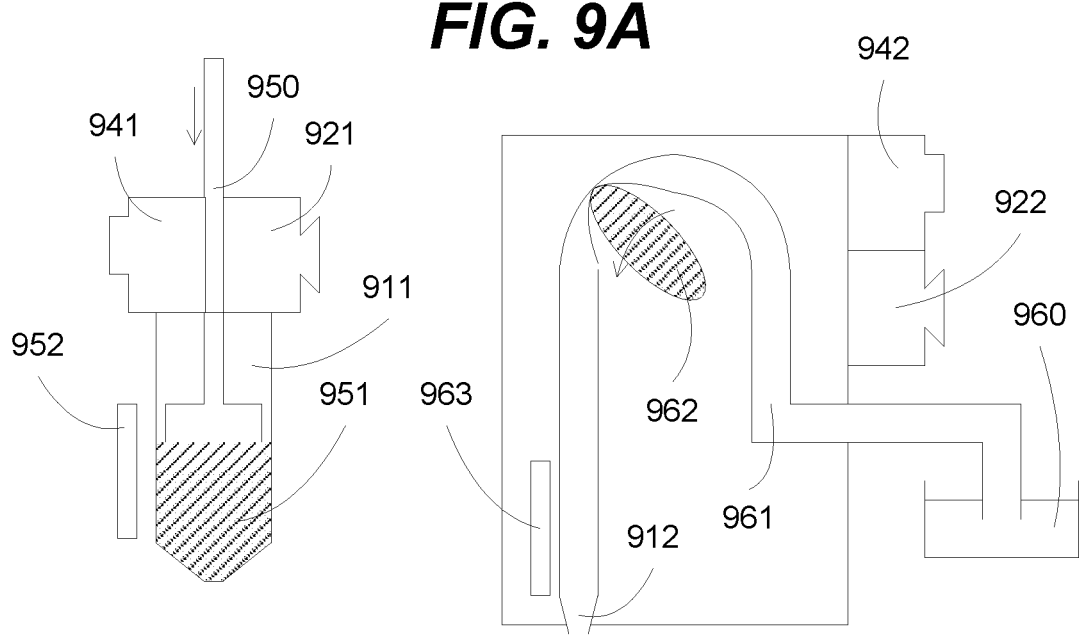
FIG. 9B  FIG. 9C

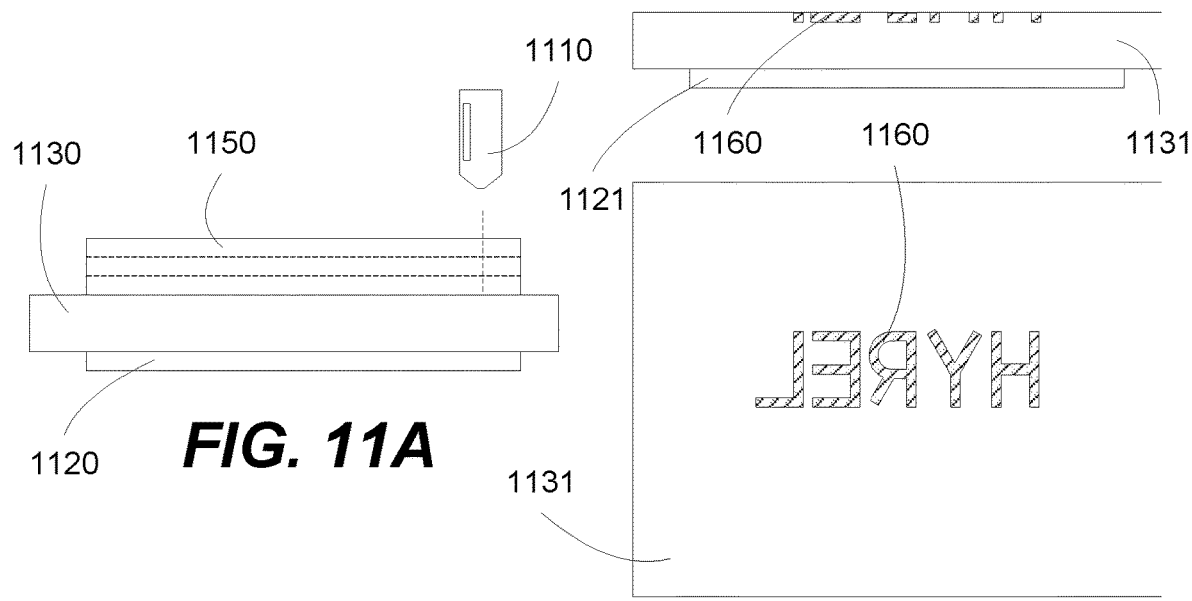
FIG. 11A
FIG. 11B
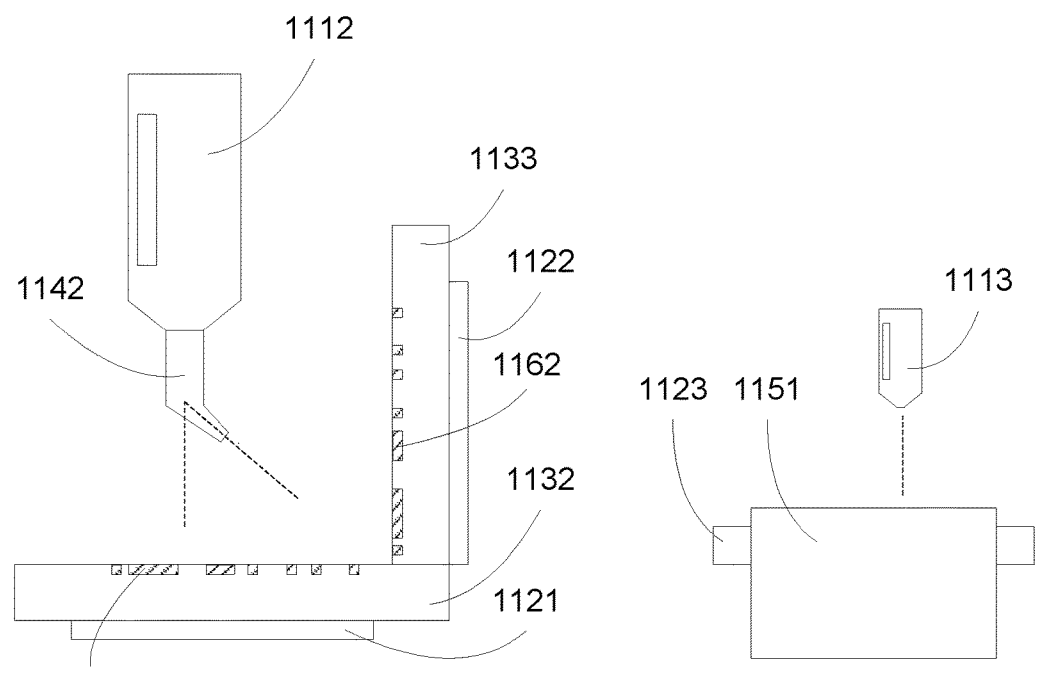
FIG. 11C
FIG. 11D

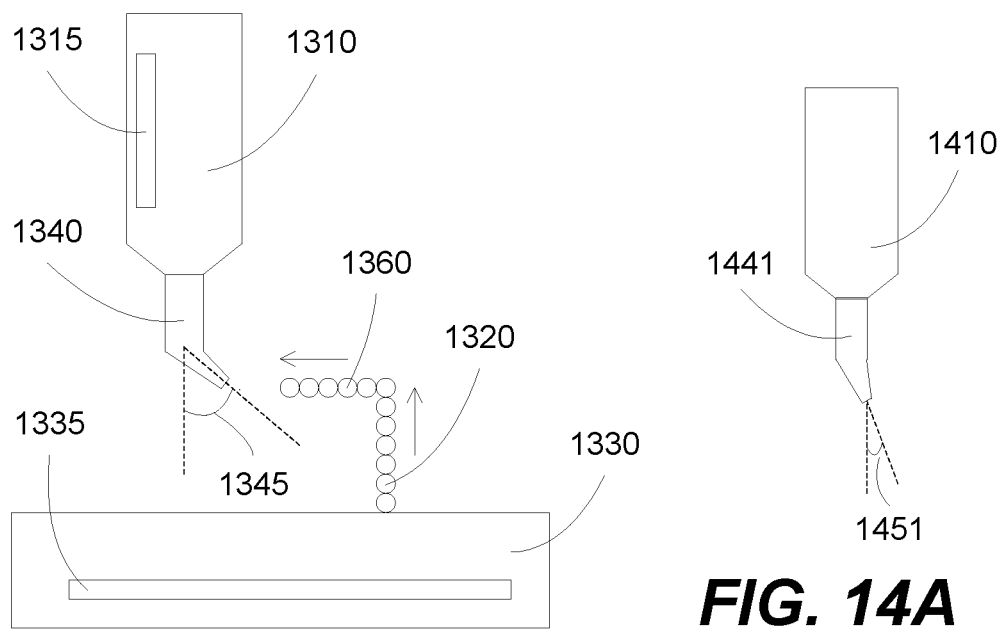
FIG. 13
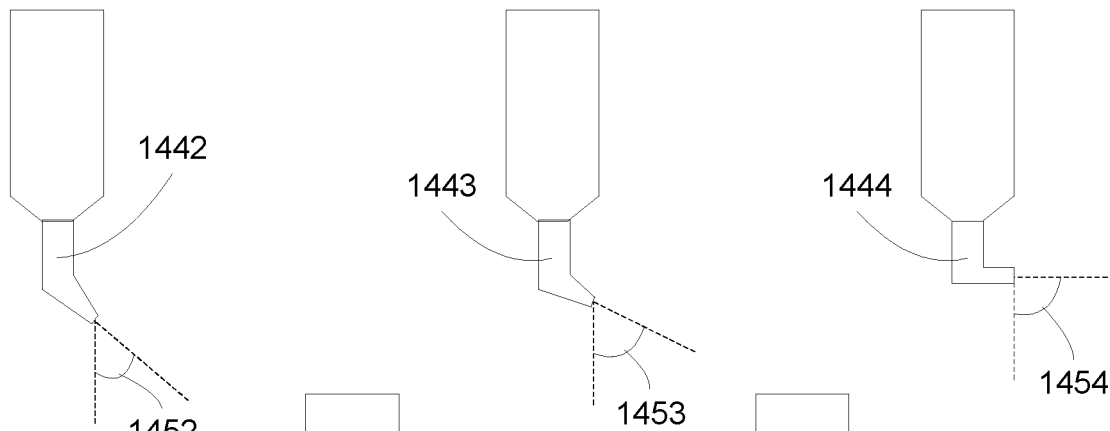
FIG. 14A
FIG. 14B
FIG. 14C
FIG. 14D
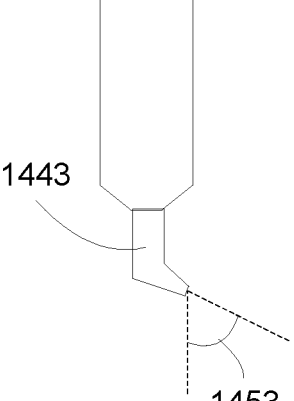
FIG. 14E
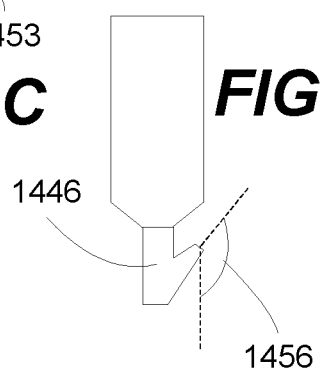
FIG. 14F

FIG. 21A

Providing a nozzle coupled to a 3D print head, wherein the nozzle forms an angle with the print head
2100

↓

3D printing a material on a surface, wherein the nozzle forms an offset angle with the surface
2110

FIG. 21B

Rotating a nozzle coupled to a 3D print head, wherein the nozzle is rotated to form an angle with the print head
2130

↓

3D printing a material on a surface, wherein the nozzle forms an offset angle with the surface
2140

FIG. 22A

Providing a nozzle coupled to a 3D print head, wherein the nozzle forms an angle with the print head
2200

↓

3D printing a material on a surface, wherein the nozzle is faced a same direction,
wherein the nozzle is kept at a constant height,
or
wherein the nozzle is moved in a vertical direction
2210

FIG. 22B

Providing a nozzle coupled to a 3D print head, wherein the nozzle forms an angle with the print head, wherein the nozzle is faced a direction
2230

↓

Varying the direction while 3D printing a material on a surface, wherein the nozzle is kept at a constant height,
or
wherein the nozzle is moved in a vertical direction
2240

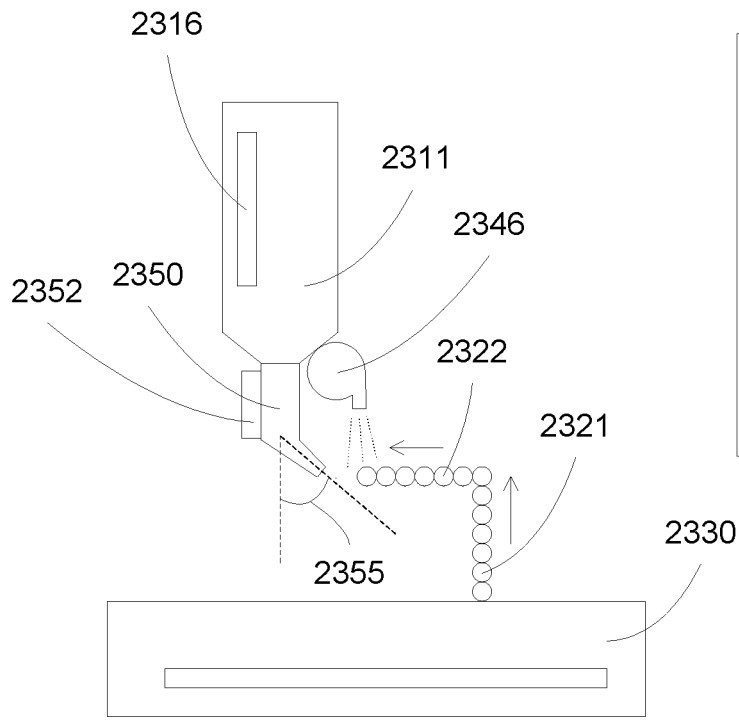

FIG. 23

FIG. 24A Coupling an air source to a 3D printer head, wherein the air source is configured to cool printed materials with minimum effect on the 3D printer head 2400

FIG. 24B Printing, by a 3D printer head, a material on a substrate 2420 → Cooling the printed material without cooling the 3D printer head 2430

FIG. 24C Printing, by a 3D printer head having a tilted nozzle, a material on a substrate, wherein the material forms an angle with the substrate 2450 → Cooling the printed material to secure the printed material to the substrate 2460

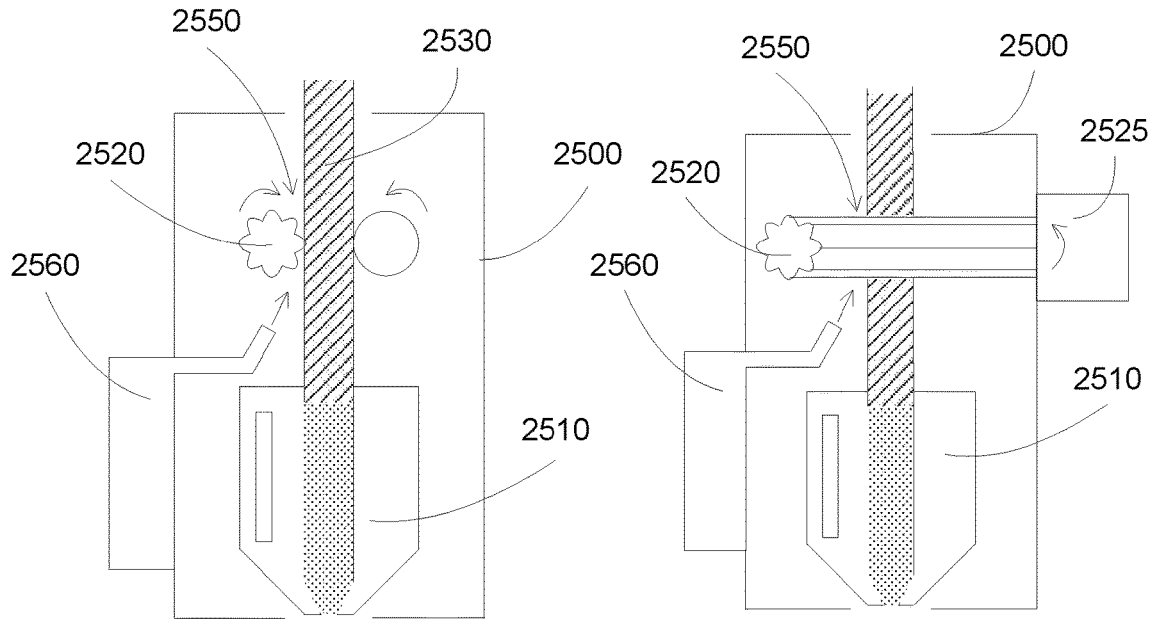
FIG. 25A  FIG. 25B
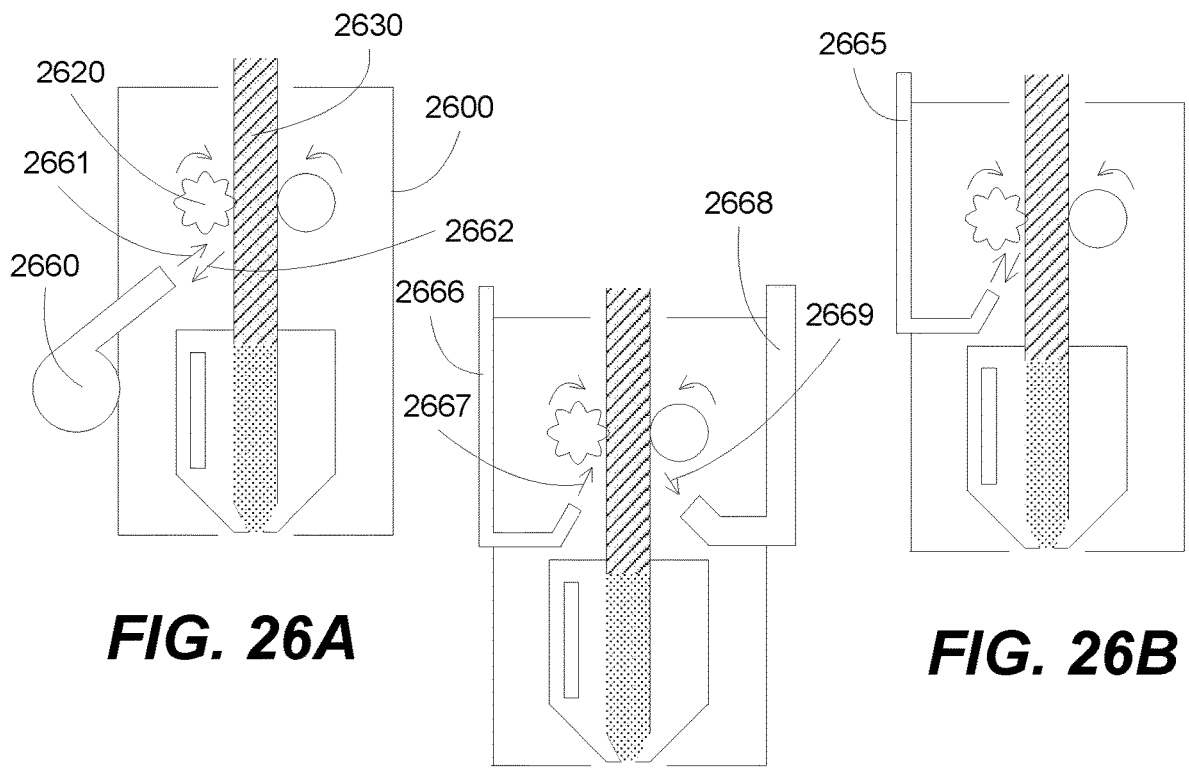
FIG. 26A  FIG. 26B
FIG. 26C

FIG. 29A
- Assembling a filament moving mechanism in a 3D printer head
  2900
- Forming a gas flow or a vacuum suction at an interface portion of the filament moving mechanism with a filament
  2910

FIG. 29B
- Assembling a filament moving mechanism in a 3D printer head
  2930
- Exposing an interface portion of the filament moving mechanism with a filament
  2940

FIG. 30A
- Providing a 3D printer system having a filament moving mechanism
  3000
- Cleaning the filament moving mechanism during or after printing
  3010

FIG. 30B
- Providing a 3D printer head having a filament moving mechanism
  3050
- Manually cleaning the filament moving mechanism to remove debris at the filament moving mechanism during or after printing
  3060

FIG. 31A
- Providing a 3D printer system having a filament moving mechanism
  3100
- Continuously, intermittently, or periodically supplying a gas flow or a vacuum suction to an interface portion of the filament moving mechanism with a filament
  3110
- Printing, by the 3D printer system, a material on a platform
  3120

FIG. 31B
- Providing a 3D printer head having a filament moving mechanism
  3150
- Printing, by the 3D printer head, a material on a platform
  3160
- Moving the 3D printer head to a station for supplying a gas flow or a vacuum suction to an interface portion of the filament moving mechanism with a filament
  3170

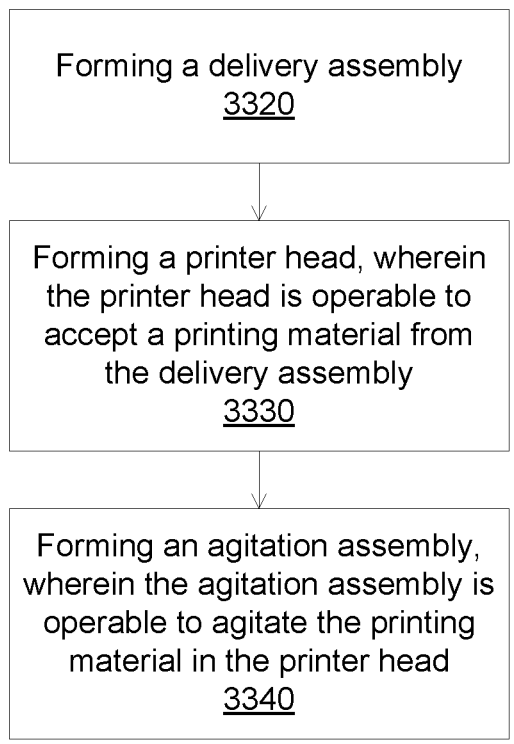
FIG. 33A
FIG. 33B
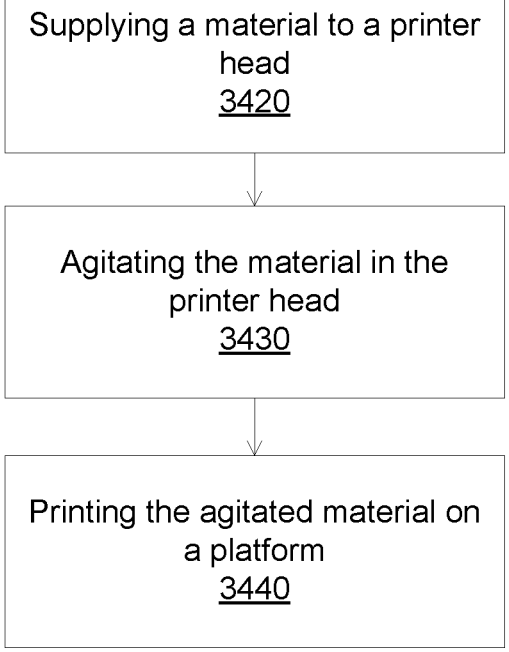
FIG. 34A
FIG. 34B

Coupling a radiation source to a 3D printer head, wherein the radiation source is configured to supply radiation to a local area on a substrate
3800

FIG. 38A

Coupling a radiation source to a 3D printer head, wherein the radiation source comprises an IR light or a laser, wherein the radiation source is configured to heat a substrate locally and on the surface
3820

FIG. 38B

Coupling a radiation source to a 3D printer head, wherein the radiation source comprises an UV light, wherein the radiation source is configured to vary a structure of a material which leaves the 3D printer head to be disposed on a substrate surface
3840

FIG. 38C

Coupling a radiation source to a 3D printer head;
wherein the radiation source is configured to supply radiation to a surface of the substrate;
wherein the radiation source surrounds a nozzle of the 3D printer head;
wherein the radiation is operable to heat a local area of the substrate;
wherein the radiation is operable to heat a top surface portion of the substrate;
wherein the radiation is configured to provide a focused, diffused or parallel beam to a surface area of the substrate where the 3D printer head supplies a printing material, or wherein the radiation source comprises a laser, or wherein the radiation source comprises an IR lamp,
3900

FIG. 39A

Coupling a radiation source to a 3D printer head;
wherein the radiation source is configured to supply radiation to a surface of the substrate or to a material leaving a nozzle of the 3D printer head or to a material deposited on the substrate from the 3D printer head;
wherein the radiation source surrounds a nozzle of the 3D printer head;
wherein the radiation is operable to heat a local area of the substrate;
wherein the radiation is operable to cross link the material leaving or deposited on the substrate from the nozzle of the 3D printer head;
wherein the radiation source comprises a UV lamp
3930

FIG. 39B

```
┌─────────────────────────────────┐
│ Irradiating a surface of a      │
│ substrate, wherein the          │
│ radiation is configured to be   │
│ confined to a local area,       │
│ wherein the radiation is        │
│ configured to heat a top        │
│ portion of the surface          │
│ 4000                            │
└─────────────────────────────────┘
                │
                ▼
┌─────────────────────────────────┐
│ 3D printing a material on the   │
│ irradiated surface, wherein the │
│ irradiated surface is           │
│ configured to enhance an        │
│ adhesion of the material        │
│ 4010                            │
└─────────────────────────────────┘
```

FIG. 40A

```
┌─────────────────────────────────┐
│ Printing a first layer of a     │
│ first material on a substrate   │
│ 4040                            │
└─────────────────────────────────┘
                │
                ▼
┌─────────────────────────────────┐
│ Locally and surfacely           │
│ irradiating the first layer     │
│ while or before or after 3D     │
│ printing a second material on   │
│ the first layer, wherein the    │
│ first and second materials      │
│ have different melting          │
│ temperature                     │
│ 4050                            │
└─────────────────────────────────┘
```

FIG. 40B

```
┌─────────────────────────────────┐
│ Providing an object on a        │
│ substrate                       │
│ 4070                            │
└─────────────────────────────────┘
                │
                ▼
┌─────────────────────────────────┐
│ Locally and surfacely           │
│ irradiating a surface of the    │
│ object while or before or after │
│ 3D printing a material on the   │
│ object, wherein the material is │
│ adhered to the heated surface   │
│ of the object                   │
│ 4080                            │
└─────────────────────────────────┘
```

FIG. 40C

```
┌─────────────────────────────────┐
│ Irradiating a printed material  │
│ with a UV light, wherein the    │
│ radiation is configured to      │
│ solidify or cross link the      │
│ printed material                │
│ 4100                            │
└─────────────────────────────────┘
```

FIG. 41A

```
┌─────────────────────────────────┐
│ 3D printing a material on       │
│ substrate                       │
│ 4120                            │
└─────────────────────────────────┘
                │
                ▼
┌─────────────────────────────────┐
│ Irradiating the material with a │
│ UV light, wherein the radiation │
│ is configured to solidify or    │
│ cross link the printed          │
│ material, wherein the radiation │
│ is provided to the material     │
│ after being disposed on the     │
│ substrate or to the material at │
│ the nozzle output               │
│ 4130                            │
└─────────────────────────────────┘
```

FIG. 41B

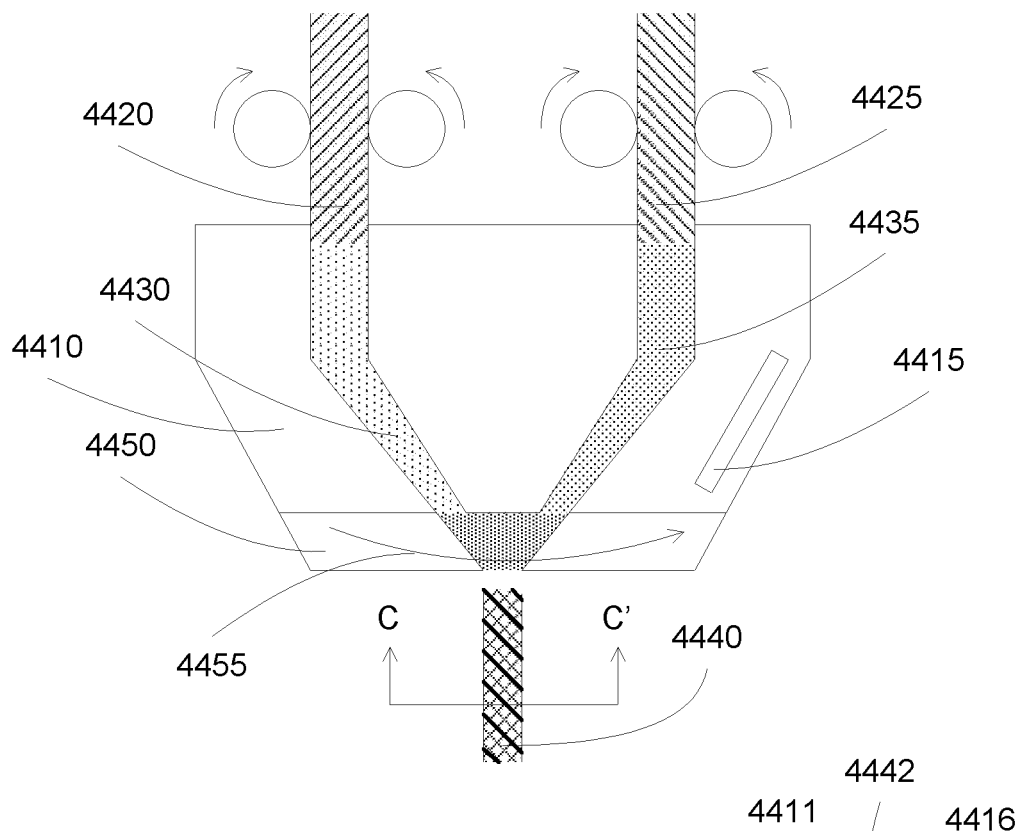
FIG. 44A
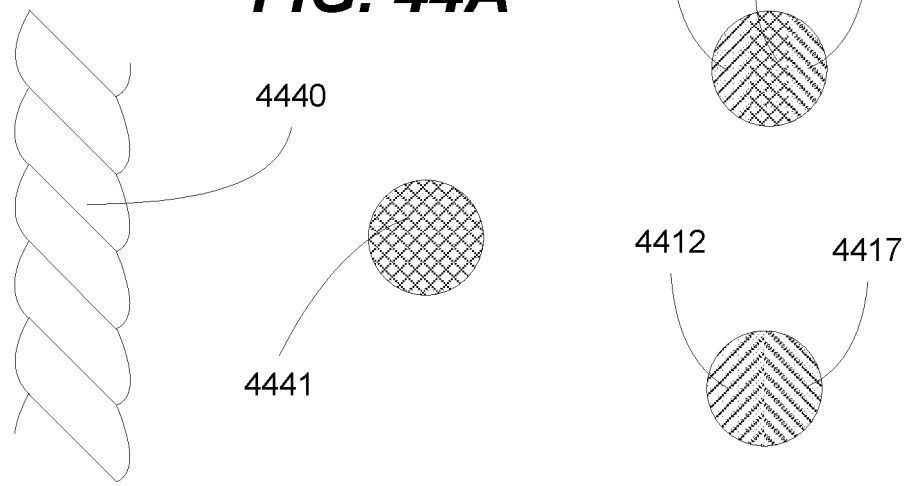
FIG. 44B      FIG. 44C

```
┌─────────────────────────────────────────────┐
│ Supplying multiple materials to a rotatable │
│            portion of a 3D printer head     │
│                    4500                     │
└─────────────────────────────────────────────┘
                      │
                      ▼
┌─────────────────────────────────────────────┐
│ Rotating the rotatable portion, wherein the │
│   multiple materials are mixed or twisted   │
│                  together                   │
│                    4510                     │
└─────────────────────────────────────────────┘
                      │
                      ▼
┌─────────────────────────────────────────────┐
│ Printing, by the 3D printer head, the mixed │
│      or twisted materials on a platform     │
│                    4520                     │
└─────────────────────────────────────────────┘
```

FIG. 45A

```
┌─────────────────────────────────────────────┐
│ Mixing or twisting multiple materials,      │
│ wherein at least two materials of the       │
│ multiple materials have a different         │
│ property,                                   │
│ wherein the different property comprises at │
│ least one of color, strength, hardness, or  │
│ melting temperature                         │
│                    4540                     │
└─────────────────────────────────────────────┘
                      │
                      ▼
┌─────────────────────────────────────────────┐
│ Printing, by the 3D printer head, the mixed │
│      or twisted materials on a platform     │
│                    4550                     │
└─────────────────────────────────────────────┘
```

FIG. 45B

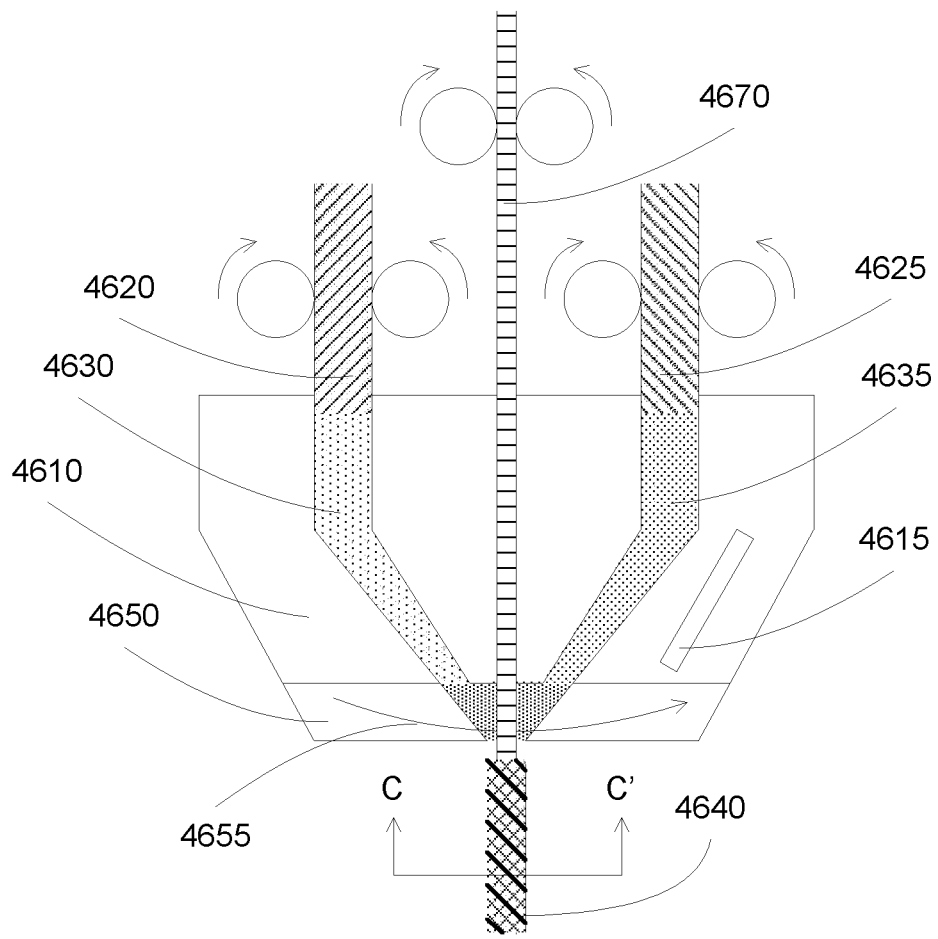
FIG. 46A
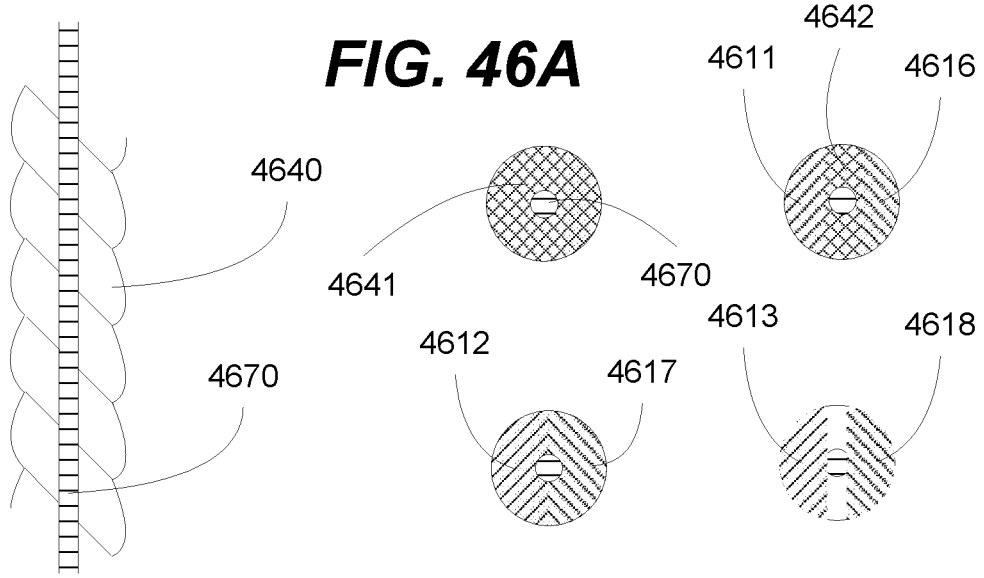
FIG. 46B  FIG. 46C

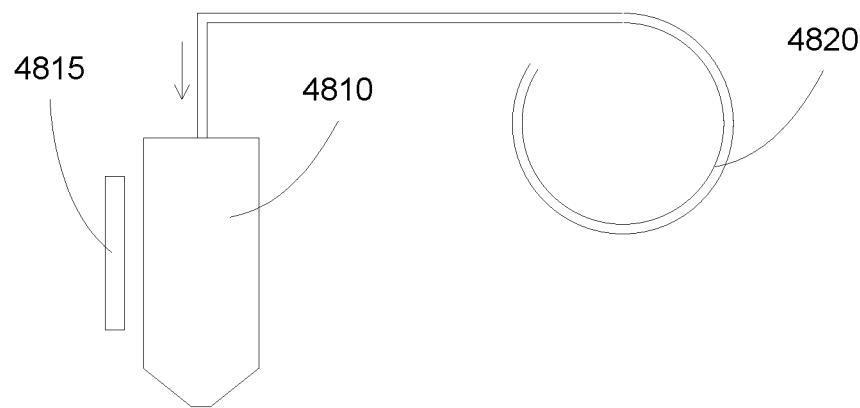
FIG. 48A
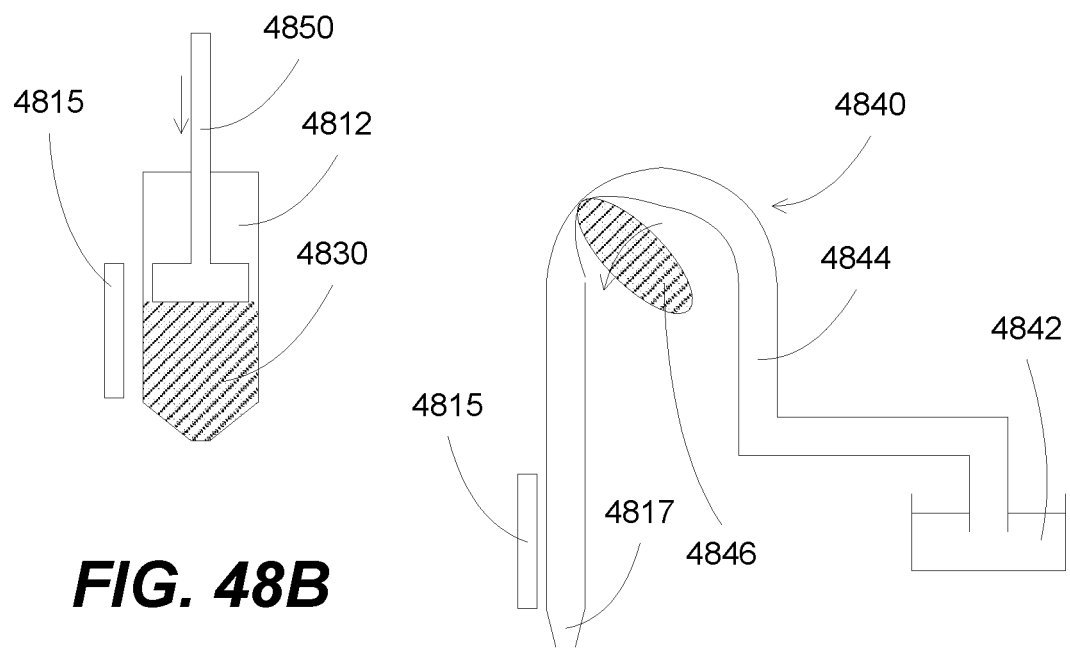
FIG. 48B
FIG. 48C

```
┌─────────────────────────────────────────┐
│ Prividing a 3D printer having a liquid  │
│        nozzle and a non-liquid nozzle   │
│                  5400                   │
└─────────────────────────────────────────┘
                    │
                    ▼
┌─────────────────────────────────────────┐
│  3D printing a first layer of non-liquid on a surface │
│                  5410                   │
└─────────────────────────────────────────┘
                    │
                    ▼
┌─────────────────────────────────────────┐
│  3D printing a second layer of liquid over the first layer │
│                  5420                   │
└─────────────────────────────────────────┘
                    │
                    ▼
┌─────────────────────────────────────────┐
│ 3D printing a third layer of non-liquid over the second layer │
│                  5430                   │
└─────────────────────────────────────────┘
```

*FIG. 54*

Patterning a platform to achieve a negative image
6000

Assembling the platform in a 3D printer system, wherein the platform is operable to generate the image on a printed object
6010

FIG. 60A

Coating a copper layer on a platform
6030

Patterning the copper layer to achieve a negative image
6040

Assembling the platform in a 3D printer system
6050

FIG. 60B

Providing a 3D printer having a patterned platform
6070

3D printing an object on the patterned platform, wherein the patterned platform is configured to imprint an image on the printed object
6080

FIG. 60C

Coupling a Peltier device to a 3D printer platform, wherein the Peltier device is configured to heat the platform during printing and to cool the platform when printing is completed
6200

FIG. 62A

Applying a voltage having a first polarity to a Peltier device to heat a platform
6220

Printing, by a 3D printer head, an object on the platform
6230

Switching polarity of the voltage to cool the platform, wherein the cooled platform is configured to reduce adhesion of the object with the platform
6240

FIG. 62B

SYSTEMS AND METHODS FOR 3D PRINTING WITH MULTIPLE EXCHANGEABLE PRINTHEADS

The present application is a continuation of application Ser. No. 15/810,014, filed on Nov. 11, 2017, entitled "Systems and methods for 3D printing with multiple exchangeable printheads" (HYREL001A), which is a continuation-in-part of application Ser. No. 14/578,309, filed on Dec. 19, 2014, entitled "Systems and methods for 3D printing with multiple exchangeable printheads" (HYREL001), which claims priority from U.S. Provisional Patent Application Ser. No. 61/929,114, filed on Jan. 19, 2014 entitled "3D printer systems and methods" (HYREL001-PRO), U.S. Provisional Patent Application Ser. No. 61/918,650, filed on Dec. 19, 2013, entitled "3D printer systems and methods" (HYREL002-PRO), U.S. Provisional Patent Application Ser. No. 61/929,136, filed on Jan. 20, 2014, entitled "3D printer systems and methods" (HYREL003-PRO) and U.S. Provisional Patent Application Ser. No. 61/972,613, filed on Mar. 31, 2014, entitled "3D printer systems and methods" (HYREL004-PRO), all of which are incorporated herein by reference in their entirety.

BACKGROUND OF THE INVENTION 3D printers can be used to build solid objects by printing layers by layers of building materials. The building materials can be in liquid or semi liquid form at the 3D printhead, for example, a solid material can be heated and then extruded from a 3D printer nozzle. The layers of building materials can be solidified on a substrate.

3D printer systems can use a fused filament fabrication (FFF) process (sometimes called fused deposition modeling (FDM) process) in which a filament is moved, e.g., by a filament moving mechanism, toward a heated zone. The filament can be melted, and extruded on a platform to form a 3D object. The melted filament can adhere to the walls of the heated printhead, resulting in deformed printed lines.

It would therefore be advantageous to have advanced 3D printing systems and methods that have improved printing mechanisms.

SUMMARY OF THE EMBODIMENTS

In some embodiments, the present invention discloses a modular system, including a base subsystem and multiple exchangeable components. The modular system can be a 3D printer system, having a base subsystem including a 3D (with 3 or more degrees of freedom) motion module, a printhead module and a platform module. The multiple exchangeable components can include printheads having different configurations and functionalities, which can be exchangeably installed in the printhead module. The multiple exchangeable components can include platform supports having different configurations and functionalities, which can be exchangeably installed in the platform module.

The printhead configurations and functionalities can include printheads having nozzles extruding materials with different cross sections, printheads having fan blowing to the extruded materials, printheads having tilted nozzles, printheads having in-situ or ex-situ debris cleaning mechanisms, printheads having agitation mechanisms, printheads having pre-heating mechanisms, printheads having radiation curing mechanisms, printheads having multiple filaments, printheads having mechanisms to extrude paste-like or liquid-like materials, printheads having mechanisms for writing, and printheads having mechanisms for cutting and milling.

The platform support configurations and functionalities can include horizontal platform supports, vertical platform supports, platforms having vertical and horizontal supports, platforms with watermarks, and clamp platforms.

BRIEF DESCRIPTION OF THE DRAWINGS

FIGS. 2A-2C illustrate schematics of printer systems according to some embodiments.

FIGS. 4A-4D illustrate a communication system for 4D printer systems according to some embodiments.

FIGS. 6A-6B illustrate methods to operate a modular printing system according to some embodiments.

FIGS. 8A-8D illustrate printhead configurations according to some embodiments.

FIGS. 9A-9C illustrate printhead configurations according to some embodiments.

FIGS. 11A-11D illustrate platform configurations in a modular system according to some embodiments.

FIG. 13 illustrates 3D printer systems and printheads according to some embodiments.

FIGS. 14A-14F show different print head nozzles.

FIGS. 21A-21B illustrate flow charts for operating print heads having a tilted nozzle according to some embodiments.

FIGS. 22A-22B illustrate flow charts for operating print heads having a tilted nozzle according to some embodiments.

FIG. 23 illustrates a 3D printer system having a tilted nozzle and a cooling mechanism.

FIGS. 24A-24C illustrate flow charts for printheads having a cooling mechanism according to some embodiments.

FIGS. 25A-25B illustrate printheads having a cleaning mechanism according to some embodiments.

FIGS. 26A-26C illustrate integrated printheads having cleaning mechanisms according to some embodiments.

FIGS. 29A-29B illustrate flow charts for printer systems having an integrated cleaning system according to some embodiments.

FIGS. 30A-30B illustrate flow charts for operating printer systems having an integrated cleaning mechanism according to some embodiments.

FIGS. 31A-31B illustrate flow charts for operating printer systems having an integrated cleaning mechanism according to some embodiments.

FIGS. 33A-33B illustrate flow charts for forming a 3D printhead assembly according to some embodiments.

FIGS. 34A-34B illustrate flow charts for operating 3D printer assemblies according to some embodiments.

FIGS. 38A-38C illustrate flow charts for forming print heads having a radiation source according to some embodiments.

FIGS. 39A-39B illustrate flow charts for forming print heads having a radiation source according to some embodiments.

FIGS. 40A-40C illustrate flow charts for operating print heads having a radiation source according to some embodiments.

FIGS. 41A-41B illustrate flow charts for operating print heads having a radiation source according to some embodiments.

FIGS. 44A-44C illustrate a printhead having a spinning mixer according to some embodiments.

FIGS. 45A-45B illustrate flow charts for printer systems having a rotatable mixer according to some embodiments.

FIGS. 46A-46C illustrate a printhead having a spinning mixer according to some embodiments.

FIGS. 48A-48C illustrate different print heads according to some embodiments.

FIG. 54 illustrates a flow chart for 3D printing according to some embodiments.

FIGS. 60A-60C illustrate flow charts for 3D printer systems having patterned platforms according to some embodiments.

FIGS. 62A-62B illustrate flow charts for printer systems having a Peltier device platform according to some embodiments.

DETAILED DESCRIPTION OF THE EMBODIMENTS

Figure 1A:
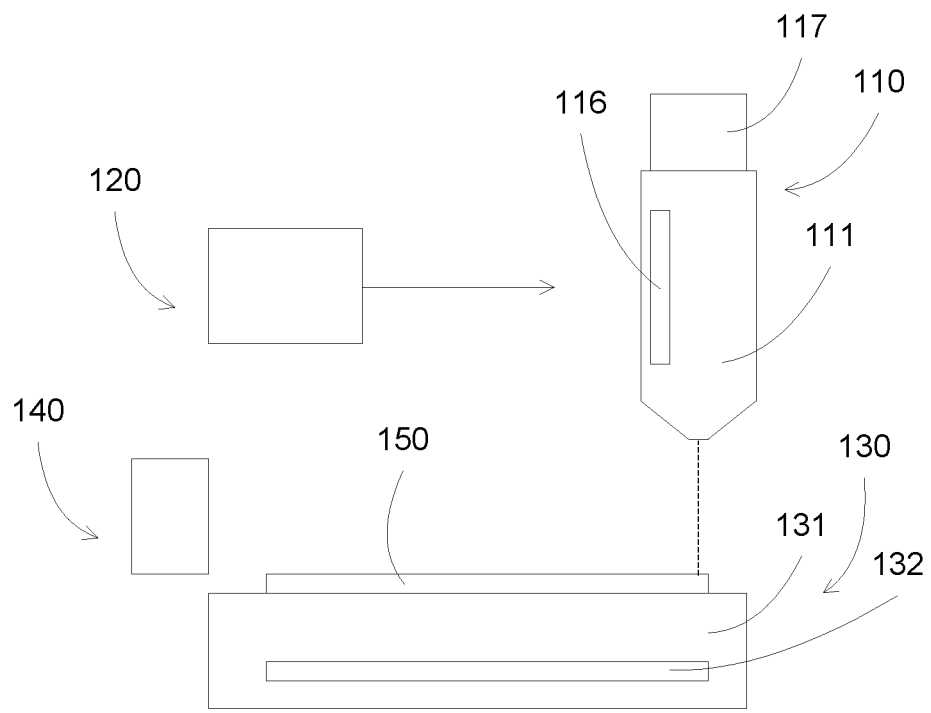
FIGS. 1A-1B illustrate 3D printer systems according to some embodiments.

In some embodiments, the present invention discloses systems and methods for 3D printing, using multiple exchangeable printheads. In general, the number of desired printheads can exceed the capacity of a 3D printer, thus exchangeable printheads can accommodate the needs of 3D printing requirements without significantly affect the complexity and cost of 3D printer systems. For example, a typical 3D printer can have a limited number of printheads, such as 1-4 printheads. The number of desired printheads can easily be greater than 4, for example, multiple printheads can be required to handle different filament colors, different nozzle sizes, different types of printheads such as filament printheads, paste printheads, liquid printheads, and different printheads with different specifications.

In some embodiments, the present invention discloses systems and methods to accommodate the diversity requirements of having multiple printheads with exchangeable printheads. Recognizing that different printheads can be required for different jobs, a 3D printer with exchangeable printheads can be used in which the desired printheads for the particular job can be selected and installed before printing the workpiece.

In some embodiments, the present invention discloses a base system having a printhead module. The printhead module can have one or more installed printheads. The printhead module can be configured to accept one or more printheads, e.g., the printhead module can have mechanical interfaces for mechanically mating with printheads, and have electrical interfaces for electrically connected to the printheads. Mechanical and/or electrical coupling can be used, for example, to align and to configure the newly installed printhead to form a complete system, e.g., a 3D printer with desired printheads for the jobs.

In some embodiments, the present invention discloses printheads having mechanical and electrical interfaces for coupling with a printhead module of a base system. The printheads can have a mechanical system coupled to the mechanical interface for processing a workpiece, such as printing the workpiece. For example, the printheads can include a motor and a hotend for extruding plastic from a plastic filament. The printheads can have an electrical system coupled to the electrical interface for controlling the printheads, such as operating or not operating the mechanical portion of the printheads. For example, the electrical system can instruct the printheads to print on a platform, or to instruct the printheads to move without printing.

There can be different printheads for different job requirements. For example, printheads to accommodate filament printing such as fused filament fabrication printheads, printheads to accommodate paste printing such as plunger style printheads, printheads to accommodate liquid printing such as printheads with peristaltic pumps, printheads with different color printing materials, printheads with different nozzle openings for printing different sizes of material, and printheads with special requirements for special materials such as printheads with UV cured radiation for cross linking polymer materials.

Additive manufacturing processes generally fabricate 3D objects by depositing layers by layers in patterns corresponded to the shape of the objects. At each layer, a print head can deposit building materials at locations corresponded to the pattern of the object for that layer.

3D printing processes can include inkjet printing, stereolithography and fused filament fabrication. In inkjet printing processes, liquid material are released from an inkjet print head, and solidified on the substrate surface, e.g., on the model being formed. In stereolithography processes, a UV light can crosslink layers of photopolymer. In fused filament fabrication processes, a continuous filament of thermoplastic can be softened or melted and then re-solidified on a previously deposited layer. Alternatively, paste-like materials can be used for printing, for example, through a pressure extrusion device such as a piton/cylinder.

Various polymers are used, including acrylonitrile butadiene styrene (ABS), polycarbonate (PC), polylactic acid (PLA), high density polyethylene (HDPE), PC/ABS, and polyphenylsulfone (PPSU). Other materials can be used, such as clay or ceramic materials.

Figure 1B:
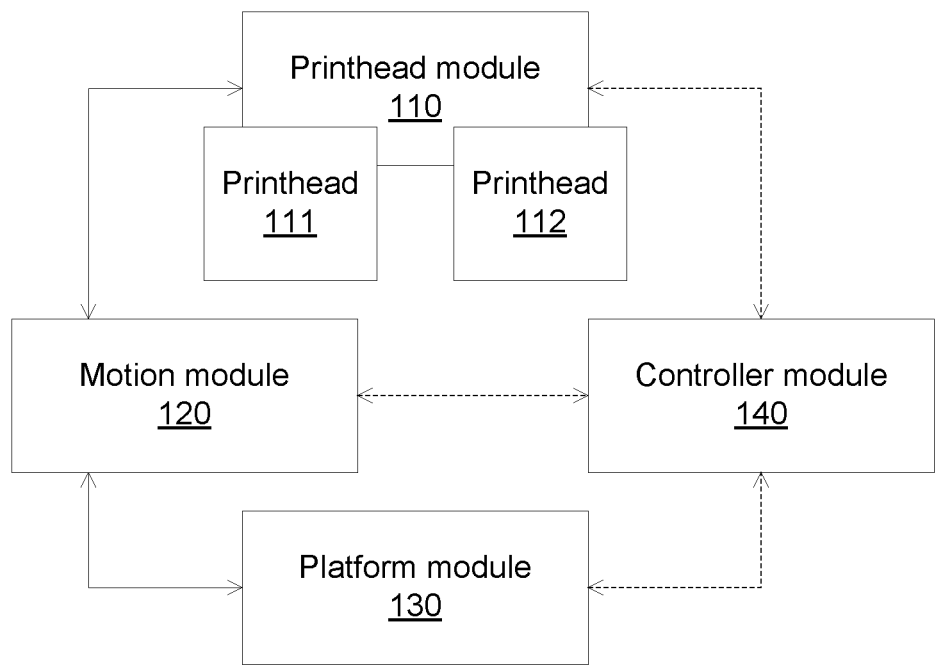

FIGS. 1A-1B illustrate 3D printer systems according to some embodiments. FIG. 1A shows a mechanical schematic and FIG. 1B shows an electrical schematic of a 3D printer system. The 3D printer system can include a printhead module 110 for printing an object 150 on a platform module 130. The printhead module 110 can include a delivery module 117, which is configured to deliver printing materials to a print head 111. The print head 111 can be heated by a heater 116, for example, to a temperature that can soften or melt the printing materials. The delivery module can push the melted printing materials through the print head 111, so that the printing materials can be deposited on the platform 131 of the platform module 130 to form a printed object 150. The printhead module 110 can accommodate multiple printheads, e.g., one or more printheads 112 in addition to printhead 111.

The printhead module 110 can include other components, such as a thermal isolation element, disposed between the heated print head 115 and the delivery module 117, for example, to prevent heating the supplied printing materials in the delivery module 117. The platform module 130 can include other components, such as a heater 132, which can heat the platform surface.

The 3D printer system can include a motion module 120, which can be configured to provide motions of the printhead module 110 relative to the platform module 130, in 3D motions, such as x, y, and z directions in linear 3D printer systems, or 3 z directions in delta 3D printer systems. For example, the printhead can move in a horizontal direction, such as x. The platform can move in a horizontal direction such as y, together with a vertical direction such as z. Other movement configurations can be used to provide complete 3D movements of the printhead relative to the platform.

The 3D printer system can include a controller module 140, for example, a computer or a microcontroller for controlling the printhead module, the motion module, and the platform module.

In some embodiments, the present invention discloses a 3D printer system with exchangeable components. The modules of the 3D printer system, e.g., the printhead module and the platform module can have interfaces for exchanging components. For example, different printheads can be coupled to the printhead module, e.g., existing printheads can be removed from the printhead module, and new printheads can be installed to the printhead module. Different workpiece supports can be coupled to the platform module, e.g., the workpiece support can be exchanged to accommodate different workpieces.

A printhead can be configured for extruding from a filament material. A filament, such as a thermoplastic filament, can be provided to a delivery module. The delivery module can include a mechanism to regulate the flow of filament material. For example, a worm-drive or rotating gears can be used to push the filament into the printhead at a controlled rate. The printhead can include a heater, which can heat the filament material to a temperature that can melt or soften the filament material, for example, to a temperature higher than the glass transition temperature of the filament material. The printhead can be thermally isolated from the delivery module, for example, by a low temperature coefficient material.

A printhead can be configured for extruding from a paste-like material. Paste-like material, such as plasticine or a ceramic paste, can be provided to a delivery module. The delivery module can include a mechanism to deliver the paste-like material, such as a piston/cylinder configuration. For example, a paste-like material can be disposed in a cylinder, and can be pressed by a piston so that the paste-like material can be pushed into the printhead at a controlled rate.

A printhead can be configured for extruding from a liquid-like material. Liquid-like material, such as liquid polymer, can be provided to a delivery module. The delivery module can include a mechanism to deliver the liquid-like material, such as a liquid pump configuration. For example, a liquid-like material can be disposed in a reservoir, and can be pumped by a peristaltic pump so that the liquid-like material can be delivered to a platform support at a controlled rate.

Other printheads can be used, such as a laser head for cutting materials, a cutter head for removing materials from the workpiece, and a pen head for writing on the workpiece. The different printheads can be described in greater details in subsequent sections.

The platform module can have exchangeable components. For example, a platform module can include a horizontal flat platform, e.g., workpiece support, for supporting a workpiece. The flat platform can have different watermark designs for imprinting on a bottom surface of the printed workpiece. The platform module can include a vertical flat platform with different watermark designs for imprinting on a side surface of the printed workpiece. The platform module can include a clamp mechanism for holding the workpiece. The different workpiece supports can be described in greater details in subsequent sections.

In some embodiments, the present invention discloses 3D printer systems, and methods to build and operating the printer systems, that are modular and that can allow automatic configurations of components, such as different printheads. The 3D printer systems can utilize multiple printheads, each with different functionality and/or characteristic. For example, a printhead can be used for extruding filament materials. Another printhead can be used or extruding paste-like materials. Different printheads can be used for extruding materials having different colors. Printheads having different nozzle configurations, e.g., small nozzles, large nozzles, single nozzle, multiple nozzles, etc., can be used to optimize the printing process, such as faster printing throughput.

In some embodiments, the present invention discloses 3D printer systems having multiple printheads, with at least one printhead different from at least another printhead. The different printheads can extend the functionality of the 3D printer, e.g., allowing the printer to print with different printing characteristics provided by the different printheads.

In some embodiments, the printer systems can allow ease of exchange of printheads. For example, installed printheads can be removed from the printer systems. New printheads can be installed to the printer systems. The printhead exchange can be performed manually by an operator without using any tools, e.g., the exchange process can be performed by hand. Further, the printhead exchange can be performed without shutting down the system, e.g., like in a repair or a replacement of a defective printhead. The printhead exchange can be performed while the system is still in operation, which can be defined in the present specification as power is still on in the system, calibration and data of the system are not lost, and other parts of the system do not need to be calibrated due to the exchange.

The printer systems can automatically recognize the installed printheads and the printer systems can be reconfigured accordingly to accommodate and use the printheads in the systems. The exchange of printheads can be performed manually, e.g., by an operator, or automatically, e.g., controlled by printing process software.

In some embodiments, a controller system can be provided to the printer system to allow the reconfiguration of the configuration of the printer system to recognize the removal or adding printheads when there are changes in printhead configurations. For example, electrical connections to a printhead can be broken when the printhead is removed from the printer system, resulting in the system controller recognizing that the printhead is no longer available. Similarly, electrical connections to a new printhead can be established when the new printhead is installed in the printer system, resulting in the system controller recognizing that the new printhead is becoming available. The electrical connections can be performed by hardwires, e.g., manually connected by an operator when installing a new printhead, or manually disconnected when removing an existing printhead. The availability of a new printhead can also be identified by the system controller through the setting of multiple signals to control the new printhead, such as controlling a heater for heating the printhead, a motor for controlling the delivery of printing materials, a motor for cleaning debris from the printhead, and the identification of the printhead.

In some embodiments, the printheads can be different from each other. For example, a printhead can have a printing characteristic different from other printheads, e.g., having a unique characteristic related to the printing process. The printing characteristics can include the printing materials, e.g., the different materials that the printheads can print. For example, a printhead can print a medium melting temperature polymer such as ABS, PLA, or nylon. A printhead can print a high melting temperature polymer such as PEEK. A printhead can print a room temperature paste material like clay. A printhead can print a low temperature paste material like wax. A printhead can print a mixture of two or more materials like rubber or epoxy having 2 components.

The printing characteristics can include a maximum temperature of the printheads, e.g., the highest temperature that the printhead can achieve. The temperature characteristic can be linked to the material characteristics, such as low melting temperature materials can use a low maximum temperature printhead, and high melting temperature materials can use a high maximum temperature printhead. For example, a printhead can have a maximum temperature setting of room temperature, which can be used for printing room temperature materials such as clay. A printhead can have a low temperature setting of less than 100 C, which can be used for printing low melting materials such as common wax or some biology materials. A printhead can have a medium temperature setting of between 100 C and 300 C, which can be used for printing medium melting materials such as ABS, PLA, or nylon. A printhead can have a high temperature setting of between 300 C and 500 C, which can be used for printing high melting materials such as PEEK.

The printing characteristics can include a configuration of the printheads, e.g., the direction of the materials delivered to the platform. For example, a printhead can have a nozzle straight down, for printing a flat layer. A printhead can have the nozzle making an angle different from zero to the vertical line, for printing on a non-horizontal surface. Other configurations can be included, such as a cooling fan for cooling the material already printed, an infrared lamp for heating the already printed material for keeping the printed object at an elevated temperature, or a UV lamp for UV curing the printed material.

The printing characteristics can include a method of delivering the printing materials. For example, a printhead can include a motor for pushing a filament to a hot zone. A printhead can include a piston-syringe assembly for pushing a paste-like material. A printhead can include liquid delivery system for delivering a liquid, e.g., a liquid material at room temperature and can turn into a solid when reaching a cold platform, such as 3D printer using water for printing ice sculpture. The liquid delivery system can include a liquid pump, such as a peristaltic pump, a gear pump, or a rotary pump.

Other printing characteristics can be included, such as an inkjet characteristic for an inkjet printhead, or a laser characteristic for a laser printhead.

In some embodiments, the present invention discloses a 3D printer system with multiple printheads. The printheads can be different from each other, such as having a distinct characteristic. In some embodiments, the system may not be limited to a 3D printer system, but can include other systems, such as hybrid systems that can print 3D objects, but can also cut or engrave by a laser printhead, or can mark by a pen printhead. A 3D printer system can include a system that can perform 3D printing using a 3D printing printhead. But the 3D printer system is not limited to only 3D printing. The 3D printer system can also be used for other processes, such as laser engrave or laser cutting or laser folding using a laser printhead, milling or drilling or lathing using a mill printhead, or writing using a pen printhead.

The printheads can be coupled to the 3D printer system through a mechanical interface and optionally an electrical interface. For example, the 3D printer system can have one or more mechanical interfaces. Each mechanical interface can be configured to mate with a mechanical interface on a printhead. Thus, by coupling the two interfaces, a printhead can be mechanically installed to the 3D printer system. Similarly, by decoupling the interfaces, the printhead can be removed from the 3D printer system.

The mechanical interfaces can be configured for ease of installation, for example, by an operator without using any tool, or using only simple tools such as a screw driver or a wrench. The mechanical interfaces can be removably coupled to each other. The mechanical interfaces can be configured so that the printheads can be installed or removed while the system is still in operation, e.g., without shutting down the system, or without recalibrating the system. For example, the system can stop printing, and an operator can remove an installed printhead, and then install a new printhead. The system then can resume printing.

In some embodiments, the mechanical interfaces can be configured so that the printheads can be installed or removed automatically, e.g., by a printhead exchange mechanism. The printhead exchange can be performed as part of the operation of the system, e.g., the system can print with an installed printhead, stop the printing, exchange the printhead for another printhead, and then resume printing. Thus the 3D printer can have the printhead exchange while still in operation, meaning not shutting down or power down.

In some embodiments, the mechanical interfaces can include a magnetic coupling, using permanent magnets or electromagnets. The magnetic coupling can simplify the mechanical connection between the printhead and the 3D printer, such as providing self-alignment, e.g., when a printhead is brought into a vicinity of the 3D printer, the printhead can automatically couple to the correct location, through the magnetic force alignment.

In some embodiments, the installation of the printheads can include an alignment mechanism. Since the printheads can be installed and removed and re-installed, the positions of the printheads cannot be determined accurately, due to the possible changes of the positions of the printheads when the printheads are installed. Thus the alignment mechanism can be used for determining the positions of the installed printheads.

The alignment mechanism can include a mechanical alignment mechanism, which can be used to mechanically set the printheads to have a predetermined offset distance, for example, to a fixed location such as the printhead module. For example, the mechanical alignment mechanism can include a stop element, and the printhead can be pushed, by the alignment mechanism, so that the printhead contacts the stop element. That can ensure that the printhead is installed with a predetermined offset distance.

The 3D printer system can have one or more electrical interfaces. Each electrical interface can be configured to mate with an electrical interface on a printhead. Thus, by coupling the two interfaces, a printhead can be electrically installed to the 3D printer system. Similarly, by decoupling the interfaces, the printhead can be electrically removed from the 3D printer system. The electrical interfaces can be optional on the printheads, e.g., some printheads do not have electrical components, and thus the printheads may not have electrical interfaces.

The electrical interfaces can include mated connectors, e.g., a male connector can be on the 3D printer interface, and a corresponding female connector can be on the printhead interface, or vice versa. To ease the connection, the electrical interfaces can include only one mated connector, e.g., one connector on the 3D printer and a mated connector on the printheads.

The electrical interfaces can include wireless communication, e.g., a transmitter can be on the 3D printer interface, and a corresponding receiver can be on the printhead interface, or vice versa. Using wireless communication, the coupling of the electrical interfaces can be a non-contact coupling, and the non-contact coupling can be performed by software, e.g., without operator intervention, or without operator actually connecting the electrical interfaces.

The coupling and decoupling of the electrical interfaces can be similar to the coupling and decoupling of the mechanical interfaces. For example, the electrical interfaces can be coupled or decoupled by an operator without using any tool. The electrical interfaces can be removably coupled to each other. The electrical interfaces can be configured so that the printheads can be installed or removed while the system is still in operation, e.g., without shutting down the system, or without recalibrating the system. For example, the system can stop printing, and an operator can remove an installed printhead, and then install a new printhead. The system then can resume printing.

In some embodiments, the electrical interfaces can be configured so that the printheads can be installed or removed automatically, e.g., by a printhead exchange mechanism. The printhead exchange can be performed as part of the operation of the system, e.g., the system can print with an installed printhead, stop the printing, exchange the printhead for another printhead, and then resume printing. Thus the 3D printer can have the printhead exchange while still in operation, meaning not shutting down or power down. The automatic printhead exchange can be easily performed using wireless communication, e.g., the electrical interfaces using wireless communication through a transmitter and a receiver.

In some embodiments, the electrical interfaces can be configured to be hot-swappable, meaning coupling the electrical interfaces without stopping or shutting down the system. The printheads can be installed and removed from the 3D printer without interruption to the 3D printer. In a hot swappable connector, ground pins can be connected before connecting sensitive circuitry, e.g., the hot swapping connector ensures that no sensitive circuitry is connected before there is a reliable system ground. The connector can have staggered pins to allow the ground pin to be connected before other pins. The other pins can be configured so that the incoming device can be grounded first, followed by the data lines, and lastly by the power.

The hot swappable connector can include pre-charged pins that make contact before the main power pins. The pre-charge pins can be protected by a current limiter circuit that limits the inrush current to an acceptable value. The current limiter circuit can be a series resistor, a negative temperature coefficient (NTC) resistor, or other current-limiter circuits. Soft-start circuit can also be used to provide a ramp-up of the voltages to prevent excessive high contact current.

The alignment mechanism can include an electrical alignment mechanism (instead of a mechanical alignment mechanism), which can be used to determine offset distance of the printheads, for example, to a fixed location such as the printhead module. For example, the electrical alignment mechanism can include a distance sensor, such as an ultrasonic sensor or a laser sensor, which can be used to determine the offset distance of the printheads to a fixed location. The offset distance then can be communicated to the controller module, which can use the offset distance to know the precise location of the newly installed printheads.

In some embodiments, the mechanical interfaces and the electrical interfaces can be integrated, meaning the coupling or decoupling of the mechanical interfaces can automatically couple or decouple the electrical interfaces. For example, the electrical interfaces can include a connector disposed at an end of a mechanical coupling. Thus by performing the mechanical coupling, at the end of the mechanical coupling process, the electrical connector in the printhead can mate with the electrical connector of the 3D printer. Similarly, when mechanically decouple the printhead, the electrical connector are decoupled first, followed by the decoupling to the mechanical coupling. Thus at the end of the decoupling process, both electrical and mechanical couplings have been decoupled.

In some embodiments, one or more printheads can be installed in the 3d printer system, for example, by coupling the mechanical and electrical interfaces of the printheads with the 3D printer system. There can be one or more printheads available, e.g., not installed in the 3D printer system. The available printheads can have a printing characteristic different from the installed printheads, e.g., the 3D printer system can have many printheads with different printing functions or characteristics, and the printheads that are needed for a current job can be installed in the 3D printer system to perform the job.

For a next job, the requirement can be changed, and thus an available printhead can be required. An installed printhead can be removed from the system, and the required available printhead can be installed, for example, to the slot vacated by the removal of the removed printhead.

In some embodiments, the 3D printer system can include a platform module that is configured to support the workpiece, e.g., to support the printed objects. The platform module can include a separate workpiece support, or the platform can be the workpiece support. The workpiece support can be removably coupled to the 3D printer system, for example, through mechanical interfaces and optionally electrical interfaces, similar to the concept of removably coupling of the printheads.

In some embodiments, the 3D printer system can include one or more workpiece supports. The workpiece supports can be different from each other, e.g., having a distinct characteristic related to a printing process. For example, a workpiece support can include a horizontal flat surface for printing an object on the horizontal surface. A workpiece support can include a vertical flat surface for printing an object on the vertical surface. A workpiece support can include a flat surface forming an angle with the horizontal or vertical surface for printing an object at an angle. A workpiece support can include a curved surface, such as a cylindrical or a spherical surface. A workpiece support can include a stationary flat or curved surface or a rotating flat or curved surface. A workpiece support can include a plain flat or curved surface, or a decorating plain flat or curved surface, e.g., a surface with a watermark that can imprint on the object to be printed on the decorating surface. A workpiece support can include a heater or a cooler surface, e.g., a room temperature surface, a hot surface, or a cold surface.

The workpiece supports can include mechanical interfaces, for example, to secure the workpiece supports to the 3D printer system. The platform or the 3D printer system can have a mechanical interface and the workpiece supports can have a mating mechanical interface. The mechanical interfaces can include an alignment mechanism, to determine the position and orientation of the installed workpiece support.

The workpiece supports can include electrical interfaces, for example, to provide power or signal to the workpiece supports. Some workpiece supports can be purely mechanical, such as a horizontal flat workpiece support, or a cylindrical surface workpiece support, or a workpiece support having watermark. Some workpiece supports can require power and/or signal, such as a heated or cooled workpiece supports, or a rotating workpiece support. The platform or the 3D printer system can have an electrical interface and the workpiece supports can have a mating mechanical interface, if required. Thus, some workpiece supports do not have the electrical interface, and do not need to electrically connect to the 3D printer system. Some workpiece supports can require an electrical interface, which can be coupled to the mated electrical interface in the 3D printer system.

In some embodiments, the 3D printer system can include a motion module. The motion module can be configured to move the printhead module relative to the platform module, for example, in 3 dimensions, such as x, y, z, or r, theta, z, or delta style.

In some embodiments, the 3D printer system can include a controller module. The controller module can be configured to accept the installed printheads by recognizing the printing characteristics of the printheads. The controller module can have the characteristic profiles of the printheads, e.g., different profiles containing the printing characteristics of the different printheads. For example, the controller can include the characteristic profiles. Alternatively, when a printhead is installed, the controller can communicate with the installed printhead to obtain the characteristic profile of the installed printhead. The controller can obtain the printing characteristics of the printhead and then formulate the profile. Thus the characteristic profiles of different printheads can contain the differences in the printing characteristics of the printheads.

In some embodiments, when an installed printhead is removed, the controller can recognize that the printhead is removed, for example, through the electrical interfaces. Thus any attempt to operate the printhead will result in a notification saying that the printhead is not available.

When a new printhead is installed, the controller can use the characteristic profile of the new printhead as the operating limits for setting conditions for running the new printhead. The characteristic profile can be obtained from a storage, e.g., the controller already contains many different characteristic profiles for different printheads. The characteristic profile can be obtained by the controller reading from the newly installed printhead, such as reading the whole profile, or reading the characteristics for building the profile. The controller thus can be configured to accept the newly installed printhead for operation.

In some embodiments, the present invention discloses 3D printer systems configured to accept any of multiple printheads, with at least one printhead different from at least another printhead. A controller can be configured to accept the different printheads, either by storing the characteristic profiles of the printheads, or by having capability to read the profile or the characteristics of the printheads when the printheads are installed in the system.

In some embodiments, the present invention discloses 3D printer systems having a controller configured to accept the different printheads through a CAN bus. The CAN bus can allow an automatic configuration of the printheads with minimum number of connections, e.g., the controller can be a CAN bus node, communicating with the installed printhead, which is another CAN bus node.

FIGS. 2A-2C illustrate schematics of printer systems according to some embodiments. In FIG. 2A, a printer system 200 can include a platform 230, for example, to move in xy directions. The printer system 200 can include a vertical movement module 220 to move the platform in a z direction. The printer system 200 can include a printhead module 215, which can be configured to support multiple printheads 210, 211, and 212. The above description xyz movements are illustrative, and other configurations can be used, such as a platform 230 having an x movement, and the printhead module 215 having a y movement.

The printhead module 215 can accommodate one or more printheads 210 and 211. In addition, new printheads 212 can be installed to the printhead module 215, and installed printhead 210 or 211 can be removed from the printhead module 215.

The printer system can include a controller 240 for controlling the motors, e.g., motors to control the x, y, z movements, and other motions and sensing assemblies. The printhead 210 and 211 each can have a controller 250 for controlling the peripherals of the printhead, such as delivery motor, cleaning fan, heater, etc. Mechanical coupling 261/271 can be included for coupling the printheads to the printhead module. As shown, the mechanical coupling can include mating shapes between the printheads and the printhead module. For example, the printheads can include a taper shape 261, which can be mated to the taper opening 271 in the printhead module. Electrical coupling 260/270 can be included for communication between the printer controller 250 and the printhead controller 240. For example, the printheads can include electrical coupling 260, which can be electrically mated, e.g., connected, with the electrical coupling 270 in the printhead module. Thus the printer system can communicate and recognize the installed printheads, e.g., through the electrical connection 260/270. As shown, the printheads can be manually exchanged, e.g., an operator can remove and install a printhead in a printer system. Further, the mechanical and electrical couplings, which can be called mechanical and electrical interfaces between the printheads and the printhead module, can be integrated. For example, the electrical coupling 260/270 can be configured so that when the printheads is mechanical coupled with the printhead module, through the coupling 161/271, the electrical couplings 260/270 can be automatically connected.

In FIG. 2B, a printer system 205 can include a platform 235, for example, to move in xy directions. The printer system 205 can include a vertical movement module 225 to move the platform in a z direction. The printer system 205 can include a printhead module 216, which can be configured to support multiple printheads 215. Controllers 245 and 255 can be included for controlling the printer 205 and the printheads 215.

An automatic printhead exchanger module 206 can be included. The automatic printhead exchanger 206 can support multiple printheads 217. In addition, the exchanger 206 can include an exchange mechanism 282, which can allow placing a printhead 217 from the exchanger 206 to an empty slot 218 in the printhead module 216. The exchange mechanism 282 can also allow retrieving an installed printhead 215 from the printhead module 216 back to the exchanger 206. Electrical connections 265/275 can allow communication between the system controller 245 with the printhead controller 255.

FIG. 2C shows a coupling between a printhead 218 and a printhead module 212. Mechanical coupling 221/222 can be used for mechanically coupling the printhead 218 to the printhead module 212. The mechanical coupling can include an alignment mechanism for the controller to know the position of the printhead. The alignment mechanism can be a mechanical alignment mechanism or an electrical alignment mechanism. Electrical coupling 231/232 can be used for electrically connecting the printhead 218 to the printhead module 212. The electrical coupling 231/232 can be a contact coupling (e.g., through an electrical connector), or a non contact coupling (e.g., through a wireless connection such as rfid). The electrical coupling 231 can be connected to a bus line, which can run from the printhead module to the controller module 245. The electrical coupling 232 can be connected to the controller circuit of the printhead, such as the controller 255 of the printhead 215.

In some embodiments, the system can include other exchangeable components, such as exchangeable platform supports in the platform module.

In some embodiments, light weight system is provided for electrical communication, for example, to accommodate the high throughput and rapid movements of the printheads, e.g., relative movements with respect to the platform.

Figure 3A:
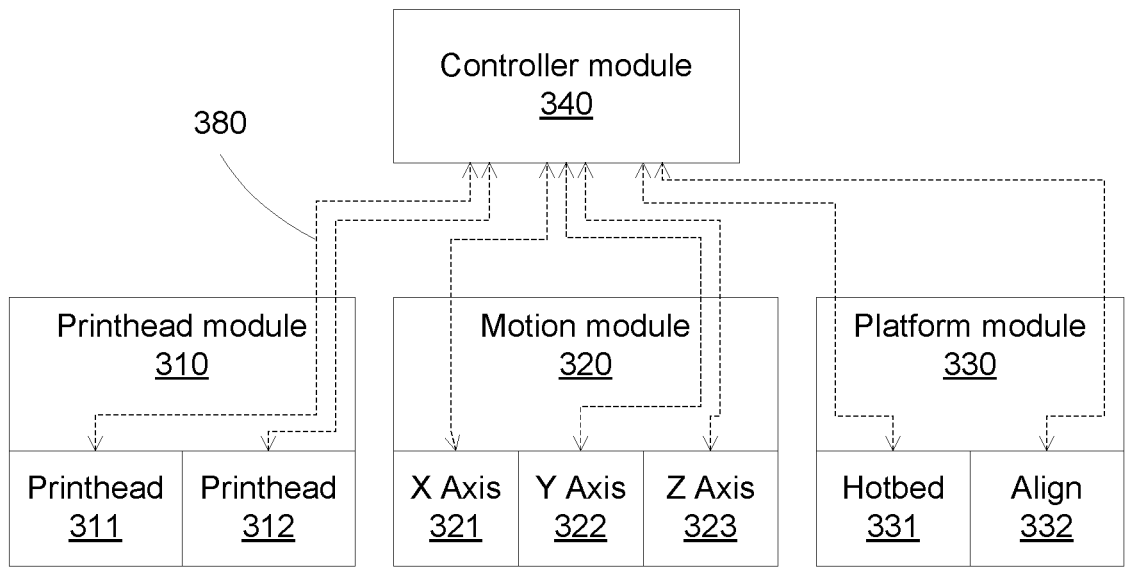
FIGS. 3A-3B illustrate a communication system for 3D printer systems according to some embodiments.
Figure 3B:
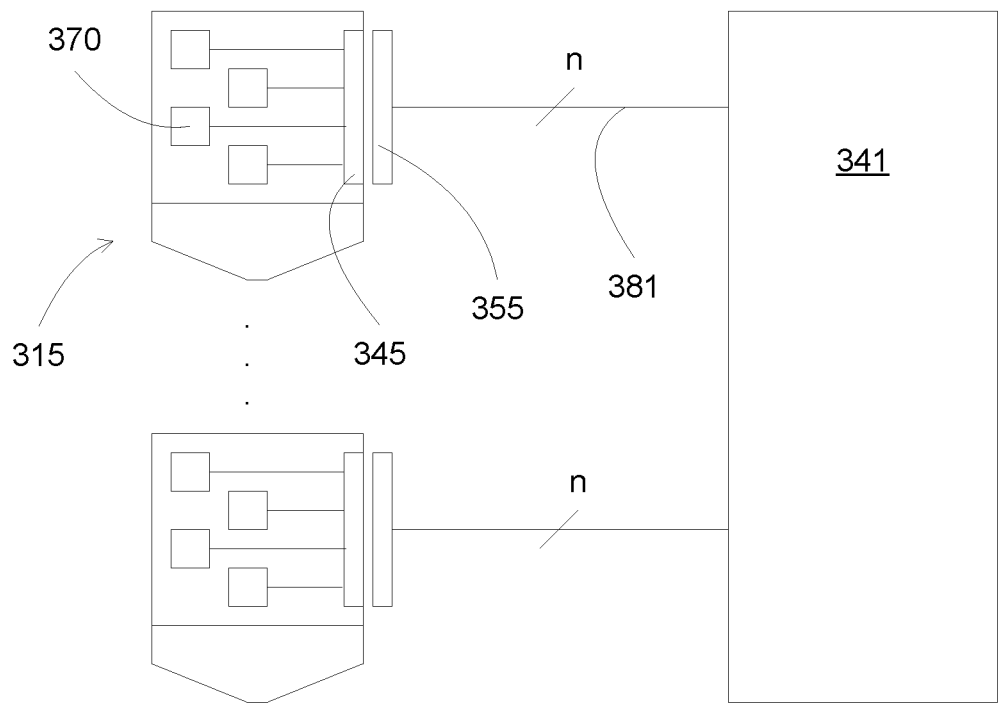

FIGS. 3A-3B illustrate a communication system for 3D printer systems according to some embodiments. In FIG. 3A, a controller module 340 can communicate with other modules, such as printhead module 310, motion module 320, and platform module 330, through wiring 380. Each component of the modules, e.g., printheads 311 and 312 of the printhead module 310, X axis 321, Y axis 322, and Z axis 323 of the motion module 320, and hotbed 331 and alignment 332 of the platform module 330, can be connected to the controller 340. The connection can be hot swappable, e.g., allowing connecting and disconnecting without power shutoff. Further, the connection can include automatic configurations, allowing the controller 340 to recognize and appropriately configure the newly installed components. The connection between the controller and the components can include a central distributed bus, such as USB or Ethernet bus.

FIG. 3B shows a detailed configuration between components, such as printheads 315 and a system controller 341. The system controller 341 can communicate with the components, such as multiple printheads 315 through wiring 381. The printheads 315 can be electrically coupled with the system controller 341 through coupling 345/355. The coupling 345/355 and the wiring 381 can have multiple wires, e.g., n wires, depending on the number of components 370 in the printheads 315. For example, the wires can include power wires for an extrusion motor, power wires for a heater, power wires for a fan, and communication wires for identification. The coupling 345/355 can be hot-swappable, e.g., connecting and disconnecting while the power is on. The controller 341 can include an auto-configuration component, allowing the controller 341 to recognize the data of the installed components, such as the characteristics of the printhead 315, for automatic installation of appropriate drivers for running the installed components.

In some embodiments, the present invention discloses a 3D printer system using a network of independent controllers having serial communication protocols. For example, the serial communication can use 2 dedicated wires for signal communication, thus allow minimum weight for electrical connection wires. Controller Area Network (CAN) bus can be used in a 3D printer system, in which the printer system, and each of the printheads can have a CAN controller for controlling the peripheral assemblies, such as motors and heaters. Communication between the printer system and the printheads can be performed by the dedicated two wires for serial communication.

FIGS. 4A-4D illustrate a communication system for 4D printer systems according to some embodiments. In FIG. 4A, a controller module 440 can communicate with other modules, such as printhead module 410, motion module 420, and platform module 430, through a serial bus 480. Each component of the modules, e.g., printheads 411 and 412 of the printhead module 410, X axis 421, Y axis 422, and Z axis 423 of the motion module 420, and hotbed 431 and alignment 432 of the platform module 430, can be connected to the serial bus 480. The connection can be hot swappable, e.g., allowing connecting and disconnecting without power shutoff. Further, the connection can include automatic configurations, allowing the controller 440 to recognize and appropriately configure the newly installed components. The connection between the controller and the components can include a serial distributed bus, such as CAN bus.

A controller area network (CAN) can be used for reducing the number of wirings, together with ease of communication between the controller 440 and the components, including the multiple interchangeable printheads 411, 412. The communication can be performed through a CAN bus 480, which can have two signal wires. In some cases, 4 wires can be used, including two signal wires and two power wires.

FIG. 4B shows a detailed configuration between components, such as printheads 415 and a printhead module 441. The printhead module 441 can communicate with the components, such as multiple printheads 415 through CAN bus 481. The printheads 415 can be electrically coupled with the CAN bus 481 through coupling 445/455. The coupling 445/455 and the CAN bus 481 can have multiple wires, e.g., 2 or 4 wires. The coupling 445/455 can be hot-swappable, e.g., connecting and disconnecting while the power is on. The printhead module 441 can include an auto-configuration component, allowing the printhead module 441 to recognize the data of the installed components, such as the characteristics of the printhead 415, for automatic installation of appropriate drivers for running the installed components.

Each component, e.g., printer system and each of the printheads, can include a CAN controller, e.g., CAN controller 442 for the printhead module and CAN controller 475 for the printhead 415. The printhead controller 475 can control the components 470 in the printhead, such as motors and heaters. The printhead controller 475 can communicate with the printhead module 441 through electrical connection 445/455, which can be coupled to the CAN bus 481, and to the CAN controller 442. The CAN controller can include a transceiver for communicating with the CAN bus. The CAN controller can include a microprocessor for processing the system, such as determining information for sending and receiving from the CAN transceiver.

In some embodiments, the electrical coupling between a printhead and a printhead module can be hardwired, e.g., connecting by a manual connection between electrical connectors. The electrical coupling can be wireless, for example, by infrared communication or by optical communication.

In FIG. 4C, a printhead 416 can be electrically connected to a printhead module 442 through a hardwire coupling 446 and 456. For example, connector 446 can include multiple electrical wires 471 connected to components of the printhead 416, such as to a CAN controller in the printhead 416. Similarly, connector 456 can include multiple electrical wires 461 connected to components of the printhead module 442, such as to a CAN controller in the printhead module 442. Connector 446 can be a female connector and connector 456 can be a male connector, which can be mated together to form electrical connections.

In FIG. 4D, a printhead 417 can be electrically connected to a printhead module 443 through wireless connection 470/480 and 475/485. For example, a connector 447 can include multiple electrical wires connected to components of the printhead 417. The connector 447 can supply the signal to a transmitter/receiver 470, which can wirelessly communicate with other transmitter/receiver through antenna 475. Similarly, connector 457 can include multiple electrical wires connected to components of the printhead module 443. The connector 457 can supply the signal to a transmitter/receiver 480, which can wirelessly communicate with other transmitter/receiver through antenna 485. For example, transmitter/receiver 470 can transmit signals to antenna 475, which can be received by antenna 485 and interpreted by transmitter/receiver 480. The wireless communication can allow ease of installation of printheads to the printhead module.

In some embodiments, the exchangeable components to a system, such as a 3D printer system, can include an alignment mechanism. For example, a second printhead can have an alignment mechanism, so that when installed to the printhead module, can be aligned with the first printhead. Alternatively, the first and second printheads can be aligned with the printhead module.

Figure 5A:
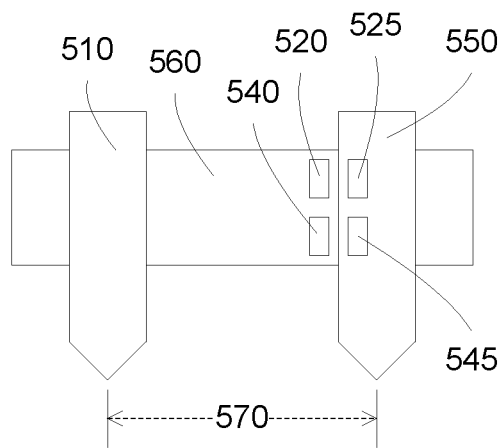
FIGS. 5A-5D illustrate alignment configurations for printheads according to some embodiments.

FIGS. 5A-5D illustrate alignment configurations for printheads according to some embodiments. In FIG. 5A, a first printhead 510 can be installed in a printhead module 560, such as permanently installed, e.g., not an exchangeable printhead. A second printhead 550 can be exchangeably installed in the printhead module 560. Mechanical coupling 520/525 can be used to secure the second printhead 550 to the printhead module 560. Electrical coupling 540/545 can be used to provide communication between the printhead module 560 (e.g., and also the system controller module) and the second printhead 550. The second printhead 550 can be aligned to the first printhead 510, e.g., separating from the first printhead a known distance 570. The alignment distance 570 can allow the system to print using the second printhead, e.g., by adding an offset distance equaled to the alignment distance 570, to the movements for the second printhead 550, as compared to the first printhead 510.

Figure 5B:
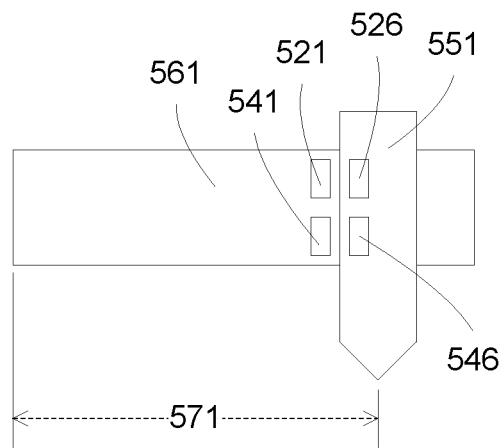

In FIG. 5B, a printhead 551 can be exchangeably installed in the printhead module 561. Mechanical coupling 521/526 can be used to secure the second printhead 551 to the printhead module 561. Electrical coupling 541/546 can be used to provide communication between the printhead module 561 (e.g., and also the system controller module) and the second printhead 551. The printhead 551 can be aligned to the printhead module 561, e.g., separating from a fixed point in the printhead module a known distance 571. The alignment distance 571 can allow the system to print using the printhead, e.g., by adding an offset distance equaled to the alignment distance 57, to the movements for the printhead 551.

Figure 5C:
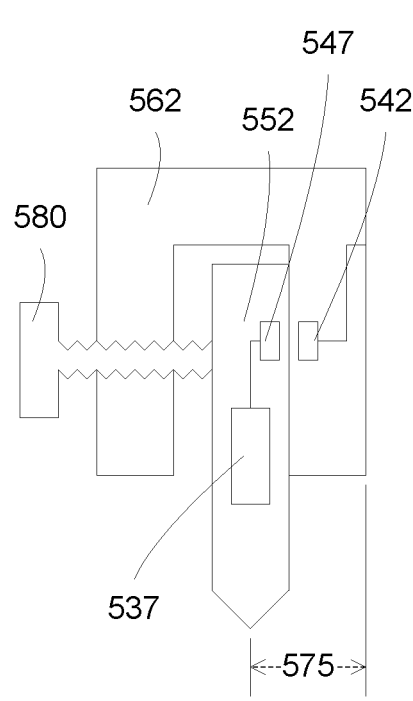

The alignment distance can be determined by an alignment mechanism, such as mechanical alignment mechanism or an electrical alignment mechanism. FIG. 5C shows a mechanical alignment mechanism for a printhead 552, establishing an alignment distance 575 to a fixed point in a printhead module 562. An attaching mechanism 580, such as a bolt mechanism, can secure the printhead 552 against a fixed surface of the printhead module 562, forming an alignment distance 575. The printhead 552 can include control circuitry 537, which is electrically coupled to a connector 547. The electrical connector 547 can be coupled to another connector 542, which is placed in the printhead module 562. For example, the connector 542 in the printhead module can be coupled to a CAN bus, thus allowing the printhead 552 to be connected to the CAN bus network.

Figure 5D:
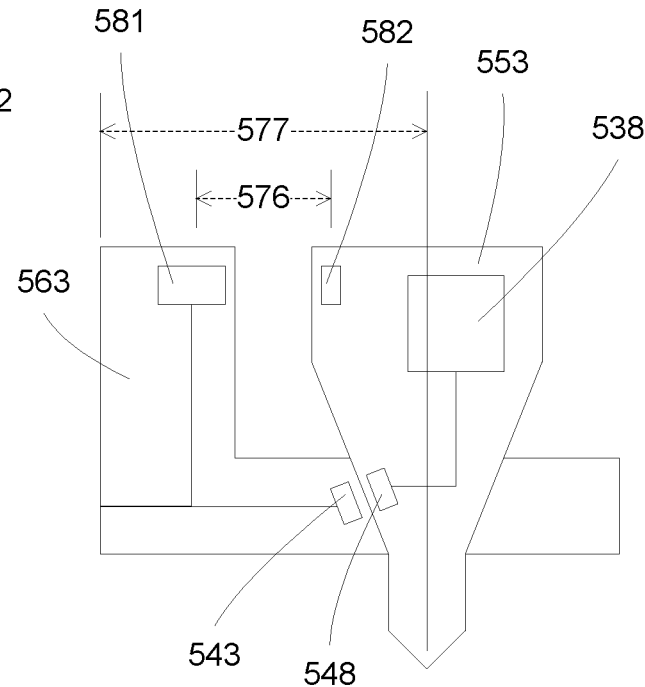

FIG. 5D shows an electrical alignment mechanism for a printhead 553, establishing an alignment distance 577 to a fixed point in a printhead module 563. A distance sensor mechanism 581/582, such as an ultrasonic distance sensor module, can detect a distance 576 from the printhead 553 to the printhead module 563. The alignment distance 577 can be determined from the distance 576. The printhead 553 can include control circuitry 538, which is electrically coupled to a connector 548. The electrical connector 548 can be coupled to another connector 543, which is placed in the printhead module 563. For example, the connector 543 in the printhead module can be coupled to a CAN bus, thus allowing the printhead 553 to be connected to the CAN bus network.

In some embodiments, the present invention discloses methods for using a modular system, such as a 3D printer system having exchangeable printheads and/or exchangeable platform supports. Different printheads and platform supports can be selected based on the requirements of the job, and then installed in the system for processing a workpiece.

A modular printer system can be formed by coupling a printhead module to a 3D printer. The printhead module can be configured to accept one or more printheads that can be removed and exchanged from the printhead module. The installation of the printheads to the printhead module can include physical and electrical connections, together with signal communication, allowing the printer system to control the printheads assembled in the printhead module. Controller area network connection can be used, providing a light weight network communication between the modular printheads and the printer system. The communication can be established by 2 wire connectivity, for example, by the communication protocol of CAN bus.

A modular printer system can be formed by forming a platform for a 3D printer. A printhead module that is configured to accept one or more printheads can be formed. A movement mechanism can be formed, wherein the movement mechanism couples the platform with the printhead module to allow the one or more printheads to print a 3D structure on the platform.

A modular printer system can be operated by changing a printhead in a printhead module, with the printhead module automatically configured to accept the printhead for operation. The automatic configuration can allow the printer system to continue printing with a new installed printhead right after the printhead is installed, either manually by an operator or automatically by a printhead exchange module.

A modular printer system can be operated by printing an object using a first printhead in a printhead module of a 3D printer. A second printhead can be added to the printhead module, wherein the second printhead is automatically accepted by the printhead module. The system can continue to print using the second printhead.

FIGS. 6A-6B illustrate methods to operate a modular printing system according to some embodiments. In FIG. 6A, operation 600 provides a system for forming a workpiece, wherein the system comprises a platform module for supporting the workpiece, a head module configured to support one or more heads for processing the workpiece, and a 3D motion module for moving the head module with respect to the platform module. The head module can be a printhead module for supporting printheads. The head module can support other heads, such as a head including a pen for plotting, a head including a drill bit for drilling, a head including a laser for cutting, and a head including a cutting bit for cutting such as milling. The head module can have permanently installed heads, such as a 3D printhead.

Operation 610 installs or exchanges a first head to the head module. For example, the first head can be installed to the head module. Alternatively, an existing head can be removed, and the first head can be installed to the position vacated by the existing head. The installation or exchange can be performed manually by an operator, or automatically using a head exchanger module. Mechanically interfaces can be included for mating the heads to the head module. Additional heads can be installed. Operation 620 electrically configures the first head to be recognized by the system. For example, electrical connectors can be used for electrically coupling the head to the head module. Wireless connection can also be used. Hot-swappable bus can be used, to allow head installation without shutting power. CAN bus can be used for simplifying the system electrical connection.

Operation 630 aligns the first head to be recognized by the system. The alignment can be performed by a mechanical mechanism or by an electrical mechanism. The alignment can allow the system to use the installed head.

In FIG. 6B, operation 640 provides a system for forming a workpiece, wherein the system comprises a platform module for supporting the workpiece, a head module configured to support one or more heads for processing the workpiece, and a 3D motion module for moving the head module with respect to the platform module. Operation 660 determines one or more heads to meet a requirement of processing the workpiece. Operation 670 installs or exchanges heads to the head module. The heads can be configured manually or automatically.

In some embodiments, an operator can prepare the system before running the job. Multiple heads can be selected, and installed in the system. The job can be stated, with all the needed heads included in the head module.

In some embodiments, the needed heads can be automatically retrieved from a head exchanger. Thus an operator can check to make sure that the head exchanger contains all the needed heads. New heads can be added to the head exchanger. The job can be stated, with all the needed heads included in the head exchanger.

In some embodiments, the present invention discloses a modular system, including a base system together with multiple exchangeable heads such as printheads, and/or multiple exchangeable platform supports. The modular system can include a 3D printer system for printing a workpiece. The 3D printer system can include a printhead module, one or more printheads, a platform module, a motion module, and a controller module. The printhead module can include first mechanical interfaces and first electrical interfaces for coupling with the one or more printheads. The printheads can include second mechanical interfaces and second electrical interfaces for coupling with the printhead module. The first and second mechanical interfaces can be configured to be mated with each other. The first and second electrical interfaces can be configured to be connected with each other. The one or more printheads can be configured to be exchangeably installed in the printhead module through the first and second mechanical and electrical interfaces. The first printhead of the one or more printheads can be installed in the printhead module. The platform module can be configured to support the workpiece. The motion module can be configured to move the printhead module in three dimensional directions relative to the platform module. The controller module can be configured to accept the first printhead.

The first and second mechanical interfaces comprise an alignment mechanism for aligning a printhead to the printhead module. The first and second electrical interfaces comprise a contact coupling mechanism for electrically connecting a printhead to the printhead module. The first and second electrical interfaces comprise a non-contact coupling mechanism for electrically connecting a printhead to the printhead module. The first and second mechanical interfaces are configured to be manually coupled by an operator.

The first and second mechanical interfaces are configured to be automatically coupled by an automatic coupling mechanism. The first and second electrical interfaces are configured to be manually coupled by an operator. The controller is configured to automatically configuring the first printhead for operation. The first and second electrical interfaces are configured to be hot-swappable.

In some embodiments, the 3D printer system can include an electrical alignment circuit coupled to at least one of the printhead module and a printhead, wherein the electrical alignment circuit is configured to provide alignment information for aligning the printhead to the printhead module. The 3D printer system can include an automatic printhead exchanger mechanism, wherein the automatic printhead exchanger mechanism is configured to automatically exchange a printhead in the printhead module. The 3D printer system can include a serial bus, wherein the serial bus is coupled to the first electrical interfaces, wherein the serial bus is coupled to the controller module. The 3D printer system can include a bus line, wherein the bus line is coupled to the first electrical interfaces, wherein the bus line is coupled to the controller module.

In some embodiments, the 3D printer system can include one or more workpiece supports. The platform module comprises third electrical interfaces for coupling with the one or more workpiece supports. The workpiece supports comprise fourth electrical interfaces for coupling with the platform module. The third and fourth electrical interfaces are configured to be connected with each other. The one or more workpiece supports are configured to be exchangeably installed in the platform module through the third and fourth electrical interfaces. The first workpiece support of the one or more workpiece supports is installed in the platform module.

In some embodiments, the present invention discloses a system, including a printhead module; wherein the printhead module comprises first mechanical interfaces and first electrical interfaces for coupling with one or more printheads, wherein the one or more printheads are configured to be exchangeably installed in the printhead module through the first mechanical and electrical interfaces; a platform module, wherein the platform module is configured to support a workpiece; a motion module, wherein the motion module is configured to move the printhead module in three dimensional directions relative to the platform module; a controller module, wherein the controller module comprises a controlled area network bus (CAN bus), wherein the CAN bus is coupled to the first electrical interfaces; wherein the controller module is configured to automatically configured a printhead of the one or more printheads installed in the printhead module through the CAN bus. The first electrical interfaces can include a CAN node coupled to the CAN bus. The second electrical interfaces can include a CAN node for coupling to the CAN bus through the first electrical interfaces. The CAN node can include a controller having information related to configurations of the printheads.

In some embodiments, the present invention discloses a system, including a printhead module; one or more printheads, wherein the printhead module comprises first mechanical interfaces and first electrical interfaces for coupling with the one or more printheads, wherein the printheads comprise second mechanical interfaces and second electrical interfaces for coupling with the printhead module, wherein the first and second mechanical interfaces are configured to be mated with each other, wherein the first and second electrical interfaces are configured to be connected with each other, wherein the one or more printheads are configured to be exchangeably installed in the printhead module through the first and second mechanical and electrical interfaces, wherein a first printhead of the one or more printheads is installed in the printhead module; a platform module, wherein the platform module is configured to support a workpiece; a motion module, wherein the motion module is configured to move the printhead module in three dimensional directions relative to the platform module; a controller module, wherein the controller module comprises a controlled area network bus (CAN bus), wherein the CAN bus is coupled to the first electrical interfaces; wherein the controller module is configured to automatically configured the first printhead through the CAN bus.

In some embodiments, the present invention discloses multiple printheads for 3D printing, which can be exchangeably installed in a base system of a 3D printer system. For example, the printheads can include filament extruder heads with different diameters and different configurations. The term 3D printer system can include mechanisms for additive manufacturing, together with other technologies, such as subtractive manufacturing with drilling, milling and lathing, and laser cutting and writing and droplet printing.

Figure 7A:
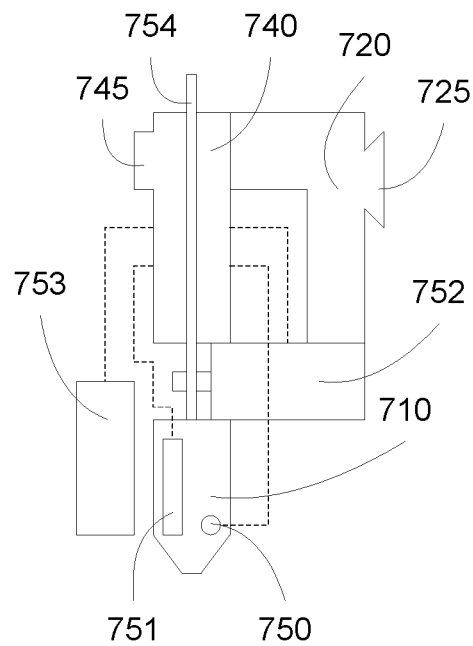
FIGS. 7A-7D illustrate printhead configurations according to some embodiments.

FIGS. 7A-7D illustrate printhead configurations according to some embodiments. FIG. 7A shows a schematic of a filament extruded printhead, accepting a filament 754 to a printhead nozzle 710. A heater 751 can be included to heat the printhead nozzle to a temperature that can melt or soften the filament 754. A thermocouple or a thermistor 750 can be coupled to the printhead nozzle to monitor the temperature of the printhead nozzle. A motor 752 can be used to push the filament 754 into the printhead nozzle 710. An additional element 753, such as a fan, can be included. The printhead can include a mechanical coupling 725, which is attached to a printhead body 720. The mechanical coupling 725 can be used to mechanically couple the printhead to a printhead module. The printhead can include a circuit board 740, which includes an electrical coupling 745 for electrical connecting to the printhead module.

In some embodiments, a printhead can be coupled to a cooling mechanism, such as a cooling fan. The cooling mechanism can be operable to cool the substrate, or to cool the material being printed. The cooling mechanism can be configured to present minimum interference to the heated printhead. For example, the cooling mechanism can be configured to deliver a focused beam of gas, e.g., air, to an area just a little away from the printhead nozzle. The focused beam of gas can be a confined beam, which can provide a gas flow to the material delivered from the printhead or to the material deposited on the platform surface. The focused or confined beam of gas can cool the printed material without (or with minimum) cooling the heated portion of the printhead.

Figure 7B:
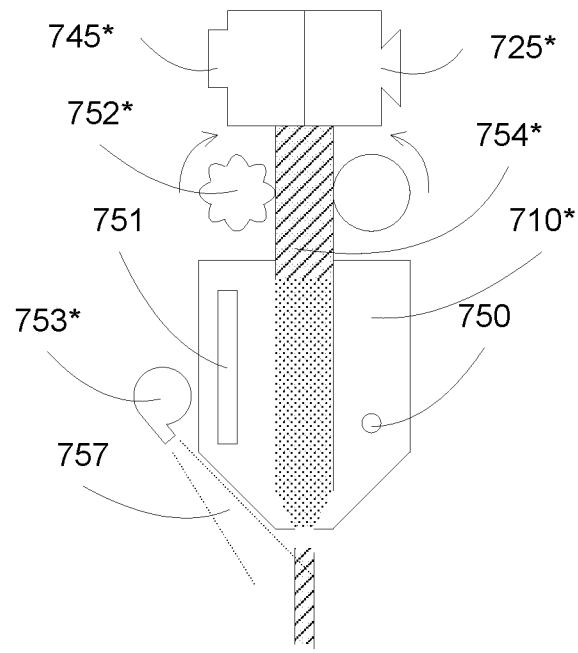

FIG. 7B shows a filament extruded printhead, which can accept a filament 754\* to a printhead nozzle 710\*. A heater 751 can be included to heat the printhead nozzle to a temperature that can melt or soften the filament 754\*. A thermocouple or a thermistor 750 can be coupled to the printhead nozzle to monitor the temperature of the printhead nozzle. A motor 752\* can be used to push the filament 754\* into the printhead nozzle 710\*. A fan 753\* can be included. The printhead can include a mechanical coupling 725\* to mechanically couple the printhead to a printhead module. The printhead can include an electrical coupling 745\* for electrical connecting to the printhead module.

The cooling fan can be configured to deliver a confined or focused gas flow, such as air flow, to an area away from the outlet of the printhead nozzle, such as to a material just coming out of the printhead, or to a material just deposited on a substrate, or to a substrate area that the printhead is to be deposited a printed material. The confined or focused gas flow can be configured to avoid the printhead, such as the heated portion of the printhead. Shielding mechanism, such as a flow diverter or flow blockage, can be provided between the cooling fan and the printhead, for example, to prevent the gas flow from cooling the heated printhead and to confine or focus the gas flow to the substrate or to the printed material. A blower with a flow focus mechanism can be used.

Figure 7C:
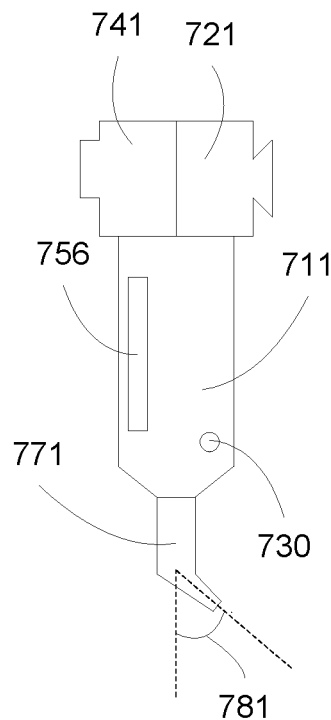

FIG. 7C shows a filament extruded printhead with a tilted nozzle. A printhead 711 can have a nozzle 771 that forms an angle 781 with the vertical direction, as compared to a vertical nozzle as in previous figures. Other components can be included, such as a motor (not show), heater 756, and temperature measurement element 730. The printhead can include a mechanical coupling 721 to mechanically couple the printhead to a printhead module. The printhead can include an electrical coupling 741 for electrical connecting to the printhead module.

Figure 7D:
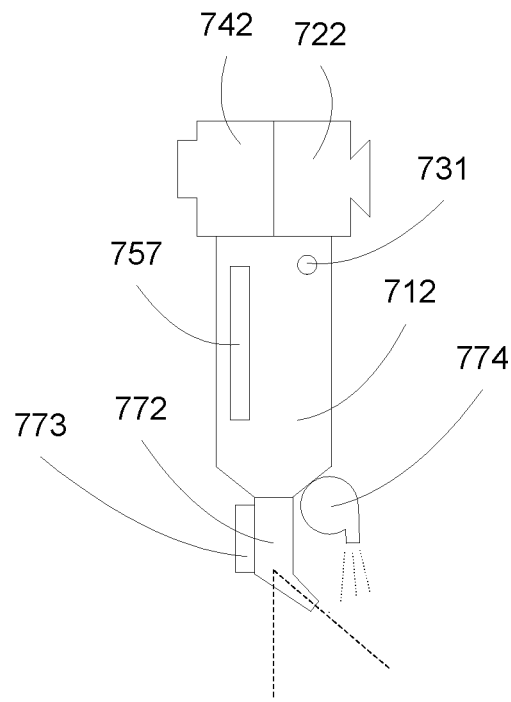

FIG. 7D shows a filament extruded printhead with a tilted nozzle together with a fan for cooling the extruded filament. The tilted nozzle can be configured to print a tilted line, thus might need to be quickly cooled, for example, by the fan. A printhead 712 can have a nozzle 773 that forms an angle with the vertical direction. Other components can be included, such as a motor (not show), heater 757 for heating the printhead body 712, heater 773 for heating the tilted nozzle 772, temperature measurement element 731, and fan 774 directed toward the extruded filament. The printhead can include a mechanical coupling 722 to mechanically couple the printhead to a printhead module. The printhead can include an electrical coupling 742 for electrical connecting to the printhead module.

FIGS. 8A-8D illustrate printhead configurations according to some embodiments. FIG. 8A shows a schematic of a filament extruded printhead, which can accept a filament 835 to a printhead nozzle 810. A heater can be included to heat the printhead nozzle to a temperature that can melt or soften the filament. A thermocouple or a thermistor can be coupled to the printhead nozzle to monitor the temperature of the printhead nozzle. A motor 830 can be used to push the filament 835 into the printhead nozzle 810. An additional element 860, such as a blower and/or a vacuum pump, can be included to clean debris generated by the motor pressing on the filament. The printhead can include a mechanical coupling 820, which is attached to a printhead body. The mechanical coupling 820 can be used to mechanically couple the printhead to a printhead module. The printhead can include an electrical coupling 840 for electrical connecting to the printhead module.

FIG. 8B shows a schematic of a filament extruded printhead, which can include an agitation element 861 for vibrating the filament in a printhead nozzle 811. The printhead can include a mechanical coupling 821, which can be used to mechanically couple the printhead to a printhead module. The printhead can include an electrical coupling 841 for electrical connecting to the printhead module.

FIG. 8C shows a schematic of a filament extruded printhead, which can include a lamp 862 for providing a light 872, such as an IR or an UV light to the extruded filament in a printhead nozzle 812. The printhead can include a mechanical coupling 822, which can be used to mechanically couple the printhead to a printhead module. The printhead can include an electrical coupling 842 for electrical connecting to the printhead module.

FIG. 8C shows a schematic of a filament extruded printhead, which can include a laser 863 for providing a laser beam 873 to the extruded filament in a printhead nozzle 813. The printhead can include a mechanical coupling 823, which can be used to mechanically couple the printhead to a printhead module. The printhead can include an electrical coupling 843 for electrical connecting to the printhead module.

FIGS. 9A-9D illustrate printhead configurations according to some embodiments. FIG. 9A shows a schematic of a filament extruded printhead, which can accept multiple filaments 930 and 932 to a printhead nozzle 910. A heater 935 can be included to heat the printhead nozzle to a temperature that can melt or soften the filament. A thermocouple or a thermistor can be coupled to the printhead nozzle to monitor the temperature of the printhead nozzle. Multiple motors can be used to push the filaments into the printhead nozzle 910. The printhead can include a mechanical coupling 920, which is attached to a printhead body. The mechanical coupling 920 can be used to mechanically couple the printhead to a printhead module. The printhead can include an electrical coupling 940 for electrical connecting to the printhead module.

FIG. 9B shows a schematic of a paste extruding printhead, which can accept a paste like material 951 to a printhead nozzle 911. A heater 952 can be included to heat the printhead nozzle. A plunger 950 can be used to push the paste 951 into the printhead nozzle 910. The printhead can include a mechanical coupling 921, which can be used to mechanically couple the printhead to a printhead module. The printhead can include an electrical coupling 941 for electrical connecting to the printhead module.

FIG. 9C shows a schematic of a liquid extruding printhead, which can accept a liquid 961 from a reservoir 960 to a printhead nozzle 912. A heater 963 can be included to heat the printhead nozzle. A motor 962 can be used to push the liquid into the printhead nozzle 912. The printhead can include a mechanical coupling 922, which can be used to mechanically couple the printhead to a printhead module. The printhead can include an electrical coupling 942 for electrical connecting to the printhead module.

Other printhead configurations can be included, which can be used for cutting, painting, and milling, instead of printing.

Figure 10A:
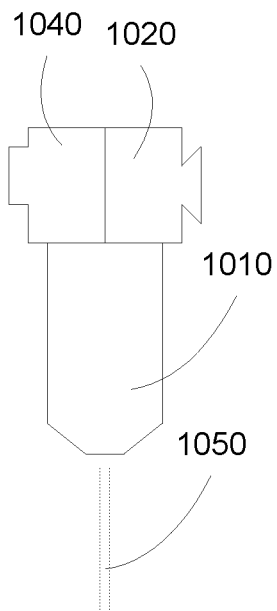
FIGS. 10A-10D illustrate printhead configurations according to some embodiments.

FIGS. 10A-10D illustrate printhead configurations according to some embodiments. FIG. 10A shows a laser cutter head, which includes a laser assembly 1010 for emitting a laser beam 1050. The printhead can be used for cutting materials off a workpiece. The printhead can include a mechanical coupling 1020, which can be used to mechanically couple the printhead to a printhead module. The printhead can include an electrical coupling 1040 for electrical connecting to the printhead module.

Figure 10B:
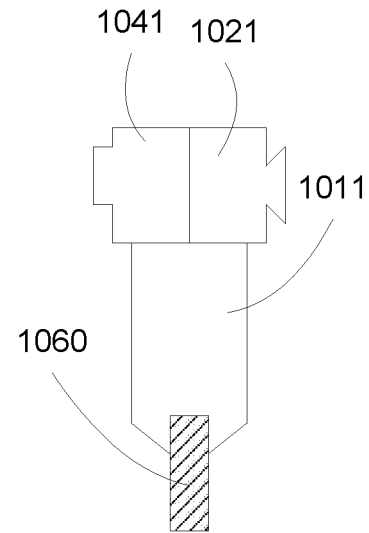

FIG. 10B shows a computer numerical control (CNC) head, which includes a holder assembly 1011 for supporting a CNC bit 1051, such as a drill bit or a mill bit. The printhead can be used for milling or cutting materials off a workpiece. The printhead can include a mechanical coupling 1021, which can be used to mechanically couple the printhead to a printhead module. The printhead can include an electrical coupling 1041 for electrical connecting to the printhead module.

Figure 10C:
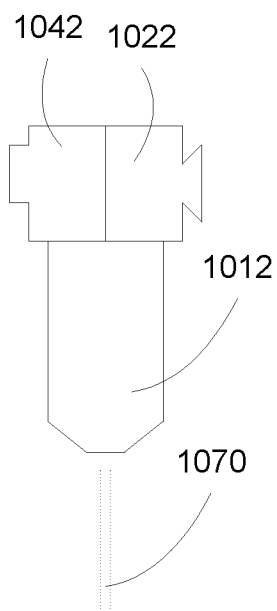

FIG. 10C shows an inkjet head, which includes an inkjet 1012 for emitting droplets 1070 of liquid, for example, for printing. The printhead can be used for printing on a workpiece. The printhead can include a mechanical coupling 1022, which can be used to mechanically couple the printhead to a printhead module. The printhead can include an electrical coupling 1042 for electrical connecting to the printhead module.

Figure 10D:
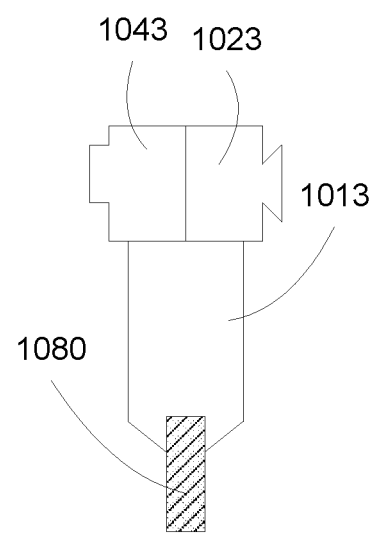

FIG. 10D shows a pen plotter head, which includes a holder assembly 1013 for supporting a pen 1080. The printhead can be used for writing on a workpiece. The printhead can include a mechanical coupling 1023, which can be used to mechanically couple the printhead to a printhead module. The printhead can include an electrical coupling 1043 for electrical connecting to the printhead module.

In some embodiments, the present invention discloses multiple platforms for 3D printing, which can be exchangeably installed in a base system of a 3D printer system. For example, the platforms can include horizontal platforms, vertical platforms, platforms with watermarks, and clamping platforms.

FIGS. 11A-11D illustrate platform configurations in a modular system according to some embodiments. FIG. 11A shows a horizontal flat platform configuration, which can include a platform 1130 for supporting a printed material 1150 from a 3D printhead 1110. A heater 1120 can be used to heat the platform 1130. A mechanical coupling and an electrical coupling can be included to mechanically and electrically couple the platform to a base system, such as a 3D printer system with exchangeable platform.

FIG. 11B shows a horizontal flat platform configuration with a watermark, which can include a platform 1131 for supporting printed materials. Watermark 1160 can be formed on a surface of the platform 1131. A heater 1121 can be used to heat the platform 1131. A mechanical coupling and an electrical coupling can be included to mechanically and electrically couple the platform to a base system, such as a 3D printer system with exchangeable platform.

FIG. 11C shows a flat platform configuration, which can include a horizontal platform 1132 and a vertical platform 1133. The vertical platform can be used for supporting printed materials from a tilted nozzle 1142 of a printhead 1112. Optional watermarks 1161 and 1162 can be included on the surfaces of the platforms 1132 and 1133. Heaters 1121 and 1122 can be used to heat the platforms 1132 and 1133. A mechanical coupling and an electrical coupling can be included to mechanically and electrically couple the platform to a base system, such as a 3D printer system with exchangeable platform.

FIG. 11D shows a clamp platform configuration, which can include a clamp mechanism 1123 for clamping on a workpiece 1151. A printhead 1113 can be used to print on a surface, e.g., the top flat surface, of the workpiece 1151. The clamp platform can be used for supporting existing workpiece, e.g., for the printhead 1113 to print on a surface of an existing workpiece. The clamping platform can support irregular workpiece, together with supporting large workpiece, since a portion of the workpiece can be placed outside of the printable area. A mechanical coupling and an electrical coupling can be included to mechanically and electrically couple the platform to a base system, such as a 3D printer system with exchangeable platform.

In some embodiments, the present invention discloses printheads for used in a system, such as a 3D printer system. The printheads can be used directly in the system. The printheads can have a mechanical interface and an electrical interface to be used in a modular system, e.g., as exchangeably printheads in a printhead module of a 3D printer system. The interfaces can be configured to be mated with a printhead module, e.g., one or more printheads can be installed in a printhead module with mated mechanical and electrical interfaces. Serial bus, such as CAN bus, can be used for electrical communication between the printheads and the printhead module (and also the 3D printer system). The printheads can include information to allow automatic configuration, e.g., the printhead can send information related to the printhead physical characteristics and functionalities, so that a system controller can control the printheads.

The modular system can thus be configured for different job requirements by selecting the printheads suitable for the job. The selection can be performed manually by an operator, or can be performed automatically, for example, through a printhead exchange module. In the present specification, the printheads can be shown with or without the interfaces with a printhead module. However, it is understood that interfaces are implied, and thus an exchangeable printhead can have both mechanical and electrical interfaces for mating with the printhead module.

In some embodiments, the printheads can be used independently, e.g., without the mechanical and/or electrical interfaces. A printhead can be used in a 3D printer system, e.g., secured to the 3D printer system without the removable interfaces.

In some embodiments, the present invention discloses printheads having a nozzle outlet with different shapes. The nozzle can deliver materials having different cross sections, such as round, oval, rectangular, or cross, with different dimensions. For example, cross pattern can create tie points that go through the build plate. The cross pattern can reduce the lift off problem in which the plastic bungs that go through the build plate would shear off easily with a razor blade.

Figure 12A:
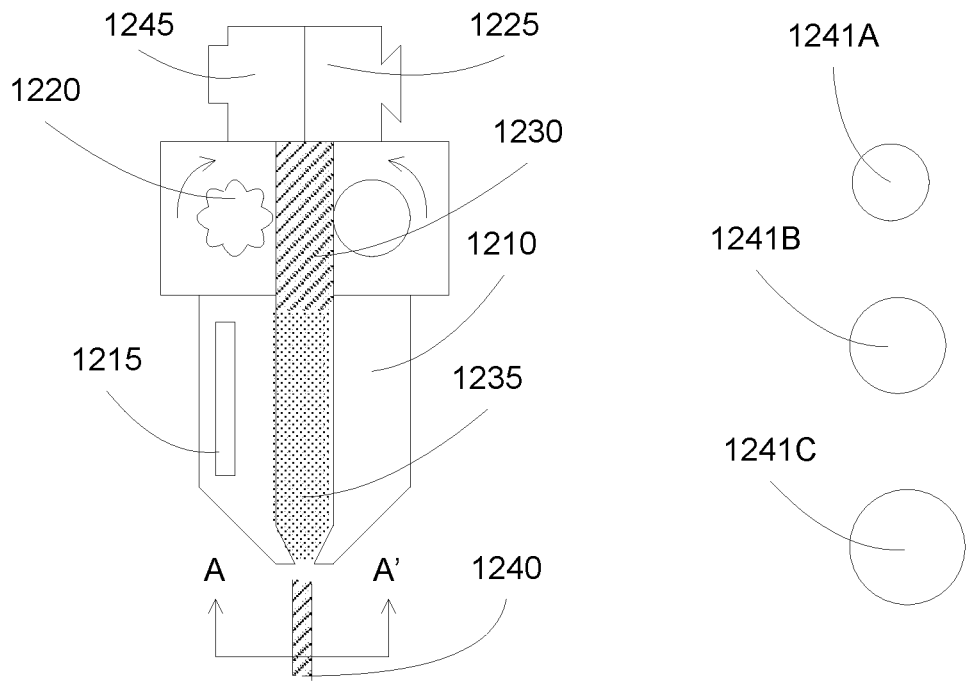
FIGS. 12A-12B illustrate printheads having different nozzle patterns according to some embodiments.
Figure 12B:
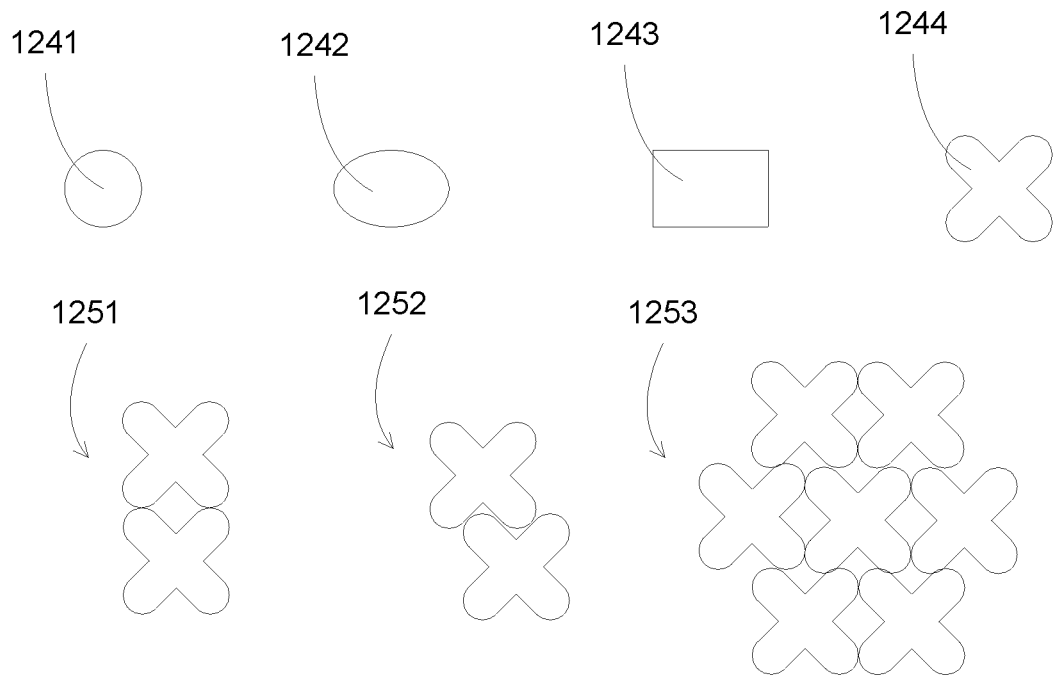

FIGS. 12A-12B illustrate printheads having different nozzle patterns according to some embodiments. In FIG. 12A, a printhead 1210 can include a heater 1215 for heating the material delivered to the printhead. Printing material, such as plastic filament 1230, can be driven into the printhead by a rotating gear mechanism 1220. At the heated printhead 1210, the plastic filament 1230 can be melted to become molten plastic 1235. The molten plastic 1235 can be driven out of the printhead, for example, through a nozzle at the end of the printhead. The material 1240, out of the printhead, can be deposited on a heated platform. The printhead can include a mechanical interface 1225 and an electrical interface 1245.

FIG. 12B shows various cross sections AA' of the printed material 1240, generated by different nozzles at the end of the printhead. The cross section of the material 1240 can be circular 1241, oval 1242, rectangle 1243, or cross 1244. In some embodiments, the cross pattern 1244 can be used on top of each other 1251, or offset from each other 1252 or 1253. The nozzles can generate materials having cross section with various sizes and dimensions, as shown, for example, in different circles 1241A, 1241B, and 1241C with different diameters.

In some embodiments, different types of filaments can be installed in the printheads, so that the printer system can be configured to print different materials. Similarly, filaments with different colors can also be installed in the printheads, so that the printer system can be configured to print different colors.

In some embodiments, the present invention discloses 3D printer systems and methods that can form overhang features without a temporary support structure. The systems can include a print head having a nozzle that forms an angle with the support surface. For example, in a linear xyz printer system, the print head can move in a vertical z direction, e.g., up and down from the support table. The support table can move in horizontal x and y directions. Thus multiple xy plane layers can be formed on each other in the z direction to form the 3D printed object. In some embodiments, the nozzle can form an angle with the vertical z direction, e.g., forming an angle with the normal direction of the support table.

FIG. 13 illustrates 3D printer systems and printheads according to some embodiments. A print head can include an extrusion head 1310 having a heater 1315 for heating the extruded material that is supplied to the extrusion head 1310. A nozzle 1340 can be coupled to the extrusion head 1310, having a nozzle that forms an angle 1345 with the support table 1330. A heater 1335 can be couple to the support table 1330 for heating the table surface. The printhead can include a mechanical interface and an electrical interface (not shown), to be installed exchangeably in a printhead module of the 3D printer system.

The nozzle 1340 and the extrusion head 1310 can be coupled together with the heater 1315 heating the material in the extrusion head. Alternatively, the nozzle and the extrusion head can form an integrated head, for example, the heater 1315 can head the material in both the extrusion head and the nozzle.

The print head can be moved in a vertical direction to form a vertical wall 1320. For example, a first line can be formed, followed by a second line directly disposed on the first line. The lines can be directly placed on top of each other to form a vertical wall 1320.

The print head can be moved in a horizontal direction to form a horizontal wall 1360, e.g., an overhang feature. Due to the angled nozzle, horizontal lines can be bonded to each other to form the horizontal wall 1360. Walls having other angles can also be printed with the angled nozzle.

FIGS. 14A-14F show different print head nozzles. The printhead can include a mechanical interface and an electrical interface (not shown), to be installed exchangeably in a printhead module of the 3D printer system. A print head 1410 can have a nozzle 1441 forming an acute angle 1451, e.g., less than 90 degrees or less than 45 degrees, with the support platform, e.g., with the normal direction of the platform (FIG. 14A). The print head can have a nozzle 1442 forming a 45 degree angle 1452 with the support platform (FIG. 14B). The print head can have a nozzle 1443 forming an angle 1453 of less than 90 degrees with the support platform (FIG. 14C).

The print head can have a nozzle 1444 forming a square angle 1454, e.g., perpendicular to the support platform or parallel to the surface of the platform (FIG. 14D). The print head can have a nozzle 1445 or 1446 forming obtuse angle 1455 or 1456, e.g., greater than 90 degrees, with the support platform (FIG. 14E showing an angle between 90 and 145 degrees, and FIG. 14F showing an angle of about 145 degrees).

In some embodiments, the nozzle can form an angle between 30 and 150 degrees, e.g., the nozzle can be downward or downward pointing with an angle greater than 30 degrees. In some embodiments, the nozzle can form an angle between 45 and 145 degrees. In some embodiments, the nozzle can form an angle between 45 and 90 degrees.

Figure 15A:
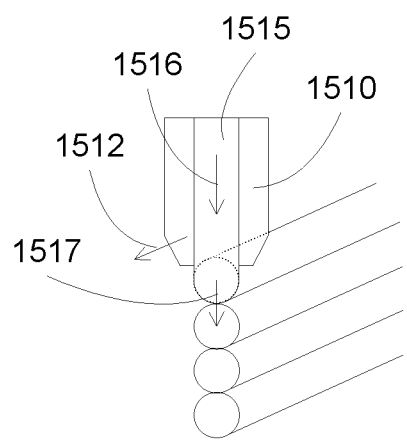
FIGS. 15A-15D illustrate a schematic mechanism for forming overhang features without support structures according to some embodiments.

FIGS. 15A-15D illustrate a schematic mechanism for forming overhang features without support structures according to some embodiments. In some embodiments, a nozzle 1510 pointed to a vertical direction can accept a material 1515. The material 1515 can be pushed along the direction 1516, for example, through a screw head, of the nozzle 1510, e.g., extruding on the surface of the object. In FIG. 15A, the nozzle head 1510 can be directly positioned on previously deposited lines to form a vertical wall, e.g., by moving the nozzle 1510 in the direction 1512 along the length of the lines. When the newly extruded material is pushed from the nozzle, a perpendicular force 1517 can be exerted, which can be in a same direction as the pushing direction 1516 of the extruded material. The force 1517 can cause the new material to adhere to the existing material, forming a solid vertical wall.

Figure 15B:
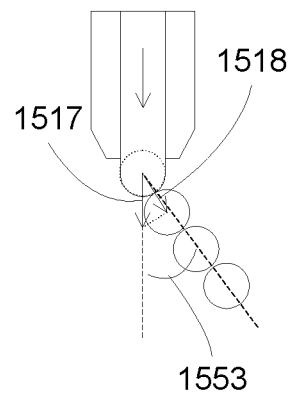

In FIG. 15B, the nozzle head 1510 can form an angle 1553 with the previously deposited lines to form a titled wall. When the newly extruded material is pushed from the nozzle, a perpendicular force 1517 can be exerted, which can be in a same direction as the pushing direction of the extruded material. The force 1517 can have a component 1518 that cause the new material to adhere to the existing material. If the angle 1553 is large, for example, greater than 90 degrees, the adhesion force component 1518 is zero, and thus the new deposited line does not adhere to the previous lines. In general, an angle of less than 45 or less than 30 degrees can be used, with smaller angle resulting in better adhesion of the printed lines, e.g., non collapsed overhang features.

Figure 15C:
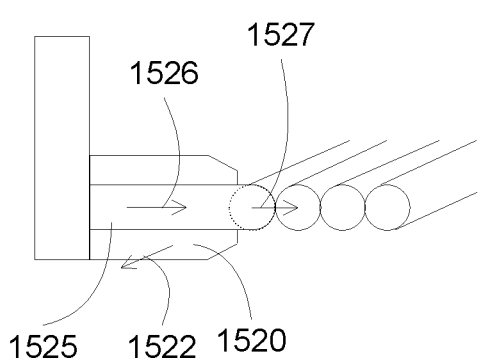

In some embodiments, the nozzle can form an angle with the support platform. A nozzle 1520 pointed to any direction can accept a material 1525. The material 1525 can be pushed along the direction 1526 of the nozzle 1520, e.g., extruding on the surface of the object. In FIG. 15C, the nozzle head 1520 can be horizontal, e.g., pointed to a horizontal direction. The nozzle can deliver material directly on previously deposited horizontal lines to form a horizontal wall, e.g., by moving the nozzle 1520 in the direction 1522 along the length of the lines. When the newly extruded material is pushed from the nozzle, a perpendicular force 1527 can be exerted, which can be in a same direction as the pushing direction 1526 of the extruded material. The force 1527 can cause the new material to adhere to the existing material, forming a solid horizontal wall.

Figure 15D:
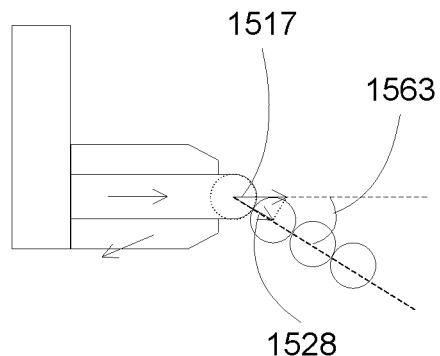

In FIG. 15D, the nozzle head 1520 can form an angle 1563 with the previously deposited lines to form a titled wall. When the newly extruded material is pushed from the nozzle, a perpendicular force 1527 can be exerted, which can be in a same direction as the pushing direction of the extruded material. The force 1527 can have a component 1528 that cause the new material to adhere to the existing material. If the angle 1553 is large, for example, greater than 90 degrees, the adhesion force component 1528 is zero, and thus the new deposited line does not adhere to the previous lines. In general, an angle of less than 45 or less than 30 degrees can be used, with smaller angle resulting in better adhesion of the printed lines, e.g., non collapsed overhang features.

In some embodiments, a nozzle can print an overhang feature of less than 45 or less than 30 degrees with respect to the printing direction of the nozzle. Thus a vertical nozzle, e.g., a nozzle perpendicular to the support surface can form overhang structure at angles less than 45 or 30 degrees. The angle can also depend on the size of the overhang. For example, a short overhang of less than a few millimeters, e.g., less than 10 or less than 5 mm, can be printed with large overhang angles, e.g., less than 45 degrees. Longer overhang features of centimeter size, e.g., less than 10 or less than 5 cm, can be printed with smaller overhang angles such as less than 30, 20 or less than 10 degrees.

In some embodiments, the present invention discloses a print head having nozzle forming an angle with the normal direction of the support surface. The angled nozzle can allow printing overhang with higher angles for long overhang features. For example, a nozzle having a tilted angle of 45 degrees can print very long overhangs that form 30 to 70 degrees, or long overhangs that form 15 to 85 degrees. Other tilted angles can be used, such as 90 degree tilted nozzle, which can print overhangs of 75 to 105 degrees. In some embodiments, a mechanism can be provided to adjust the angle of the nozzle, allowing printing different angle overhangs.

Figure 16A:
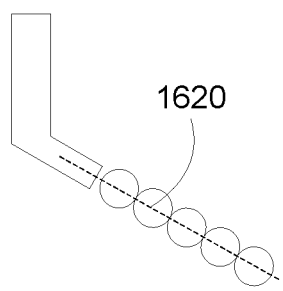
FIGS. 16A-16C illustrate overhang features for a tilted nozzle according to some embodiments

In FIG. 16A, a tilted nozzle can print an overhang feature 1620 having a same tilted angle. For example, if the nozzle is tilted 60 degrees, e.g., forming 60 degrees with the support surface, the nozzle can print an overhang tilted 60 degrees.

Figure 16B:
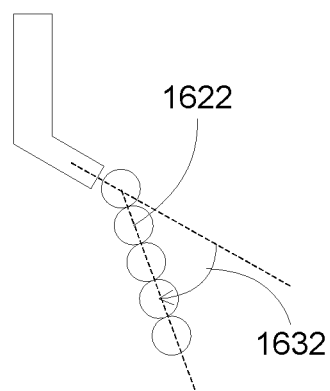
Figure 16C:
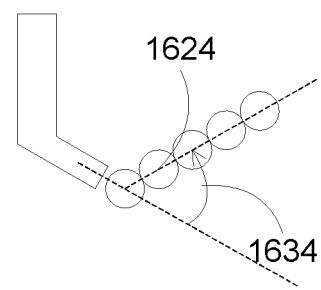

In FIGS. 16B and 16C, the nozzle can also print an overhang with an angle offset from the tilted angle of the nozzle. The overhang 1622 can have a downward offset angle 1632, e.g., clockwise or negative angle. The overhang 1624 can have an upward offset angle 1634, e.g., counterclockwise or positive angle. The offset angle 1632 can be larger than the offset angle 1634 due to gravitational force. For example, the tilted nozzle can always print a vertical wall regardless of the tilted angle of the nozzle, since the printed lines are assisted by gravity to adhere to each other.

Figure 17A:
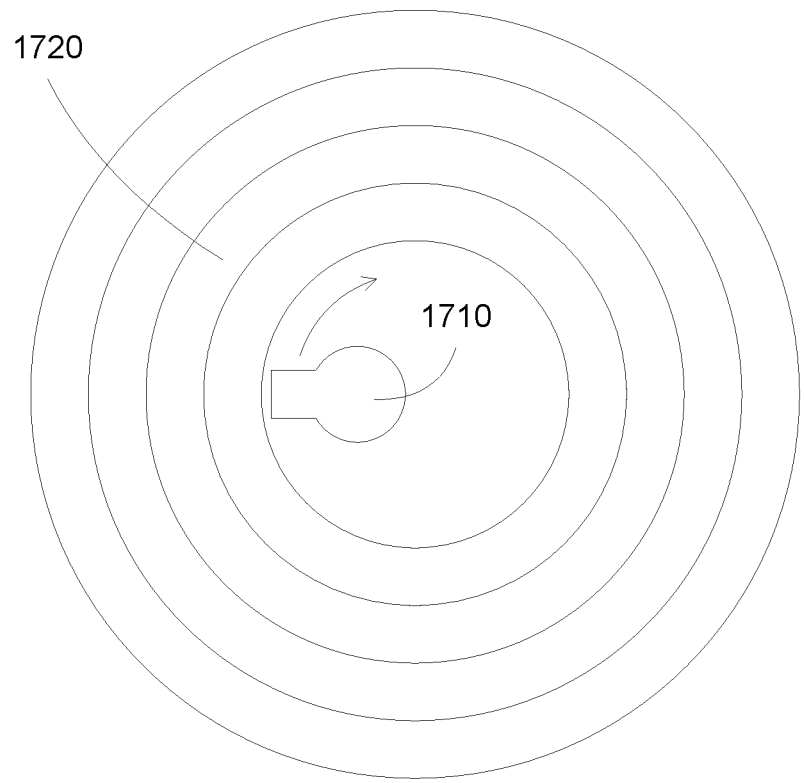
FIGS. 17A-17B illustrate a printing process of a horizontal overhang according to some embodiments.
Figure 17B:
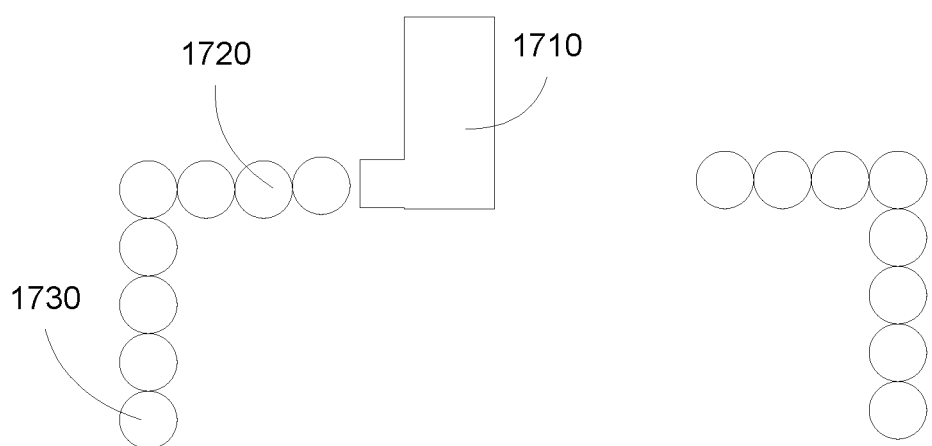

FIGS. 17A-17B illustrate a printing process of a horizontal overhang according to some embodiments. FIG. 17A shows a top view and FIG. 17B shows a cross section view. A tilted nozzle 1710 having 90 degree tilted angle can be used to print horizontal overhang feature such as a horizontal surface. The tilted nozzle 1710 can be used to print vertical surface 1730, for example, by moving in multiple circles. At the top of the vertical surface, the horizontal surface 1720 can be printed. The adhesion of the horizontal wall can be provided through the extruded force through the nozzle.

In some embodiments, the nozzle is configured to be movable, such as rotating around the print head axis through the control of a controller. The controllable rotatable nozzle can allow printing materials at different directions, such as horizontal circular lines to form a horizontal overhang surface of a cylinder. The nozzle can be rotatable while the print head is stationary, or both nozzle and print head are rotatable, with respect to a feature coupled to a movement mechanism for moving the print head.

Figure 18A:
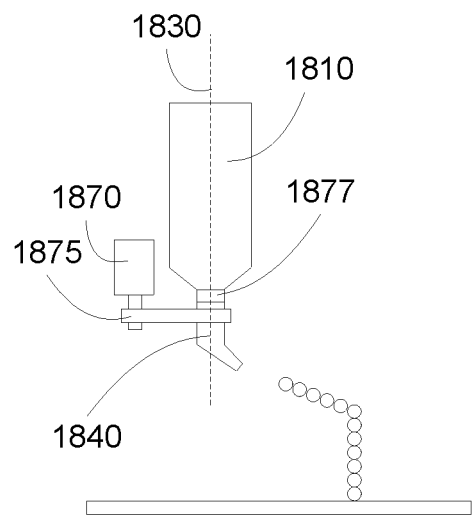
FIGS. 18A-18B illustrate rotatable nozzles according to some embodiments.
Figure 18B:
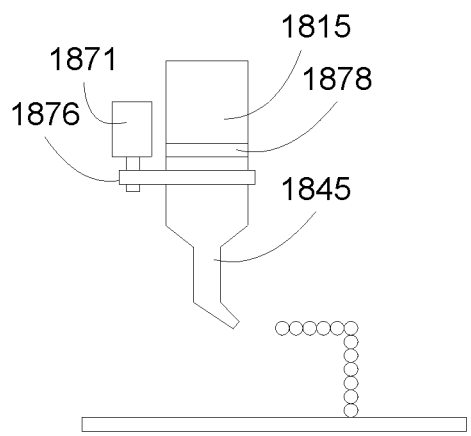

FIGS. 18A-18B illustrate rotatable nozzles according to some embodiments. In FIG. 18A, a nozzle 1840 can be coupled to a print head 1810 through a rotatable seal 1877. A motor 1870 can be coupled to the print head 1810. The motor 1870 can be operable to rotate the nozzle 1840 through the axis 1830 of the print head, for example, by a belt 1875. In FIG. 18B, a nozzle 1845 can be coupled to a print head 1815 through a rotatable seal 1878. A motor 1871 can be coupled to the print head 1815. The motor 1871 can be operable to rotate the nozzle 1845 through the axis of the print head, for example, by a belt 1876.

In some embodiments, the nozzle is configured to be movable with respect to the tilted angle, such as rotating to change the tilted angle of the nozzle. The movement can be manually, or can be controlled by a controller. The adjustable tilted nozzle can allow printing overhang features having different overhang angles. The nozzle angle can be continuously adjustable, e.g., rotatable through a motor, or can be incrementally adjustable, e.g., rotatable through a pneumatic or hydraulic cylinder.

Figure 19A:
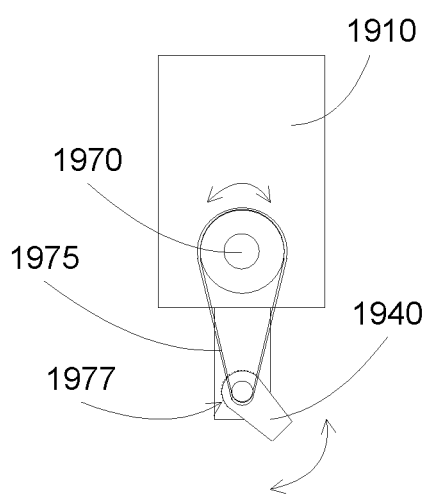
FIGS. 19A-19B illustrate rotatable nozzles according to some embodiments.
Figure 19B:
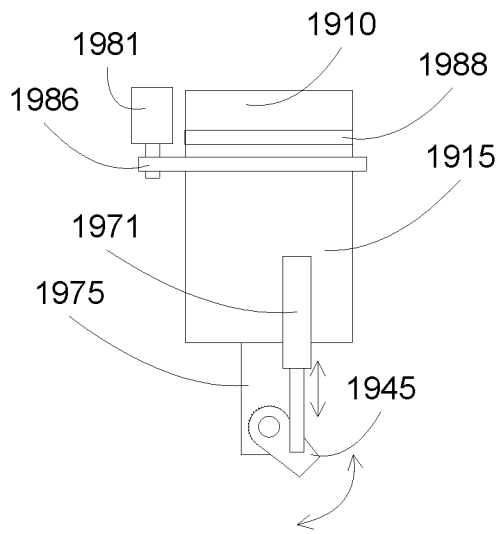

FIGS. 19A-19B illustrate rotatable nozzles according to some embodiments. In FIG. 19A, a nozzle 1940 can be coupled to a print head 1910 through a rotatable seal 1977. A motor 1970 can be coupled to the print head 1910. The motor 1970 can be operable to rotate the nozzle 1940, for example, by a belt 1975, to change the tilted angle of the nozzle. In FIG. 19B, a nozzle 1945 can be coupled to a print head 1915. A linear mechanism, e.g., a cylinder 1971, a linear motor or any linear movement mechanism, can be coupled to the print head 1915. The cylinder 1971 can be operable to rotate the nozzle angle, e.g., changing the angle of the nozzle by extending or contracting the cylinder.

The nozzle or print head can additional be rotatable from an axis of the print head. For example, a nozzle 1945 can be coupled to a support feature 1910 through a rotatable seal 1988. A motor 1981 can be coupled to the print head 1915. The motor 1981 can be operable to rotate the nozzle 1945 through the axis of the print head, for example, by a belt 1986.

In some embodiments, the nozzle can be remotely heated, e.g., the materials inside the nozzle can be heated by a wireless mechanism, such as an infrared heater or an inductive coupled heater. The material can be heated in the extruder head, and then can be pushed through the nozzle to the support table. The nozzle can be heated, for example, to prevent the material from solidifying. Since the nozzle is movable, a wireless heater can be used.

Figure 20A:
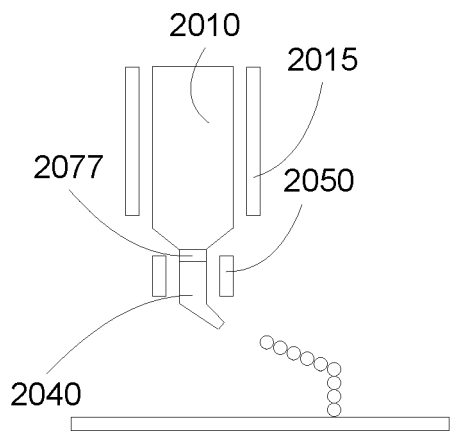
FIGS. 20A-20B illustrate printheads having remote heaters for the nozzle according to some embodiments.
Figure 20B:
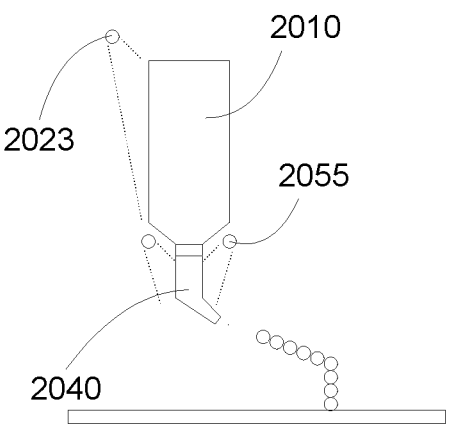

FIGS. 20A-20B illustrate printheads having remote heaters for the nozzle according to some embodiments. A rotatable nozzle 2040 can be coupled to a print head 2010 through a seal 2077. In FIG. 20A, a heater 2015 can be used to heat the print head 2010. Heater 2050 can be used to heat the nozzle 2040. Heater 2050 can be an inductive coupled heater, which can allow the nozzle 2040 to move freely. In FIG. 20B, infrared lamp heater can be used to heat the nozzle and print head. For example, an IR heater 2023 can be used to heat the print head 2010. An IR heater 2055 can be used to heat the nozzle 2040.

FIGS. 21A-21B illustrate flow charts for operating print heads having a tilted nozzle according to some embodiments. The tilted nozzle can have a fixed tilted angle. In FIG. 21A, operation 2100 provides a nozzle coupled to a 3D print head. The nozzle forms an angle with an axis of the print head. For example, the print head can be pointed to a printing surface. The nozzle can form an angle with the pointed direction of the print head. In some embodiments, the nozzle is configured to deliver a material in a direction that forms an angle with a support structure. For example, the support structure can be in an xy plane, and the nozzle can form an angle with the z direction.

Operation 2110 prints a material on a surface. The nozzle forms an offset angle with the surface. The offset angle can allow the nozzle to print overhang features with large angles.

In some embodiments, a nozzle can be provided in a configuration that forms an angle with the normal direction of a support surface. The nozzle can deliver material at an angle to the support surface.

In FIG. 21B, operation 2130 rotates a nozzle coupled to a 3D print head. The nozzle is rotated to form an angle with the print head. The nozzle can be rotated to form an angle with a support surface. The rotation can be performed by a controller or by a manual operation. Operation 2140 prints a material on a surface. The nozzle forms an offset angle with the surface.

FIGS. 22A-22B illustrate flow charts for operating print heads having a tilted nozzle according to some embodiments. The tilted nozzle can have a fixed tilted angle. The nozzle can be rotated around an axis of the print head, e.g., facing 360 degrees around the print head. In FIG. 22A, the nozzle can print a straight line. The straight line can be a horizontal line or a vertically tilted line, e.g., an upward or downward line. Operation 2200 provides a nozzle coupled to a 3D print head. The nozzle forms an angle with an axis of the print head or a normal direction of a printing surface. Operation 2210 prints a material on a surface. The nozzle can be configured to face the same direction. The nozzle can be kept at a constant height, e.g., printing a horizontal line. The nozzle can move in a vertical direction (in addition to a horizontal direction), e.g., printing a tilted line.

In FIG. 22B, the nozzle can print a curved line. The curved line can be a horizontal line or a vertically tilted line, e.g., an upward or downward line. Operation 2230 provides a nozzle coupled to a 3D print head. The nozzle forms an angle with an axis of the print head or a normal direction of a printing surface. The nozzle is configured to face a direction. Operation 2240 prints a material on a surface while changing the direction of the nozzle. The nozzle can be kept at a constant height, e.g., printing a horizontal line. The nozzle can move in a vertical direction (in addition to a horizontal direction), e.g., printing a tilted line.

FIG. 23 illustrates a 3D printer system having a tilted nozzle and a cooling mechanism. A print head can include an extrusion head 2311 having an optional heater 2316 for heating the extruded material that is supplied to the extrusion head 2311. A nozzle 2350 can be coupled to the extrusion head 2311, having a nozzle that forms an angle 2355 with a support table 2330. A heater 2335 can be couple to the support table 2330 for heating the table surface.

The nozzle 2350 and the extrusion head 2311 can be coupled together with the heater 2316 heating the material in the extrusion head. Alternatively, the nozzle and the extrusion head can form an integrated head, for example, the heater 2316 can head the material in both the extrusion head and the nozzle. Alternatively, optional heater 2316 can head the material in the printhead and heater 2352 coupled to the nozzle can heat the material in the nozzle 2350.

The print head can be moved in a vertical direction to form a vertical wall 2321. For example, a first line can be formed, followed by a second line directly disposed on the first line. The lines can be directly placed on top of each other to form a vertical wall 2321. The print head can be moved in a horizontal direction to form a horizontal wall 2322, e.g., an overhang feature. Due to the angled nozzle, horizontal lines can be bonded to each other to form the horizontal wall 2322. Walls having other angles can also be printed with the angled nozzle.

The cooling mechanism, e.g., a cooling fan 2346, can be coupled to the printhead 2311, for example, to cool the printed material. The cooling fan 2346 can provide a cooling gas flow to the printed material, such as the overhang 2322, helping to cool the overhang material faster, thus preventing the overhang from being collapsed, for example, due to the gravitational force pulling the overhang downward, and due to the high temperature softening the overhang structure.

In some embodiments, the cooling mechanism can be configured to cool the printed material faster, thus assisting in solidify or strengthening the printed material and preventing the printed material from being collapsed or deformed. The cooling mechanism can be coupled to a tilted nozzle, and can assist in cooling faster an overhang structure.

FIGS. 24A-24C illustrate flow charts for printheads having a cooling mechanism according to some embodiments. In FIG. 24A, a printhead can be formed with a cooling mechanism. Operation 2400 couples a gas source to a 3D printhead. The gas source can be configured to cool printed materials with minimum effect on the 3D printhead. The gas source can be a blower with a flow focused mechanism to provide a confined air flow to the printed material and away from the heated portion of the printhead.

In FIG. 24B, an operation of a printhead can include cooling the printed material after depositing the material. Operation 2420 prints, by a 3D printhead, a material on a substrate. Operation 2430 cools the printed material without cooling the 3D printhead.

In FIG. 24C, an operation of a printhead can include cooling a printed overhang structure with a cooling mechanism right after printing the material. Operation 2450 prints, by a 3D printhead having a tilted nozzle, a material on a substrate. The material forms an angle with the substrate. Operation 2460 rapidly cools the printed material, for example, by a cooling mechanism, to secure the printed material to the substrate.

In some embodiments, the present invention discloses a 3D printer system having a temperature controlled platform, such as a platform that can be heated or cooled. The heated platform can be operable to assist in heating the printed material, for example, during the printing operation. The cooled platform can be operable to release the printed object from the platform, for example, by reducing the adhesion between the printed object and the cooled platform.

In some embodiments, the present invention discloses a printer system having a cleaning mechanism. During a printing process, especially a long printing process, debris can be generated, for example, at a filament moving mechanism of the printhead. The debris can interfere with the printing process, leading to less-than-optimum printing conditions or even faulty printing conditions. A cleaning mechanism can remove the debris, maintaining the printer at same printing conditions during the long printing process, leading to consistent quality of the printed object.

In some embodiments, the cleaning mechanism can include a blower for delivering a gas flow, or a vacuum hose for removing debris. The cleaning mechanism can be operated continuously, intermittently, or periodically during the printing process. The cleaning mechanism can be self cleaning, e.g., the blower or the vacuum hose can be configured to be automatically operated. For example, the blower or the vacuum hose can be integrated with the printhead, allowing automatic removal of debris without operator intervention. Alternatively, the blower or the vacuum hose can be installed at a park location, and the printhead can be periodically moved to the park location to be cleaned before returning to printing.

In some embodiments, the cleaning mechanism can include an exposure of the debris generated portion, such as a filament moving mechanism. The exposure can allow an operator to perform in-situ cleaning of the printhead, for example, by blowing or vacuum sucking generated debris that becomes visible through the exposure. The cleaning process can be performed during printing, or after the printhead moving to a park location.

A filament moving mechanism can generate debris in a printhead. For example, a printhead can include a filament moving mechanism for moving filament to an extrusion chamber. The filament moving mechanism can include rotating gears, driving solid filament portion to the extrusion chamber, in which the filament is heated to become molten or melted filament. The molten or melted filament can be driven out of the printhead, for example, through a nozzle at the end of the printhead. A printhead moving mechanism can be coupled to the printhead to move the printhead. The material, out of the printhead, can be deposited on a heated platform. The material can form solid 3D object, by a combination of movement of the printhead and the platform.

In the printhead, debris can be generated at a moving portion, such as at the filament moving mechanism. For example, the gear can be designed to exert a pressure on the filament while moving, with a pressure high enough to move the filament by friction. Further, to provide a consistent filament moving speed, high friction can be used between the gear and the filament. To enhance friction force, the gear can have teeth, such as sharp tips at the outer portion of the gear, to avoid slippage of the filament. For example, the sharp tips of the gear can bite into the filament, allowing the filament to move at a linear speed corresponded to the rotating speed of the gear. The engagement of the gear with the filament can generate debris after a certain operation time. The debris, if not removed, can affect the operation of the printhead. For example, the debris can coat the gear, smoothing the gear, and can generate slippage of the filament. The filament slippage can make the motion of the filament unpredictable, leading to poor printing conditions.

In some embodiments, the present invention discloses a cleaning mechanism for removing generated debris at a printhead. The cleaning mechanism can be integrated with the printhead for automatic cleaning, e.g., cleaning without an operator, such as in-situ cleaning, e.g., cleaning during the operation of the printhead.

In some embodiments, the cleaning mechanism can be directed at debris generating locations, such as at a moving portion of a filament moving mechanism, for example, at the interface between the gear and the filament.

In some embodiments, the cleaning mechanism can include a blower or a pressurized gas conduit for generating a gas flow, for example, at the gear, e.g., at the sharp tips of the gear, or at the gear/filament interface, e.g., at the places that debris is most likely generated. In some embodiments, the cleaning mechanism can include a vacuum pump or a vacuum hose, e.g., an area having low air pressure, for generating a suction, for example, at the gear or at the gear/filament interface. In some embodiments, the cleaning mechanism can include a gas conduit and a vacuum hose for both gas flowing and vacuum sucking of debris.

In some embodiments, the removal of debris can be configured to prevent the debris from falling into the heated extrusion chamber, such as collecting the debris by the vacuum hose. For example, a vacuum hose connected to a vacuum pump can be used to collect debris, and disposed at an area away from the built object or the built platform. A gas flow can be provided to assist in the dislodging of the debris. The vacuum hose can be configured to capture the flying debris, generated from the gas flow.

The debris removal can be configured to blow the debris to an area away from the printhead or from the built object or from the built platform. For example, the debris removal process can be performed after the printhead moves to a cleaning area, e.g., an area away from the built object, so that falling debris does not damage or contaminate the built object or the built platform.

FIGS. 25A-25B illustrate printheads having a cleaning mechanism according to some embodiments. FIG. 25A shows a side view of a printhead 2500, showing cross section of gears 2520 engaging with filament 2530. FIG. 25B shows another side view of a printhead 2500, showing the side section of gears 2520 which is coupled to a driving motor 2525. A cleaning mechanism including a gas flowing conduit 2560 can be coupled to the printhead 2500. The gas flowing conduit can be directed at an interface of the gear 2520 with the filament 2530, e.g., at the area 2550 most likely to form debris from the friction between the gear 2520 and the filament 2530. The gas flow from the cleaning mechanism 2560 can remove debris that is generated and attached to the sharp tips of the gear 2520. The gas flow can be directed away from the extrusion chamber 2510, for example, to prevent debris from contaminating the extrusion chamber.

FIGS. 26A-26C illustrate integrated printheads having cleaning mechanisms according to some embodiments. In FIG. 26A, a cleaning mechanism 2660 can include a blower, which can be coupled to a printhead 2600 for supplying a gas flow 2661 at an interface of gear 2620 with filament 2630. Alternatively, the cleaning mechanism 2660 can include a vacuum pump, which can be coupled to a printhead 2600 for sucking 2662 debris at an interface of gear 2620 with filament 2630.

In FIG. 26B, a cleaning mechanism 2665 can include a gas flow conduit or a vacuum hose. A blower or a vacuum pump can be stationary coupled to the printer system, such as at or near the platform. A flexible conduit can connect the stationary blower or vacuum pump with the moving printhead, to form a cleaning mechanism 2665 having gas flow conduit or vacuum hose conduit.

In some embodiments, both gas flow and vacuum suction can be integrated to the printhead. The gas flow can dislodge the debris, and the vacuum suction can remove the dislodged debris. In FIG. 26C, a cleaning mechanism can include a gas flow conduit 2666 providing a gas flow 2667 toward the moving portion of the filament moving mechanism. The cleaning mechanism can further include a vacuum hose conduit 2668 providing a vacuum suction 2669 at the moving portion of the filament moving mechanism. Other configurations can also be used, such as a blower instead of a gas flow conduit, and/or a vacuum pump instead of a vacuum hose.

In some embodiments, the printhead can be configured to expose a moving portion of the filament moving mechanism. The exposure can allow an operator to perform debris cleaning, for example, during a printing operation or when the printhead rests at a resting location between printing portions. The exposure can allow a separate cleaning mechanism, which is stationed at a cleaning location to perform the cleaning process. For example, between printing portions, e.g., a first print head can print a portion of the object, and then moves to the cleaning location to be cleaned while a second printhead continues to print a second portion of the object. The separate cleaning mechanism can lighten the load of the printhead, since the cleaning mechanism is not coupled to the printhead.

Figure 27A:
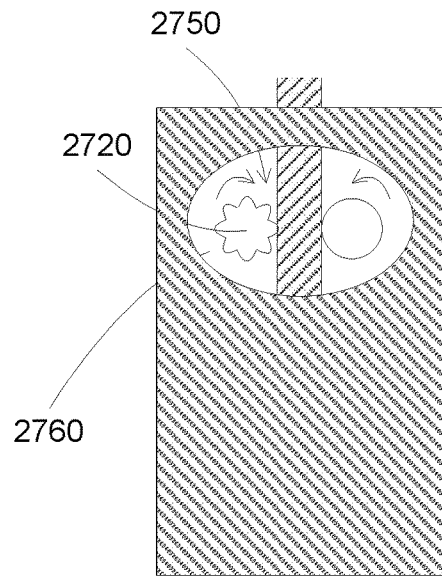
FIGS. 27A-27B illustrate printheads having exposure sections according to some embodiments.
Figure 27B:
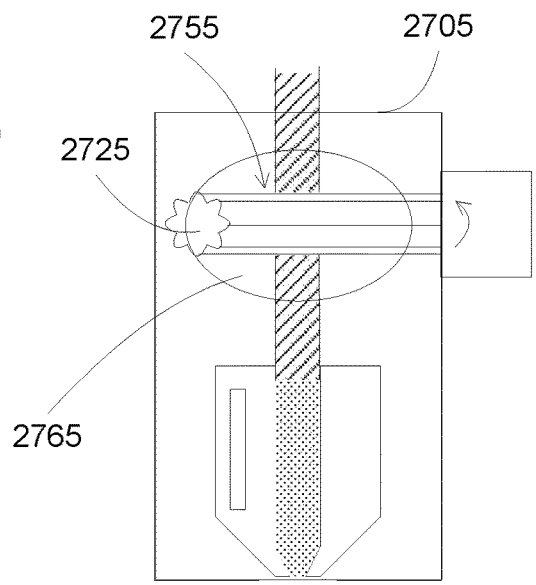

FIGS. 27A-27B illustrate printheads having exposure sections according to some embodiments. in FIG. 27A, a portion 2760 is cut from the printhead body 2700, exposing a cross section portion of gear 2720 at location 2750 where debris is likely to be generated and likely to need cleaning. In FIG. 27B, a portion 2765 is cut from the printhead body 2705, exposing a side section of gear 2725 at location 2755 where debris is likely to be generated and likely to need cleaning. An operator can clean the printhead, e.g., removing any debris at the moving portions of the printhead by flowing the debris away or by vacuuming the debris. Alternatively, the printhead can move to a cleaning station at which a blower or a vacuum pump can perform the cleaning.

In the description, a contact between moving gears and filament is described as a debris generating mechanism, which needs to be occasionally cleaned for optimum performance. However, the invention is not so limited, and other debris generating mechanisms in a printhead can also be considered, such as at the inlet of the extrusion chamber where the filament is inserted. In general, the present invention discloses a cleaning mechanism for a printhead, which is operable for removing debris that is generated during the operation of the printhead.

Figure 28A:
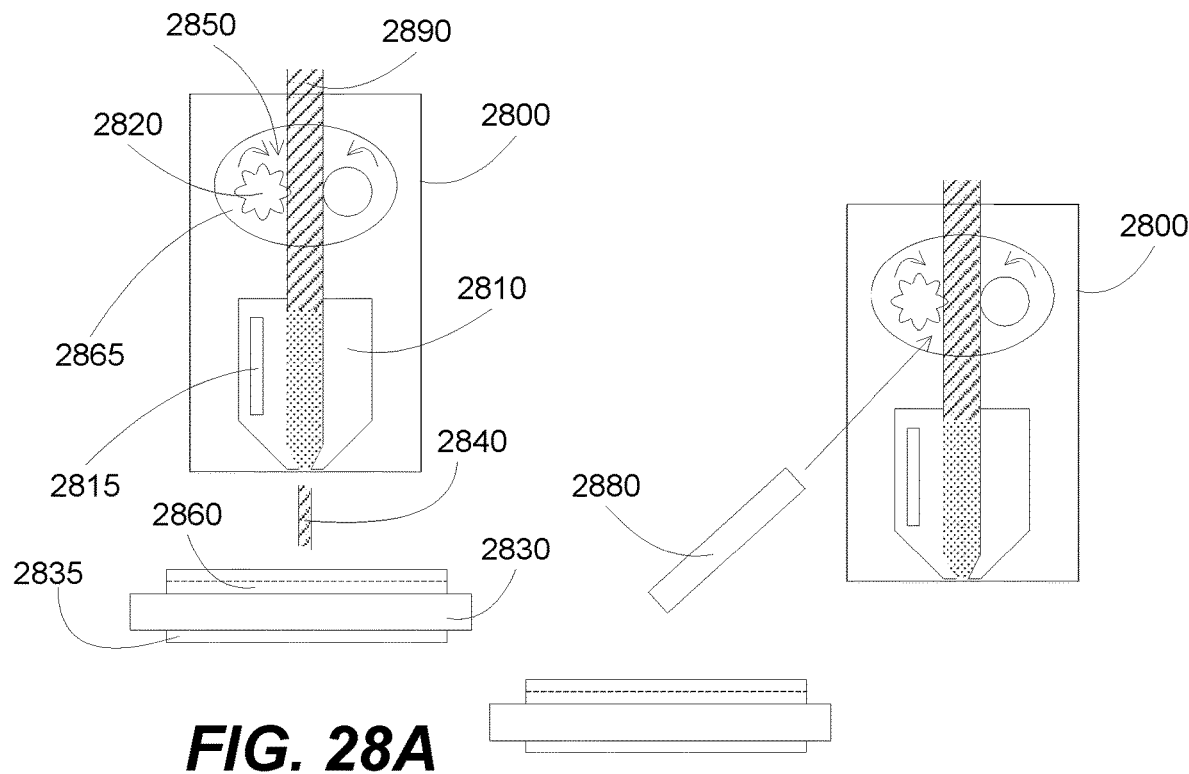
FIGS. 28A-28B illustrate a cleaning operation according to some embodiments.
Figure 28B:
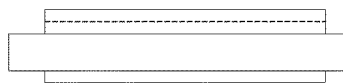

FIGS. 28A-28B illustrate a cleaning operation according to some embodiments. In FIG. 28A, a printhead 2800 can be used to print layers 2870 on a heated platform 2830, which is heated by an embedded heater 2835. A filament 2890 can be pulled into a heated extrusion chamber 2810 by a filament moving mechanism 2820. The filament moving mechanism can include gear with teeth for engaging with the filament, so that the rotation of the gear can correlate with the linear movement of the filament. The extrusion chamber 2810 can be heated by a heater 2815, melting the filament 2890. The melted material can be extruded out of the printhead to become output material 2840 before deposited as layer 2860 on the platform 2830.

The printhead 2800 can include exposure portion 2865, which shows the debris generation area 2850. During operation, e.g., when the filament is pulled by the filament moving mechanism 2820, some debris can be generated, for example, by the sharp tips of the gears in the filament moving mechanism.

In FIG. 28B, the printhead 2800 moves to a cleaning location, e.g., a location that is configured with a cleaning mechanism or a location that is away from the built object 2860 or the built platform 2830. At the cleaning location, the printhead can be cleaned by a debris cleaning mechanism 2880, such as a gas flow to blow away the generated debris or a vacuum suction to vacuum the generated debris. The printhead can be cleaned manually at the cleaning location by an operator, e.g., an operator can vacuum the debris, blow the debris, or blow and vacuum the debris. The printhead can be automatically cleaned at the cleaning location, e.g., a cleaning mechanism including a blower, a vacuum port, or both gas flow and vacuum suction can operate at the cleaning location to clean the printhead at the exposed portion.

In some embodiments, the present invention discloses a printhead having an integrated cleaning mechanism. The cleaning mechanism can include a gas flow (e.g., from a blower or a gas conduit coupled to a blower) and/or a vacuum suction (e.g., from a vacuum pump or a vacuum hose coupled to a vacuum pump), which is directed at a debris generated portion of the printhead, such as at a filament moving mechanism, for example, a rotating gear coupled to a filament for moving the filament toward an extrusion chamber.

FIGS. 29A-29B illustrate flow charts for printer systems having an integrated cleaning system according to some embodiments. In FIG. 29A, a printer system can include an integrated printhead, which has an active cleaning mechanism directed to a debris generating portion of the integrated printhead. The active cleaning mechanism can include a gas flow or a vacuum portion. Operation 2900 assembles a filament moving mechanism in a 3D printhead. Operation 2910 forms a gas flow or a vacuum suction at an interface portion of the filament moving mechanism with a filament.

In FIG. 29B, a printer system can include an integrated printhead, which has a passive cleaning mechanism directed to a debris generating portion of the integrated printhead. The passive cleaning mechanism can include an exposure of the debris generating portion, which can allow manual cleaning or automatic cleaning.

Operation 2930 assembles a filament moving mechanism in a 3D printhead. Operation 2940 exposes an interface portion of the filament moving mechanism with a filament.

FIGS. 30A-30B illustrate flow charts for operating printer systems having an integrated cleaning mechanism according to some embodiments. In FIG. 30A, a printhead can be cleaned during or after printing. Operation 3000 provides a 3D printer system having a filament moving mechanism. Operation 3010 cleans the filament moving mechanism during or after printing.

In FIG. 30B, an operator can manually clean the printhead during or after printing. Operation 3050 provides a 3D printhead having a filament moving mechanism. Operation 3060 manually cleans the filament moving mechanism to remove debris at the filament moving mechanism during or after printing FIGS. 31A-31B illustrate flow charts for operating printer systems having an integrated cleaning mechanism according to some embodiments. In FIG. 31A, a gas flow or vacuum suction can be used to clean the printhead. Operation 3100 provides a 3D printer system having a filament moving mechanism. Operation 3110 continuously, intermittently, or periodically supplies a gas flow or a vacuum suction to an interface portion of the filament moving mechanism with a filament. Operation 3120 prints, by the 3D printer system, a material on a platform.

In FIG. 31B, the printhead can move to a station where a gas flow or a vacuum suction can be applied toward the printhead for cleaning the printhead. Operation 3150 provides a 3D printhead having a filament moving mechanism. Operation 3160 prints, by the 3D printhead, a material on a platform. Operation 3170 moves the 3D printhead to a station for supplying a gas flow or a vacuum suction to an interface portion of the filament moving mechanism with a filament.

In some embodiments, the present invention discloses printhead assemblies, and methods to form and use the printhead assemblies, that include an agitation mechanism, such as a piezo element, that is configured to vibrate the printing material. The agitation mechanism can be operable to vibrate the printing material in the printhead, for example, before the printing material is printed on the platform. The vibration of the printing material can reduce adhesion of the material to the nozzle of the printhead, resulting in reducing potential blockage of the nozzle, for example, by unclogging the nozzle opening due to stuck materials. The vibration can reduce the surface tension of the material, which can provide a smoother deposited line of material on the platform. The smoother deposited lines can improve the surface characteristics of the printed objects, such as forming smoother surface and improving bonding between adjacent deposited lines.

The agitation mechanism can be coupled to the printhead, e.g., to the heated chamber or the nozzle that delivers materials to the platform. The agitation mechanism can be coupled to the printhead through a wave guide, for example, a component that is operable to guide the vibration generated by the agitation mechanism to the printhead. The agitation mechanism can be separated from the printhead by a thermal isolation component, for example, to prevent thermal damage to the agitation mechanism by the heated printhead.

In some embodiments, a printhead assembly can include a delivery assembly that is configured to accept a printing material and to deliver the printing material to a printhead, e.g., a nozzle for delivering the printing material to a platform. An agitation mechanism can be coupled to the printhead, for example, to agitate or to vibrate the printing material in the printhead.

In some embodiments, the agitation mechanism can include a piezo element, such as a piezoelectric transducer, e.g., a type of electroacoustic transducer device used to convert electrical signals into mechanical or acoustical signal. The piezo element can include a piezo material such as piezoelectric ceramics (such as PZT (lead zirconate titanate) ceramics) or single crystal materials.

In some embodiments, a printhead assembly can include a delivery assembly that is configured to accept a printing material and to deliver the printing material to a printhead, e.g., a nozzle for delivering the printing material to a platform. The printhead can be heated, for example, by a heater. A thermal isolation component can be used to separate the delivery assembly from the heated printhead.

An agitation mechanism can be coupled to the printhead, for example, through a coupling element. The coupling element can be a wave guide, which is operable to direct the vibration generated from the agitation mechanism to the printhead. The coupling element can be a thermal isolation element, which is operable to isolate the agitation mechanism from the heated printhead. The coupling element can include a wave guide and a thermal isolation element. Alternatively, the agitation mechanism can couple directly to the printhead.

Figure 32A:
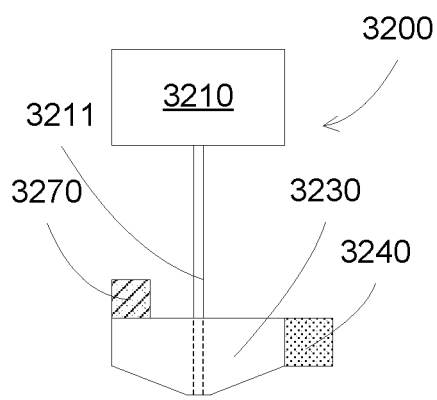
FIGS. 32A-32F illustrate various configurations of printhead assemblies according to some embodiments.

FIGS. 32A-32F illustrate various configurations of printhead assemblies according to some embodiments. Mechanical and electrical interfaces can be included so that the printheads can be exchangeably installed in a printhead module. FIG. 32A shows a printhead assembly 3200, which includes a delivery assembly 3210 providing a printing material 3211 to a printhead 3230. The printhead 3230 can be heated by a heater 3240. In addition, an agitation mechanism 3270 can be coupled directly to the printhead 3230. The agitation mechanism 3270 can include a piezo element, such as a piezoelectric material, which can accept an electrical signal from a power source and then convert to mechanical energy, vibrating the piezo element. The piezo element can vibrate the printhead 3230, resulting in agitating the printing material in the printhead. The vibration of the printing material can assist in separating the printing material from the printhead nozzle, in reducing the surface tension of the printing material, leading to smoother deposited lines and printed object surfaces.

Figure 32B:
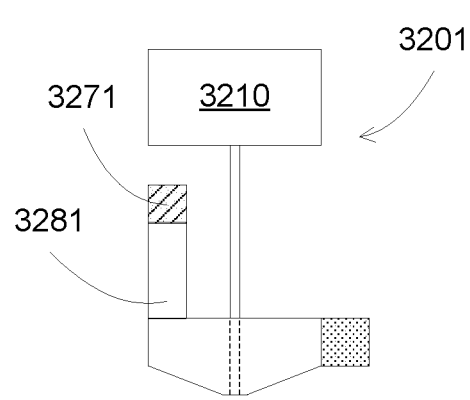

FIG. 32B shows a printhead assembly 3201, in which an agitation assembly 3271 is coupled to the printhead through a coupling element 3281, such as a wave guide, a thermal isolation element, or a wave guide doubling as a thermal isolation element, or a wave guide connected to a thermal isolation element.

Figure 32C:
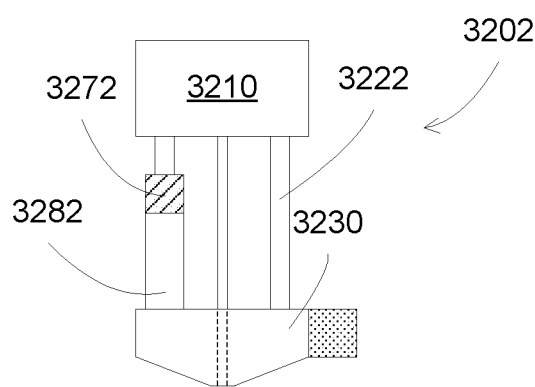

FIG. 32C shows a printhead assembly 3202, in which an agitation assembly 3272 is coupled to the printhead through a coupling element 3282, such as a wave guide, a thermal isolation element, or any combination thereof. A support element 3222 can be included to support the delivery assembly 3210 against the printhead 3230. For example, support element 3222 can include multiple cylinders or rods that are disposed surrounding the printing material path from the delivery assembly to the printhead. In some embodiments, the agitation mechanism 3272 can be coupled to the support element, such as forming a portion of the support element. The support element 3222 can have a shell configuration surrounding the printing material path.

Figure 32D:
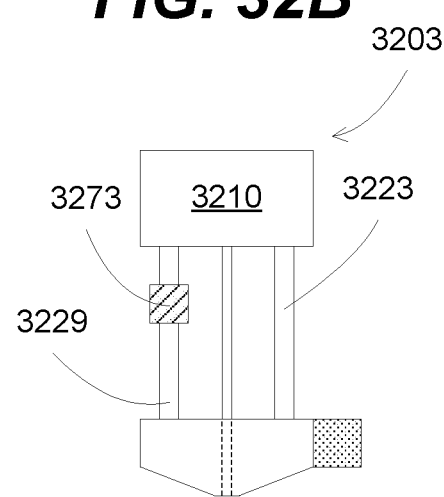

FIG. 32D shows a printhead assembly 3203, in which an agitation assembly 3273 is coupled to the printhead between a support element 3229. The vibration generated from the agitation element 3273 can pass through a portion of the support element 3229, e.g., the support element can act as a wave guide for the mechanical or acoustic vibration to travel to the printhead. Other support elements can also be included, such as support element 3223. Alternatively, the support element 3223/3229 can form a shell surrounding the printing material path, with the agitation mechanism 3273 coupled to a portion of the shell 3223/3229.

Figure 32E:
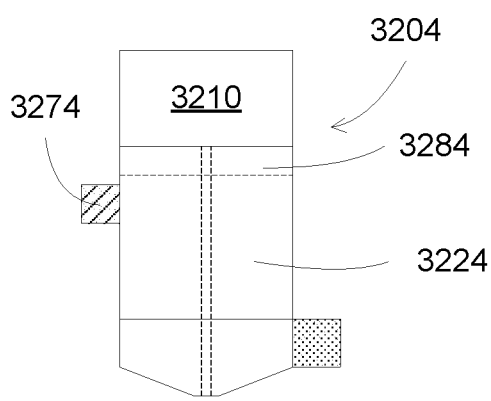

FIG. 32E shows a printhead assembly 3204, in which a thermal isolation or support element 3224 is used between the delivery assembly 3210 and the printhead 3230. The element 3224 can be large, covering the delivery assembly and the printhead areas. An agitation mechanism 3274 can be coupled to the element 3224, and can transfer the vibration energy to the printhead through the element 3224. An optional vibration isolation element 3284 can be used to limit or reduce the vibration energy from reaching the delivery assembly 3210.

Figure 32F:
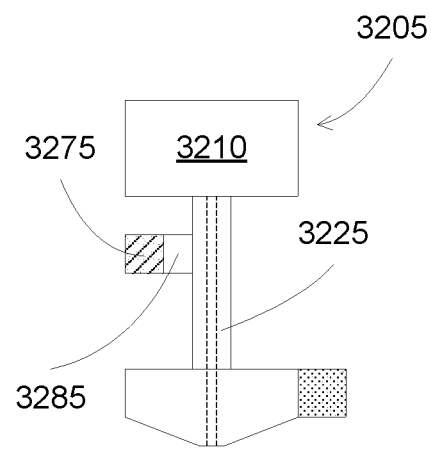

FIG. 32F shows a printhead assembly 3205, in which a thermal isolation or support element 3225 is used between the delivery assembly 310 and the printhead 330. The element 3225 can be small, covering only a portion of the delivery assembly and the printhead areas. An agitation mechanism 3275 can be coupled to the element 3285, and can transfer the vibration energy to the printhead through the element 3225.

In some embodiments, the present invention discloses methods to form 3D printer, e.g., printhead assemblies, having agitation (or vibration) mechanism (or assembly). The agitation mechanism can include a piezo element, e.g., an element having materials exhibiting piezo electric effect. Other agitation elements can be used, such as motor having offset center. The agitation mechanism can have megasonic frequencies (e.g., above 2 MHz) or ultrasonic frequencies (e.g., between 20 kHz and 2 MHz). Other frequency ranges can also be used, such as acoustic frequencies (e.g., between 20 Hz and 20 kHz).

The agitation mechanism can be coupled directly to the printhead, e.g., connecting to a surface of the printhead, to transmit vibration energy to the printhead. The agitation mechanism can be coupled to the printhead through a coupling element, e.g., separating from a surface of the printhead, to reduce or prevent heating the agitation mechanism. The coupling element can be used for guiding vibration energy to selected areas of the printhead, for example, to the nozzle of the printhead. Optional vibration damping elements can be provided to isolate the agitation mechanism from other parts of the printhead assembly, for example, preventing vibrating the delivery assembly.

In some embodiments, a controller can be provided to control the characteristics of the agitation mechanism, such as controlling the vibration amplitudes, vibration frequencies, and/or duration of the vibration. For example, the agitation mechanism can be continuous, e.g., during the printing, or can be intermittent, vibrating only when necessary.

FIGS. 33A-33B illustrate flow charts for forming a 3D printhead assembly according to some embodiments. In FIG. 33A, operation 3300 couples an agitation assembly to a 3D printhead. The agitation assembly is operable to agitate the printhead or a printing material in the printhead. A controller can also be coupled to the agitation mechanism.

In FIG. 33B, a printhead assembly can be formed, including a printhead for printing a printing material on a platform, a delivery assembly for deliver the printing material to the printhead, together with an agitation assembly for vibrating the printhead or a printing material in the printhead. Optional controllers can also be included.

Operation 3320 forms a delivery assembly for a printhead assembly. The delivery assembly can include a motor to drive a filament, or a motor to drive a piston to push a paste-like material to a printhead. Other delivery assembly can be included, such as a powder delivery system to be used with powder printing materials.

Operation 3330 forms a printhead coupled to the delivery assembly, e.g., the printhead is configured to accept a printing material supplied by the delivery assembly. The printhead can include a nozzle for extruding molten materials, e.g., on a platform or on a previously extruded layer or line, to form a printed object. The nozzle can be a straight nozzle, e.g., perpendicular to the platform, to allow printing vertical surface, such as a wall perpendicular to a horizontal platform. The nozzle can be a tilted nozzle, e.g., forming an angle with the platform, to allow printing non-vertical surface.

Operation 3340 forms an agitation assembly coupled to the printhead. The agitation assembly is operable to agitate the printhead or the printing material in the printhead. The agitation assembly can be coupled directly to the printhead, or can be separated from the printhead by a coupling element.

In some embodiments, the printhead can be heated, e.g., a heater can be provided to heat the printhead to a temperature sufficient to soften or melt the printing material. If the agitation assembly is heat sensitive, such as the case of piezo materials, a thermal isolation element can be provided between the agitation element and the heated surface of the printhead. The thermal isolation element can be used as a vibration wave guide.

In some embodiments, the present invention discloses methods to print 3D structures using agitation (or vibration) energy. The vibration energy can be supplied continuously or intermittently to the printhead or to the printing material in the printhead. The vibration energy can reduce surface tension of the molten printing material, smoothing the surface of the printed object, together with potentially improve the adhesion of the new material with the existing material in the printed object. The parameters of the vibration energy, e.g., frequency, amplitude, on-off, etc., can be adjusted to achieve a desired objective.

FIGS. 34A-34B illustrate flow charts for operating 3D printer assemblies according to some embodiments. In FIG. 34A, operation 3400 agitates a printing material in a printhead for printing a 3D structure. The agitation can be continuous, e.g., during the printing process. The agitation can be intermittent or controllable, e.g., the printing material is agitated only when needed, for example, when a smooth printed surface is desired.

In FIG. 34B, operation 3420 supplies a material to a printhead. For example, a filament or a stream of paste-like material can be delivered to a printhead from a delivery assembly. The printhead can be heated, for example, by a heater disposed in or near the printhead. A thermal isolation element can be disposed between the heated printhead and the delivery assembly, for example, to prevent damage to the delivery assembly by the heater. Operation 3430 agitates the material in the printhead. Alternatively, operation 3430 can turn on an agitation assembly. Thus the agitation can be achieved by turning on the agitation assembly, such as a piezo element. The amplitude and frequency of the agitation can also be controlled to achieve a desired objective, such as a smooth printed surface, a better adhesion of the printed layer, or a reduced clogging of the nozzle in the printhead. The agitation assembly can be coupled to the printhead through a coupling element, such as a thermal isolation element or a wave guide element. Operation 3440 prints the agitated material on a platform.

In some embodiments, the present invention discloses 3D printer systems and methods that can in-situ process the printed material. The systems can include a radiation source coupled to a print head. In a linear xyz printer system, the print head can move in a vertical z direction, e.g., up and down from the support table. The support table can move in horizontal x and y directions. Thus multiple xy plane layers can be formed on each other in the z direction to form the 3D printed object. In some embodiments, the printed material can be processed by the radiation source, for example, when the material leaves the printhead or when the material is deposited on the substrate. In some embodiments, the substrate can be processed by the radiation source, for example, to heat up the substrate at the printing location of the printhead.

In some embodiments, the printhead, such as a displacement piston type delivery, can be integrated with a radiation source, such as a light source, which can be mounted near the tip of the nozzle of the printhead. The light source can deliver light having wavelengths between 300 and 900 nm, for example, between 400 and 600 nm.

In some embodiments, the radiation source can include an infrared (IR) light source, which can be configured to heat up the surface of the substrate, for example, to promote adhesion between the new printed filament and the substrate mass. The substrate mass can be a previously printed material. The substrate mass can be an existing object, operable as a platform for printing new materials. The IR source configured to heat the substrate at printing location can make practical to add a print object to the surface of an existing block of plastic.

In some embodiments, the IR heat source can be configured to cure the printed material, e.g., changing the property of the printed material, such as hardening a soft material once the material has left the printhead nozzle. The hardening process can allow for printing taller built objects, e.g., without temporary support structures.

In some embodiments, the radiation source can include an ultraviolet (UV) light source, which can be configured to change a property of the printed material, for example, to cross link a polymer material or to cause a material that is being dispensed to cure rapidly. For example, a soft material can be printed and then cross linked once the material has left the printhead nozzle to assist in solidifying the material.

In some embodiments, a print head can include an extrusion head having a heater for heating the extruded material that is supplied to the extrusion head. A radiation source can be coupled to the extrusion head, providing radiation on the substrate, such as the existing material on the support table. A heater can be couple to the support table 230 for heating the table surface.

Figures 35A, 35B, 35C, 35D:
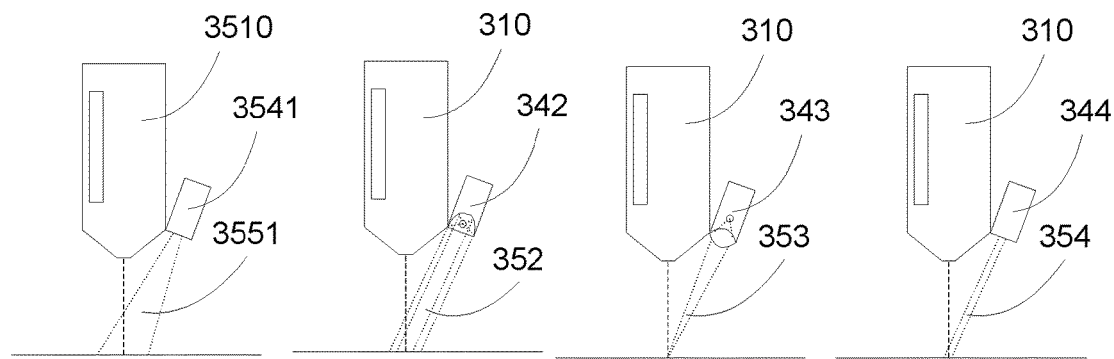
FIGS. 35A-35D illustrate different radiation sources according to some embodiments.

FIGS. 35A-35D illustrate different radiation sources according to some embodiments. A print head 3510 can have a radiation source 3541 providing a diffuse radiation beam 3551 to the support platform (FIG. 35A). For example, a point source can be used to irradiate a large area of the substrate. The print head can have a radiation source 3542 providing a parallel beam 3552 to the support platform (FIG. 35B). For example, a point source with a parabola mirror can be used to form parallel beam of radiation. The print head can have a radiation source 3543 providing a focused beam 3553 to the support platform (FIG. 35C). For example, a point source with a focusing lens can be used to focus the radiation to a small area on the substrate. The print head can have a radiation source 3544 providing a small parallel beam 3554 to the support platform (FIG. 35D). For example, a laser source can be used to irradiating a small area on the substrate.

In some embodiments, the present invention discloses a printhead having a radiation source coupled to the printhead, e.g., the radiation source is operable to move with the printhead, so that the radiation source can irradiate an area on the substrate that the printhead is to be printed on, or the radiation source can irradiate on the material leaving the printhead. The irradiation source can be a single source, or multiple sources surrounding the printhead. In some embodiments, a mechanism can be provided to adjust the location, or the focus of the radiation beam.

Figures 36A, 36B:
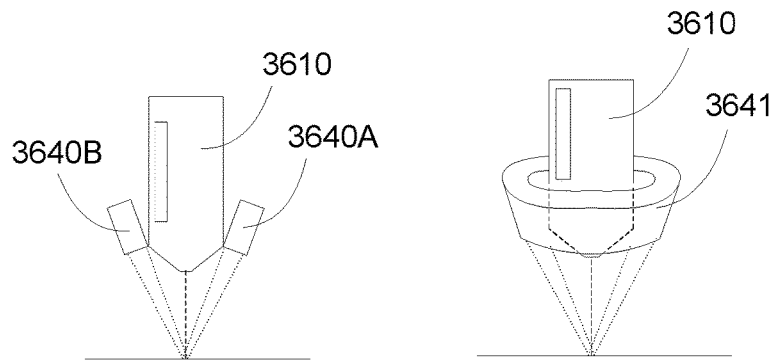
FIGS. 36A-36B illustrate different radiation sources according to some embodiments.

FIGS. 36A-36B illustrate different radiation sources according to some embodiments. In FIG. 36A, multiple radiation sources 3640A/3640B can be coupled to printhead 3610. The multiple radiation sources 3640A/3640B can be configured to irradiate a same area on the substrate, such as focused beam, parallel beam, or diffuse beam. The radiation sources can include visible light source, IR light source, UV light source, or laser light source.

In FIG. 36B, a ring of radiation source 3641 can be coupled to the printhead 3610. The radiation ring 3641 can be configured to provide irradiation at the built zone, e.g., the area on the substrate that the printhead is ready to print a material, or to the material that just leaves the printhead. In some embodiments, the radiation ring can include multiple discrete radiation sources, such as light emitting diodes (LEDs) arranged in a configuration surrounded the printhead. The multiple discrete radiation sources can be configured to provide a light beam to an area on the substrate. In some embodiments, the radiation ring can include one or more continuous radiation sources, such as a ring of fluorescence tube arranged in a configuration surrounded the printhead. The continuous radiation sources can be configured to provide a light beam to an area on the substrate, for example, through mirrors and lenses.

In some embodiments, the present invention discloses a print head having a radiation source that is operable to heat a local area of the substrate. For example, the radiation source can irradiate, e.g., heating, an area between 2× and 100×, such as between 2× and 50C, or 2× and 10× the area dimension of the printed filament printed from the printhead. The radiation source can irradiate an area greater than 100 microns and less than a few millimeters, such as less than 10 mm, or less than 5 mm, or less than 2 mm, or less than 1 mm in one lateral dimension.

The radiation source can also be configured to heat only a surface portion of the substrate. For example, the radiation source can be operable to heat between 10 and 40% of a previously printed layer. The radiation source can be operable to heat a depth greater than 100 microns and less than a few millimeters of the substrate, such as less than 10 mm, or less than 5 mm, or less than 2 mm, or less than 1 mm in substrate thickness.

Figures 37A, 37B:
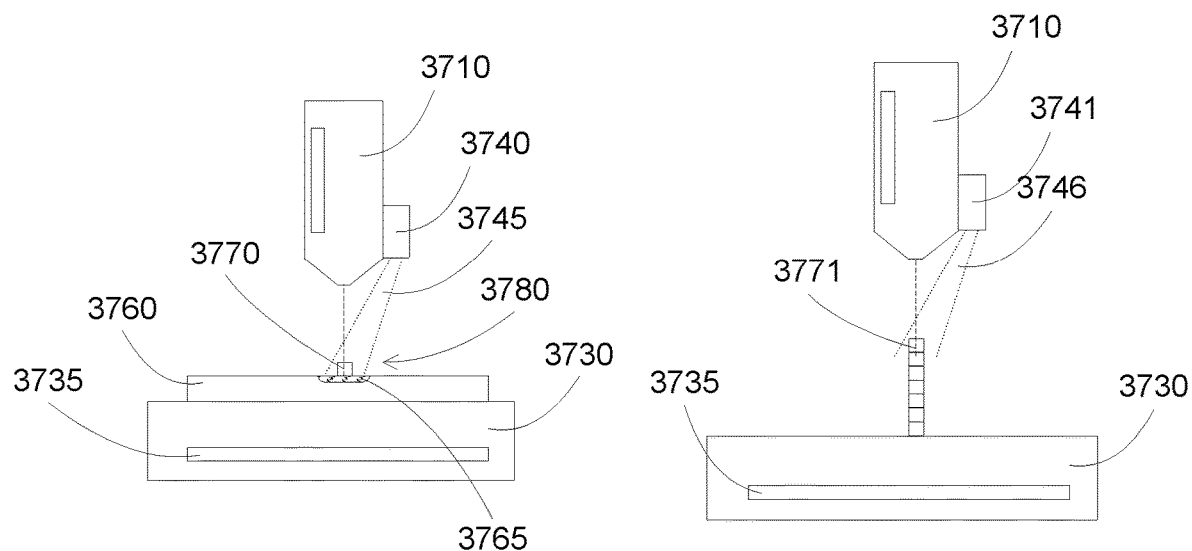
FIGS. 37A-37B illustrate a printing process of printhead having a radiation source according to some embodiments.

FIGS. 37A-37B illustrate a printing process of printhead having a radiation source according to some embodiments. In FIG. 37A, a radiation source can be configured to heat the surface of the object, for example, to improve the adhesion with the newly printed material. The integration of the radiation source can accelerate print times, for example, by starting with an existing object, such as a block or plate of plastic substrate, which is mass produced. The printhead then can print on the existing object, thus the print time can be significantly reduced, for example, by the time it takes to print the mass-produced existing object.

In some embodiments, the radiation source can be a radiant heat source, which is located on the moving printhead in such a way as to focus the heat in the area that is about to be fused. The heated substrate can increase the penetration of the bond between the substrate and the freshly deposited material.

The local and surface heating of the substrate can improve the adhesion between the deposit material with the substrate. For example, without heating the substrate, dispensing hot material, e.g., plastic, on top of a block of cold plastic, the hot plastic can be cooled by the mass of the cold block, reducing adhesion. In some embodiments, locally and surfacely heating the substrate surface can improve bonding strength, for example, up to 100×, and can make it practical to print custom features on otherwise standard size substrates or objects.

The heat source can be an IR heater. Other heaters can also be used, such as a laser. The head source can be an IR focusable heat source attached to print head in such a way as to allow local zone heating in the area that is about to have fresh material deposited.

A radiation source, such as an IR light source 3740, can be coupled to a printhead 3710 to provide IR radiation 3745 on a surface area 3780 of an object 3760. The object 3760 can be placed on a platform 3730, which can be heated be a heater 3735. The object 3760 can be an object brought in from outside, or can be an object that the printhead has just printed.

The radiation source 3740 can be operable to heat up a local and surface area 3765 of the object 3760. The heating of the local surface area 565 can improve an adhesion of the newly printed material 3770 with the existing object 3760. For example, the local surface heating process can allow printing of additional structures on an existing object with adequate adhesion. The radiation source can be configured to heat the local surface area to a temperature that can provide good adhesion with a newly printed material, such as close to the melting temperature of the object material (or even higher than the melting temperature), or around (e.g., slightly lower or higher) a softening temperature of the object material. Since the heating is localized, e.g., in both lateral and depth dimensions, the high temperature heating does not affect the structure integrity of the object.

In FIG. 37B, a radiation source can be configured to process the printed material, for example, to solidify or to strengthen the printed material. The integration of the radiation source can improve structure integrity of printed soft material such as soft polymers, for example, by rapidly curing the material as the material is being deposited. The integration of a radiation source configured to immediately cure the printed material can allow printing tall 3D structures, such as overhangs or tilted beams. Without the immediately cured radiation source, long cure times (e.g., >10 seconds) can be required, which can result in the lower uncured layers not able to support the new layers being dispensed.

In some embodiments, the present invention discloses new materials, e.g., soft light activated materials such as UV curable silicone, which can be printed and simultaneously accelerate the fixing process.

A radiation source, such as an IR or UV light source 3741, can be coupled to a printhead 3710 to provide IR or UV radiation 3746 on a printed material leaving the printhead 3710 and disposed on a substrate.

The radiation source 3741 can be operable to cure or cross link the printed material 3771. The curing or cross linking of the printed material 3771 can improve a structural integrity of the newly printed material 3771, allowing taller structures or other structures without temporary supports. For example, the material leaving the printhead, or the material disposed on the substrate surface can be irradiated to strengthen a hardness of the material. The radiation source can be configured to heat the material, or to stimulate a chemical reaction, e.g., cross linking a polymer material, to improve a property of the printed material.

In some embodiments, the radiation source is configured to be movable, such as moving around the print head to change the location of the area to be irradiated. A controller can be used to control the intensity and/or frequency of the radiation, allowing optimizations of the surface treatment or the treatment of the printed material.

In some embodiments, the present invention discloses an integrated printhead having an attached radiation source, such as a light source. The radiation source can be used to create or relieve stress in the printed material.

FIGS. 38A-38C illustrate flow charts for forming print heads having a radiation source according to some embodiments. In FIG. 38A, operation 3800 couples a radiation source to a 3D printhead. The radiation source can be configured to supply radiation to a local area on a substrate.

In FIG. 38B, operation 3820 couples a radiation source to a 3D printhead. The radiation source can include an IR light or a laser. The radiation source can be configured to heat a substrate locally and on the surface.

In FIG. 38C, operation 3840 couples a radiation source to a 3D printhead, wherein the radiation source comprises an UV light. The radiation source is configured to vary a structure of a material which leaves the 3D printhead to be disposed on a substrate surface.

FIGS. 39A-39B illustrate flow charts for forming print heads having a radiation source according to some embodiments. In FIG. 39A, operation 3900 couples a radiation source to a 3D printhead. The radiation source can be configured to supply radiation to a surface of the substrate. The radiation source can surround a nozzle of the 3D printhead. The radiation can be operable to heat a local area of the substrate. The radiation can be operable to heat a top surface portion of the substrate. The radiation can be configured to provide a focused, diffused or parallel beam to a surface area of the substrate where the 3D printhead supplies a printing material. The radiation source can include a laser. The radiation source can include an IR lamp.

In FIG. 39B, operation 3930 couples a radiation source to a 3D printhead. The radiation source can be configured to supply radiation to a surface of the substrate or to a material leaving a nozzle of the 3D printhead or to a material deposited on the substrate from the 3D printhead. The radiation source can surround a nozzle of the 3D printhead. The radiation can be operable to heat a local area of the substrate. The radiation can be operable to cross link the material leaving or deposited on the substrate from the nozzle of the 3D printhead. The radiation source can include a UV lamp.

FIGS. 40A-40C illustrate flow charts for operating print heads having a radiation source according to some embodiments. In FIG. 40A, operation 4000 irradiates a surface of a substrate. The radiation can be configured to be confined to a local area. The radiation can be configured to heat a top portion of the surface. Operation 4010 3D prints a material on the irradiated surface. The irradiated surface can be configured to enhance an adhesion of the material.

In FIG. 40B, operation 4040 prints a first layer of a first material on a substrate. Operation 4050 locally and surfacely irradiates the first layer while or before or after 3D printing a second material on the first layer. The first and second materials have different melting temperature.

In FIG. 40C, operation 4070 provides an object on a substrate. Operation 4080 locally and surfacely irradiates a surface of the object while or before or after 3D printing a material on the object. The material is adhered to the heated surface of the object.

FIGS. 41A-41B illustrate flow charts for operating print heads having a radiation source according to some embodiments. In FIG. 41A, operation 4100 irradiates a printed material with a UV light. The radiation can be configured to solidify or cross link the printed material.

In FIG. 41B, operation 4120 3D prints a material on substrate. Operation 4130 irradiates the material with a UV light. The radiation can be configured to solidify or cross link the printed material. The radiation can be provided to the material after being disposed on the substrate or to the material at the nozzle output.

In some embodiments, the present invention discloses modular printheads for a printer system. The modular printheads can have different configurations, operations, functionalities, and characteristics. For example, different printheads can be configured with different color printing materials.

Figure 42A:
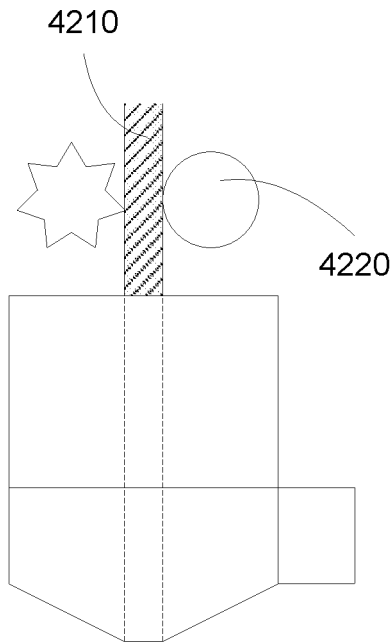
FIGS. 42A-42D illustrate different printheads according to some embodiments.
Figure 42B:
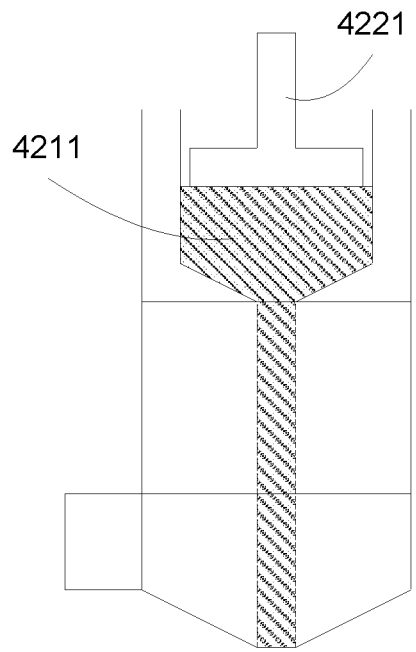
Figure 42C:
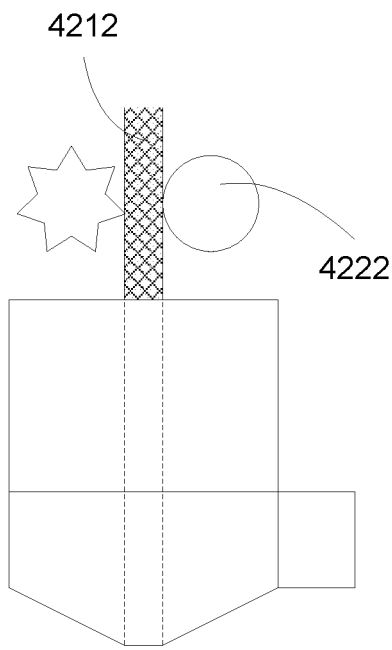
Figure 42D:
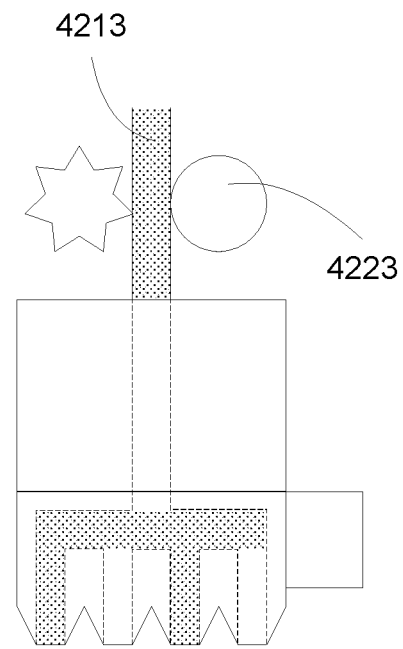

FIGS. 42A-42D illustrate different printheads according to some embodiments. FIG. 42A shows a printhead together with a worm gear 4220 for accepting a filament 4210. FIG. 42B shows a printhead together with a piston 4221 for delivering a paste-like material 4211. FIG. 42C shows a printhead together with a worm gear 4222 for accepting a different filament 4212. FIG. 42D shows a multiple nozzle printhead together with a worm gear 4223 for accepting a filament 4213. The multiple nozzle printhead can print multiple lines at a same time from the multiple nozzle configurations. The multiple nozzle configurations can provide fast printing of layers, either by filling printing or by hollow printing.

In some embodiments, the printhead can include a mixer. For example, multiple filaments can be inputted to the printhead with one outlet, mixing the filament inputs. Filaments with different properties, such as color, can be mixed together to form a new material. For example, one input can be a base plastic filament, and one input can be a die injection control for changing the color of the output material. The die injection control can be another plastic filament with color designed to be combined with the base plastic filament. The die injection control can include liquid, paste or solid die, designed to be mixed with the base plastic filament to achieve a desired color.

Other properties can be mixed. For example, one input can be a base plastic filament, and one input can be a particle injection control for adding particles to the output material.

Figure 43A:
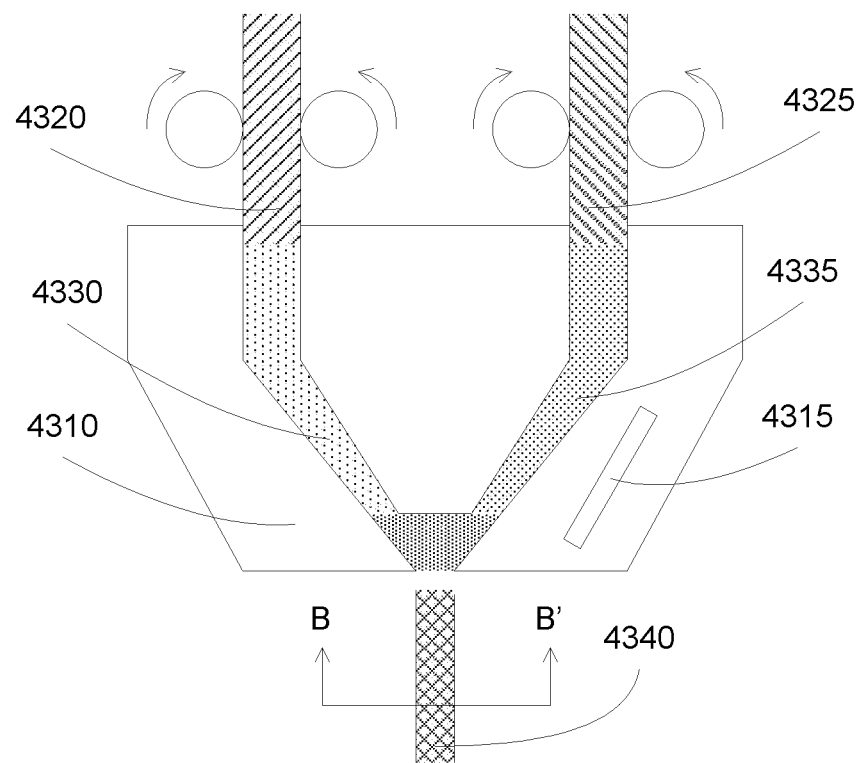
FIGS. 43A-43B illustrate a printhead having multiple inputs and one mixed output according to some embodiments.
Figure 43B:
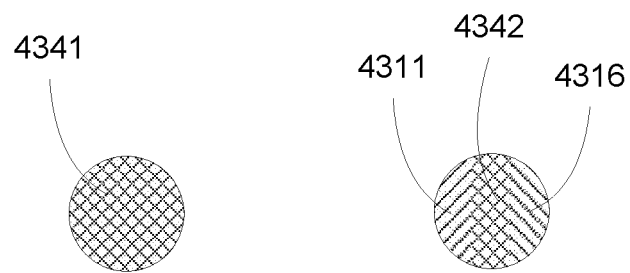

FIGS. 43A-43B illustrate a printhead having multiple inputs and one mixed output according to some embodiments. In FIG. 43A, a printhead 4310 can include a heater 4315 for heating the material delivered to the printhead. Printing materials, such as plastic filaments 4320/4325, can be driven into the printhead by rotating gear mechanisms. At the heated printhead 4310, the plastic filaments 4320/4325 can be melted to become molten plastics 4330/4335. The molten plastics 4330/4335 can be mixed and then driven out of the printhead, for example, through a nozzle at the end of the printhead. The mixed material 4340, out of the printhead, can be deposited on a heated platform.

As shown, the multiple inputs are solid filaments 4320/4325. Other configurations can be used, such as one solid filament and one liquid, paste, powder, or particle input. In addition, more than two inputs can be used.

FIG. 43B shows various cross sections BB' of the printed material 4340. The material 4340 can be a well mixed 4341 of the multiple inputs. The material 4340 can include a center mixed portion 4342 between minimum mixed inputs 4311 and 4316. Other mixed configurations can be used, such as multiple mixed portions. For example, a four material print head that has 4 independent feed motors, and one output can be used for mixing materials and getting on-the-fly color control. A dye injection system can be used as the inputs for the printhead for color control.

In some embodiments, the mixing chamber of the printhead can be rotated. The nozzle of the printhead can be disposed on a rotary bearing and can spin as the material is deposited on the platform. The spinning chamber can improve the mixing of the multiple input materials. For example, the spinning chamber can create spiral thread of fully mixed, partially mixed, or non-mixed materials. Further, the spinning chamber can allow mechanical integration of non-mixable materials, such as a fiber thread inside a fused material. The spinning chamber can also allow co-extrusion, generating multiple stripes of different materials that would not interact chemically with each other. This can create materials that can stretch and contract. For example, piezo materials, such as pvdf, can be used to create micro sensors that are embedded in the built plastic part.

FIGS. 44A-44C illustrate a printhead having a spinning mixer according to some embodiments. In FIG. 44A, a printhead 4410 can include a heater 4415 for heating the material delivered to the printhead. Printing materials, such as plastic filaments 4420/4425, can be driven into the printhead by rotating gear mechanisms. At the heated printhead 4410, the plastic filaments 4420/4425 can be melted to become molten plastics 4430/4435. The molten plastics 4430/4435 can be mixed in a rotating mixer 4450, which can be rotated 4455. The mixed material is then driven out of the printhead, for example, through a nozzle at the end of the printhead. The mixed material 4440, out of the printhead, can be deposited on a heated platform.

As shown, the multiple inputs are solid filaments 4420/4425. Other configurations can be used, such as one solid filament and one liquid, paste, powder, or particle input. Other types of filaments can be used, such as fiber filaments. In addition, more than two inputs can be used.

FIG. 44B shows an output material 4440 that can be twisted from the rotating mixer 4450. The input feeding rates and the spinning rate can be configured to form twisted output. In some embodiments, the output material can be a smooth columnar filament, e.g., without the twisted configuration.

FIG. 44C shows various cross sections CC' of the printed material 4440. The material 4440 can include a well mixed 4441 of the multiple inputs. The material 4440 can include a center mixed portion 4442 between minimum mixed inputs 4411 and 4416. The material 4440 can include unmixed inputs 4412 and 4417. Other mixed configurations can be used, such as multiple mixed portions.

In some embodiments, the present invention discloses a printhead having a rotatable mixing portion for mixing multiple inputs. The rotating mixer can improve the mixing of the multiple inputs. The rotating mixer can provide twisted or braided output material, with different degrees of mixing between the multiple inputs. For example, each input can form a strand of the twisted output, with minimum or no mixing between the strands. Each input can also form a strand of the twisted output, with an outer portion of the strand mixed with a neighbor strand. The rotating mixer can integrate multiple inputs that are not mixable, for example, through twisting or braiding the multiple inputs to form multiple strands of the output material.

FIGS. 45A-45B illustrate flow charts for printer systems having a rotatable mixer according to some embodiments. In FIG. 45A, a printer system can accept multiple inputs and rotatably mix the inputs, either forming a well mixed output or a twisted/braided output with individual strands. Operation 4500 supplies multiple materials to a rotatable portion of a 3D printhead. Operation 4510 rotates the rotatable portion to mix or twist the multiple materials together. Operation 4520 prints, by the 3D printhead, the mixed or twisted materials on a platform.

In FIG. 45B, at least one input material has a different property than the other input materials. For example, the different property can include color property, allowing generating different color output, or allowing generating strands having different colors of a twisted or braided output. The different properties can include strength, hardness, compression, or tension. Operation 4540 mixes or twists multiple materials, wherein at least two materials of the multiple materials have a different property, wherein the different property comprises at least one of color, strength, hardness, or melting temperature. Operation 4550 prints, by the 3D printhead, the mixed or twisted materials on a platform.

In some embodiments, the non-mixable materials can be integrated together, for example, by twisting, braiding, or simply putting the materials together.

FIGS. 46A-46C illustrate a printhead having a spinning mixer according to some embodiments. In FIG. 46A, a printhead 4610 can include a heater 4615 for heating the material delivered to the printhead. Printing materials, such as plastic filaments 4620/4625, can be driven into the printhead by rotating gear mechanisms. At the heated printhead 1810, the plastic filaments 4620/4625 can be melted to become molten plastics 4630/4635. The molten plastics 4630/4635 can be mixed in a rotating mixer 4650, which can be rotated 4655. Another input 4670 can be provided to a middle of the mixer 4650, which can stay at a center of the output material 4640 with the molten plastics 4630/4635 spinning around.

The mixed material is then driven out of the printhead, for example, through a nozzle at the end of the printhead. The mixed material 4640, out of the printhead, can be deposited on a heated platform. The mixed material 4640 can include a mixed material, e.g., twisted or braided materials, surrounding a center material.

As shown, the multiple inputs are solid mixable filaments 4620/4625 surrounding a non-mixable filament 4670 such as fiber filament. Other configurations can be used, such as one solid filament and one liquid, paste, powder, or particle input. Other types of filaments can be used, such as metal or fiber filaments. In addition, more than two inputs can be used.

FIG. 46B shows a cross section of an output material 4640 that can be twisted from the rotating mixer 4650. A center filament 4670, such as a fiber filament, can be surrounded by twisted filaments to form composite output 4640. In some embodiments, the output material can be a smooth columnar filament, e.g., without the twisted configuration.

FIG. 46C shows various cross sections CC' of the printed material 4640. The material 4640 can include a well mixed 4641 of the multiple inputs surrounding a center non-mixable portion 4670. The material 4640 can be include a center mixed portion 4642 between minimum mixed inputs 4611 and 4616, surrounding a center non-mixable portion.

The material 4640 can be include unmixed inputs 4612/4617 and 4613/4618, surrounding a center non-mixable portion. Other mixed configurations can be used, such as multiple mixed portions.

In some embodiments, the present invention discloses a printhead having a rotatable mixing portion for mixing multiple inputs, with at least an input is not mixable with at least another input. The rotating mixer can provide twisted or braided output material, with different degrees of mixing between the mixable inputs and with a non-mixable integrated within. For example, the non-mixable input can be positioned at a center portion, with the mixable inputs forming strands of the twisted output, with mixing or no mixing between the strands.

Figure 47A:
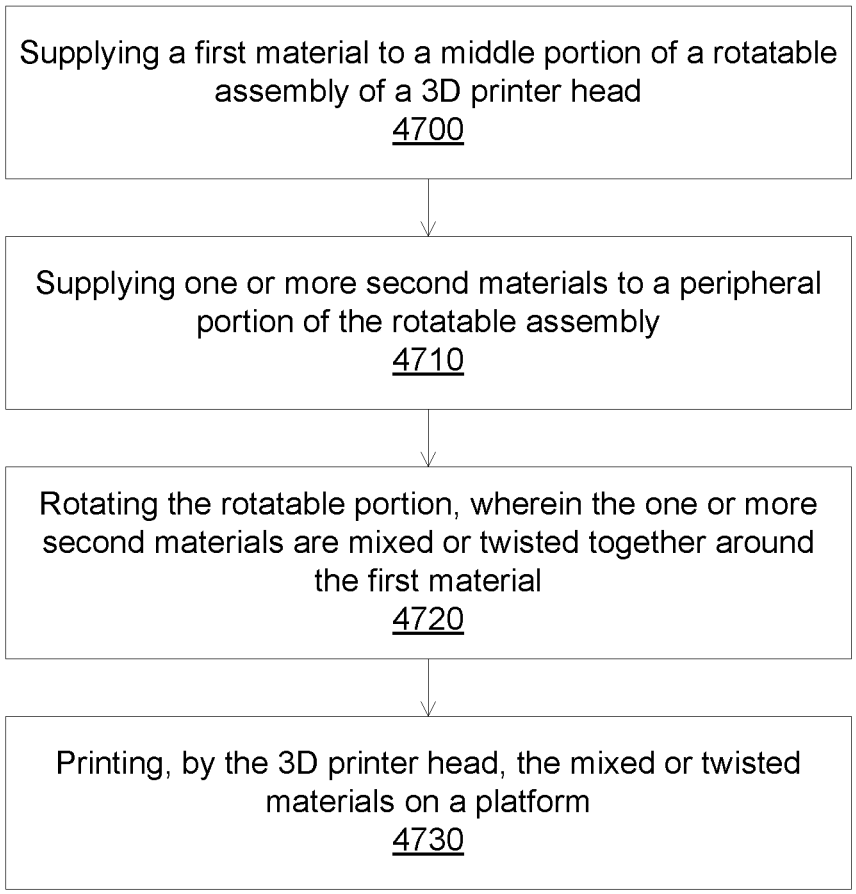
FIGS. 47A-47B illustrate flow charts for printer systems having a rotatable mixer according to some embodiments.
Figure 47B:
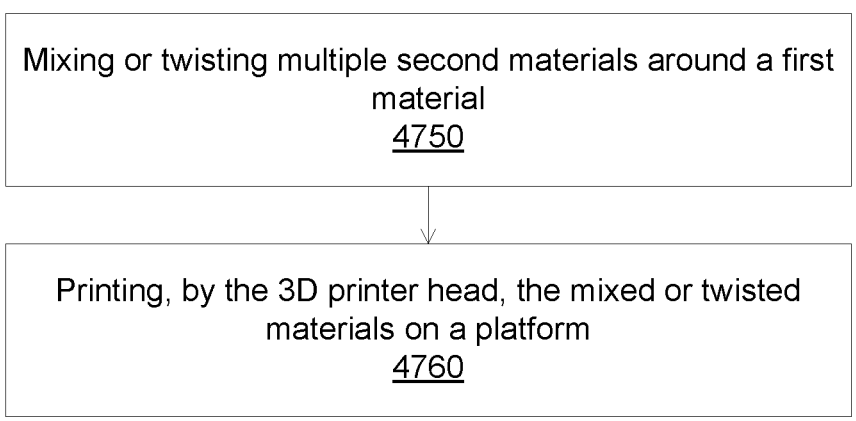

FIGS. 47A-47B illustrate flow charts for printer systems having a rotatable mixer according to some embodiments. In FIG. 47A, a printer system can accept an input at a middle portion of a printhead and one or more inputs at a peripheral portion of the printhead. Operation 4700 supplies a first material to a middle portion of a rotatable assembly of a 3D printhead. The first material can be a non-mixable material, such as a fiber filament. Operation 4710 supplies one or more second materials to a peripheral portion of the rotatable assembly. The second materials can be mixable with each other, and non-mixable with the first material. Operation 4720 rotates the rotatable portion, wherein the one or more second materials are mixed or twisted together around the first material. Operation 4730 prints, by the 3D printhead, the mixed or twisted materials on a platform.

In FIG. 47B, one or more second materials can be twisted or braided around a first material. Operation 4750 mixes or twists multiple second materials around a first material. Operation 4760 prints, by the 3D printhead, the mixed or twisted materials on a platform.

In some embodiments, different materials can be printed with different print head configurations. Solid materials can be extruded from a heated extrusion chamber. Paste materials can be extruded from a squeeze chamber. Liquid materials can be delivered by a liquid pump such as a peristaltic pump.

FIGS. 48A-48C illustrate different print heads according to some embodiments. In FIG. 48A, a solid material 4820 in the form of a wire can be provided to a print head 4810. The print head can be heated, for example, by a heater 4815. The melted or softened material can be extruded out of the print head to be delivered on a support surface, such as a support table or a previously printer surface.

In FIG. 48B, paste material 4830 can be provided to a print head 4812. A plunger 4850 can be used to extrude the material out of the print head. Optional heater 4815 can be used to heat the paste material. In FIG. 48C, liquid material 4842 can be provided to a print head. A peristaltic liquid pump 4840 can be used to deliver the liquid material. For example, a rotatable mechanism 4846 can be used to squeeze delivering tube 4844, to move the liquid from a reservoir to the nozzle 4817. The peristaltic pump can prevent contamination of the printed material, and can allow the use of different materials for printing without being contaminated by the pump.

Figure 49:
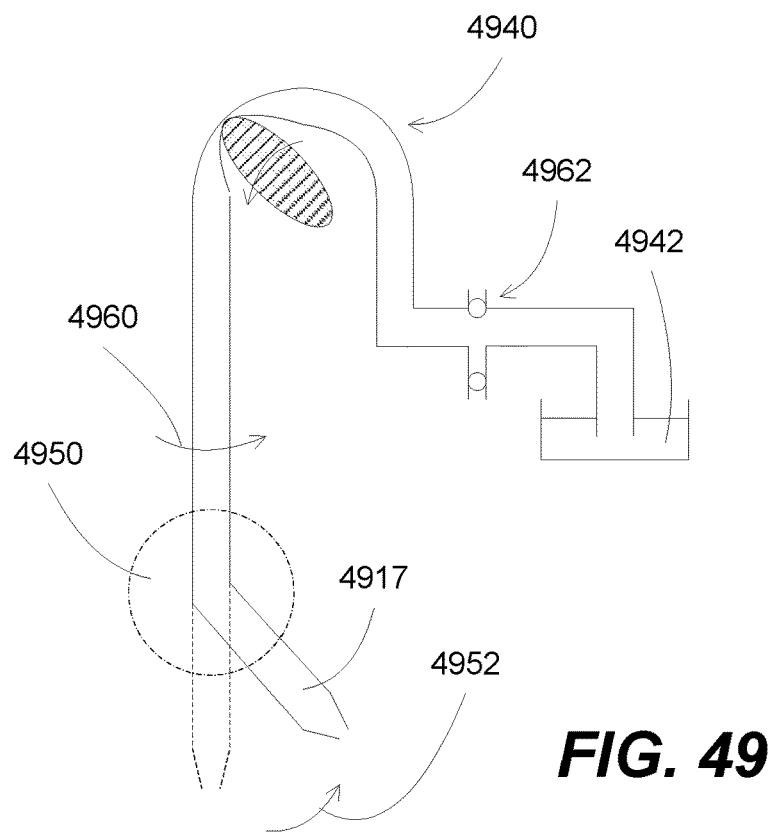
FIG. 49 illustrates a peristaltic print head according to some embodiments.

FIG. 49 illustrates a peristaltic print head according to some embodiments. A peristaltic pump 4940 can deliver a liquid material 4942 from a reservoir to a nozzle 4917. A mechanism 4950 can be configured to change 4952 the tilted angle of the nozzle 4917, forming a print head having a tilted nozzle. Another mechanism 4960 can be configured to rotate the nozzle 4917. For example, the peristaltic pump 4940 can be rotated through a rotatable seal 4962. In some embodiments, a solidify mechanism, such as a cooler, can be coupled to the print head to solidify the liquid material. The liquid material can be in a paste form, and when delivered on a cold substrate, can be further solidify into solid form.

Figure 50:
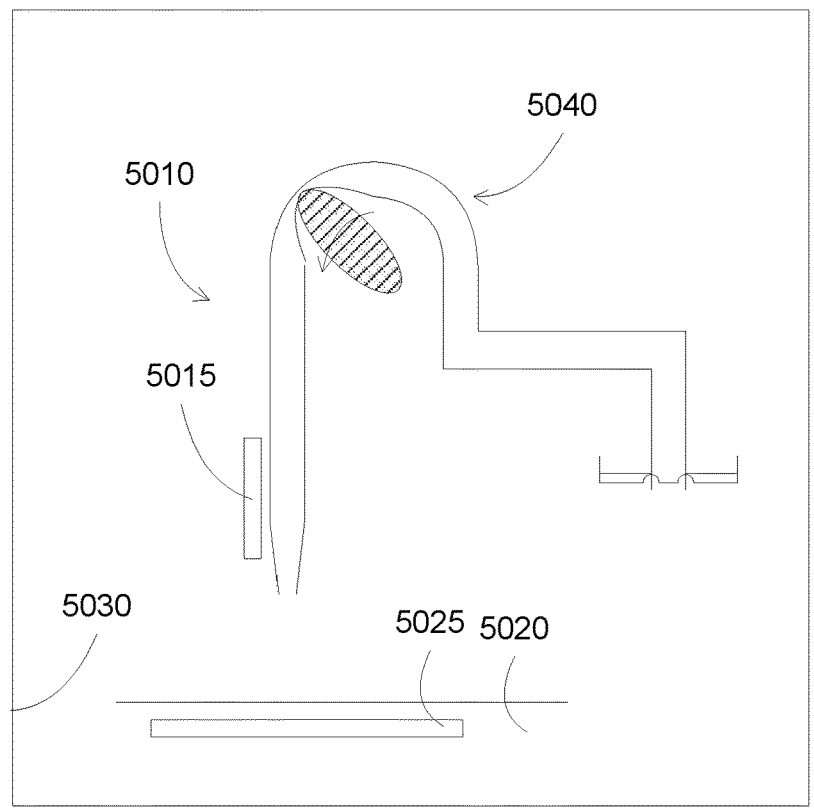
FIG. 50 illustrates a printing system using a peristaltic pump according to some embodiments.

FIG. 50 illustrates a printing system using a peristaltic pump according to some embodiments. A print head 5010 can include a peristaltic pump 5040 to a nozzle. An optional heater 5015 can be used to regulate the temperature of the liquid. The temperature of the environment of the print head can be regulated to allowing printing liquid materials. For example, a cooling system 5025 can be coupled to a support platform 5020 to keep the delivered materials at a solid state. Further, the print head can be placed in a controlled environment 5030, which can regulate the temperature of the printed materials.

Figure 51A:
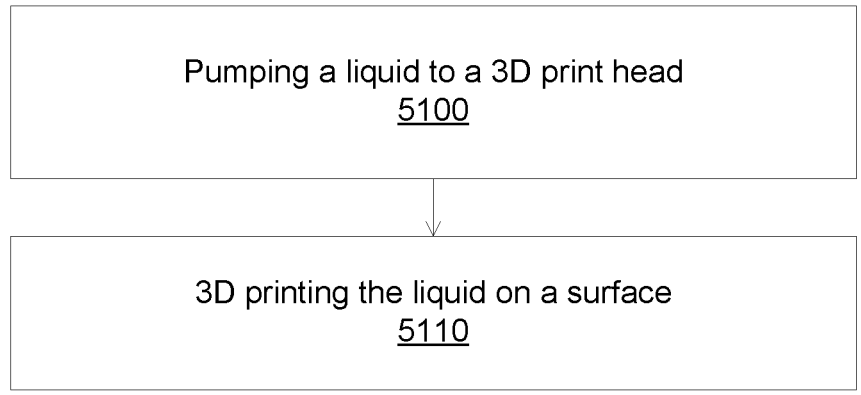
FIGS. 51A-51B illustrate flow charts for printing liquid materials according to some embodiments.
Figure 51B:
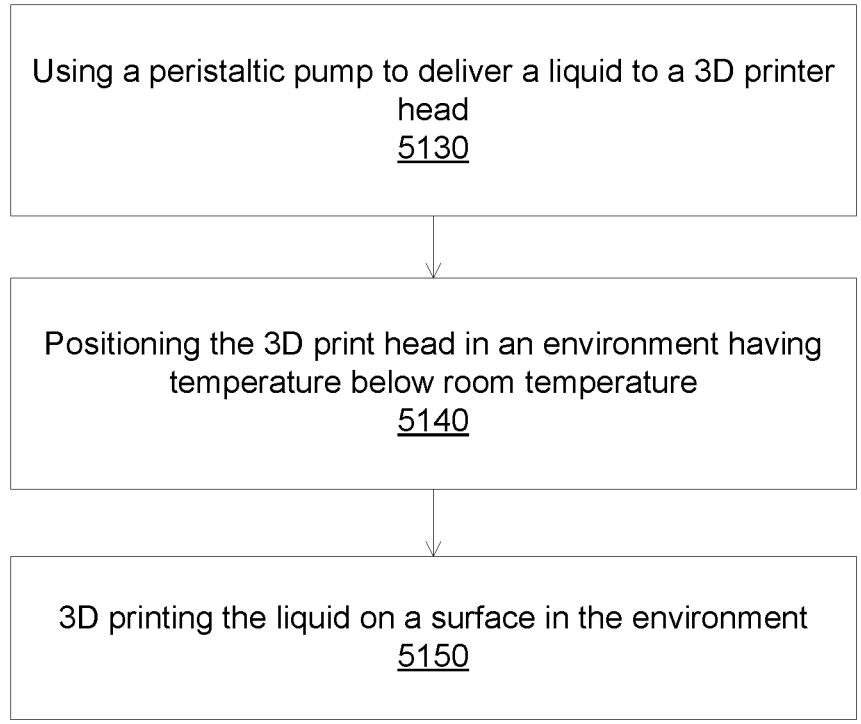

FIGS. 51A-51B illustrate flow charts for printing liquid materials according to some embodiments. In FIG. 51A, operation 5100 pumps a liquid to a 3D print head. Operation 5110 prints the liquid on a surface to form a solid object. The surface and the environment of the printing process can be kept at a temperature to solidify the liquid material.

In FIG. 51B, operation 5130 uses a peristaltic pump to deliver a liquid to a nozzle of a print head. Operation 5140 positions the print head in an environment having a temperature below room temperature. The environment can be configured to solidify the materials delivered from the print head. Operation 5150 prints the liquid on a surface in the environment, such as a cold support surface. The liquid can be partially frozen when leaving the printer nozzle, and further solidify after reaching the support surface.

In some embodiments, a liquid printhead, e.g., a printhead having a liquid pump (such as a peristaltic pump) for delivering a liquid, can be used in conjunction with a non-liquid printhead, e.g., a printhead non configured to deliver a liquid, such as a solid printhead (e.g., a printer hear configured for delivering a soften or melted solid material that can be solidified after leaving the printhead) or a paste printhead (e.g., a printer hear configured for delivering a paste material that can be solidified after leaving the printhead). Two or more printheads can be used in a 3D printing system with at least one printhead being a liquid printhead.

In some embodiments, the liquid printhead can be used to separate the solid layers. For example, two objects can be printed together. The two objects can be prevented from adhering to each other by a layer of liquid in between, such as a layer of lubricant materials, such as an oil layer delivered by a liquid printhead configured to deliver oil. A layer of the first object can be printed, followed by a layer of liquid, such as oil. The liquid layer can printed on a portion of the first layer or on the whole first layer. A layer of the second object can be printed on the liquid layer. The process can be repeated until the two objects are printed.

In some embodiments, the liquid printhead can be used to improve the adhesion of two layers. For example, two layers can be printed with an addition liquid adhesion layer in between to improve the adhesion of these two layers. In some embodiments, a paste printhead can be configured to deliver a layer of lubricant or a layer of adhesion.

Figure 52A:
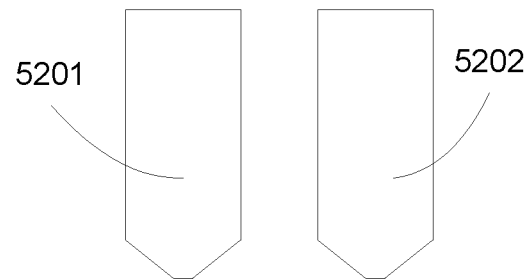
FIGS. 52A-52C illustrate a printing system according to some embodiments.
Figure 52B:
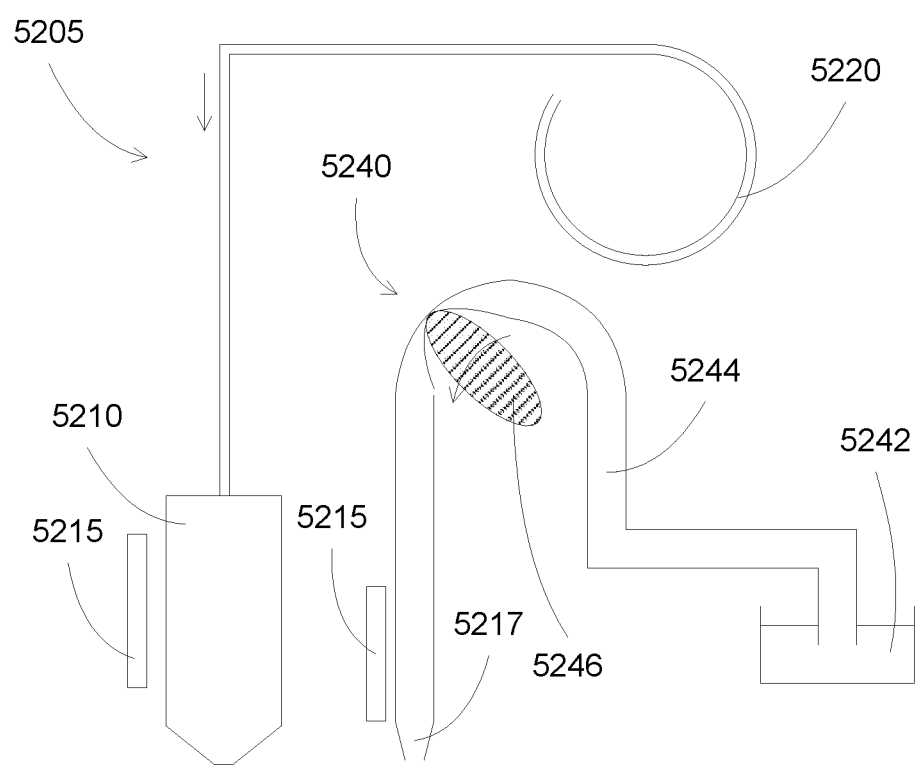
Figure 52C:
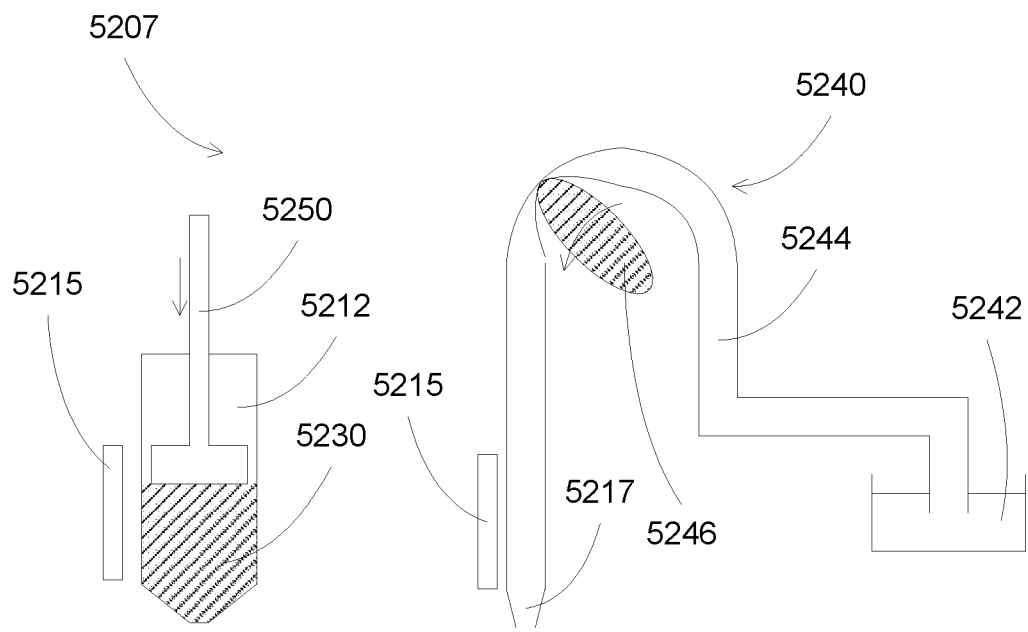

FIGS. 52A-52C illustrate a printing system according to some embodiments. In FIG. 52A, two printheads 5201 and 5202 can be installed in a 3D printing system. In some embodiments, at least one of the printheads is a liquid printhead.

In FIG. 52B, a 3D printing system 5205 can include a solid printhead 5210 and a liquid printhead 5217. In the solid printhead 5210, a solid material 5220 in the form of a wire can be provided to a print head 5210. The print head can be heated, for example, by a heater 5215. The melted or softened material can be extruded out of the print head to be delivered on a support surface, such as a support table or a previously printer surface. In the liquid printhead 5217, a liquid material 5242 can be provided to a nozzle head. A peristaltic liquid pump 5240 can be used to deliver the liquid material. Other liquid pump can also be used. The operation of a peristaltic pump is shown, in which a rotatable mechanism 5246 can be used to squeeze delivering tube 5244, to move the liquid from a reservoir to the nozzle head.

In FIG. 52C, a 3D printing system 5207 can include a paste printhead 5212 and a liquid printhead 5217. In the solid printhead 5212, paste material 5230 can be provided to a print head 5212. A plunger 5250 can be used to extrude the material out of the print head. Optional heater 5215 can be used to heat the paste material. In the liquid printhead 5217, a liquid material 5242 can be provided to a nozzle head. A peristaltic pump is shown, but other liquid pump can be used. Other configurations for a printing system can be used, such as a solid printhead and a paste printhead.

Figure 53:
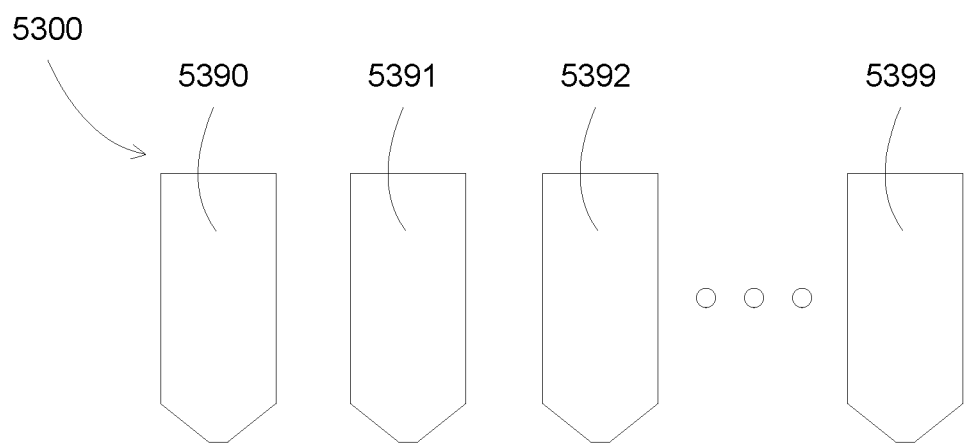
FIG. 53 illustrates a 3D printing system according to some embodiments.

FIG. 53 illustrates a 3D printing system according to some embodiments. A printing system 5300 can include multiple printheads 5390, 5391, 5392, . . . , 5399. In some embodiments, at least one of the printheads is a liquid printhead, which is configured to deliver a liquid layer, such as a lubricant layer or a non-stick layer. In some embodiments, the liquid printhead can be configured to deliver an adhesion layer, such as a glue layer, to bond to adjacent layers. For example, multiple solid or paste printheads can be used with one or more liquid printheads.

In some embodiments, a paste printhead can be used in place of the liquid printhead to deliver a separation layer (such as a lubricant layer), or an adhesion layer (such as a glue layer). In some embodiments, at least one of the printheads is a paste printhead, which is configured to deliver a paste layer, such as a lubricant layer, a non-stick layer, or an adhesion layer. For example, multiple solid or paste printheads can be used with one or more paste printheads.

FIG. 54 illustrates a flow chart for 3D printing according to some embodiments. In operation 5400, a 3D printing system can be provided. The 3D printing system can include a liquid printhead and a non-liquid printhead, e.g., a paste printhead or a solid printhead. Operation 5410 prints a first non-liquid layer, such as a solid layer from the solid printhead or a paste layer from the paste printhead. The non-liquid layer can be solidified, for example, on the support surface. The first layer can be a line, such as a straight line or a curve line, a dot, or a plane, such as a linear plane or a curve plane. Operation 5420 prints a liquid layer over at least a portion of the first layer. The liquid layer can be printed on a portion of the first layer that can provide an added characteristic, such as preventing adhesion or enhancing adhesion. Operation 5430 prints a second non-liquid layer on the liquid layer. The liquid layer can prevent the first and second layers from being stuck together. Alternatively, the liquid layer can enhance the adhesion between the first and second layers. In some embodiments, the second layer can be printed directly on a portion of the first layer, e.g., on the portion of the layer that is not printed with the liquid layer.

In some embodiments, a paste printhead can be used in place of the liquid printhead to deliver a separation layer (such as a lubricant layer), or an adhesion layer (such as a glue layer).

In some embodiments, a mist can be delivered, instead of a liquid or paste layer. A printhead can be configured to deliver a fine mist over a first layer before printing a second layer, to either prevent sticking or to increase adhesion.

In some embodiments, a brush of layer can be delivered, instead of a liquid or paste layer. A printhead can be configured to brush a layer over a first layer before printing a second layer, to either prevent sticking or to increase adhesion.

In some embodiments, the present invention discloses a platform support having a mechanical interface and an electrical interface. The interfaces can be configured to be mated with a platform module, e.g., a platform support can be installed in a platform module with mated mechanical and electrical interfaces. Serial bus, such as CAN bus, can be used for electrical communication between the platform support and the platform module (and also the 3D printer system). The platform support can include information to allow automatic configuration, e.g., the platform support can send information related to the printhead physical characteristics and functionalities, so that a system controller can control the platform support.

The modular system can thus be configured for different job requirements by selecting the platform support suitable for the job. The selection can be performed manually by an operator. In the present specification, the platform support can be shown with or without the interfaces with a platform module. However, it is understood that interfaces are implied, and thus an exchangeable platform support can have both mechanical and electrical interfaces for mating with the platform module.

In some embodiments, the platform supports can be used independently, e.g., without the mechanical and/or electrical interfaces. A platform support can be used in a 3D printer system, e.g., secured to the 3D printer system without the removable interfaces.

In some embodiments, the present invention discloses 3D printer systems and methods that can automatically generate a pattern on a bottom surface of the printed material. The systems can include a platform having a reverse, e.g., negative, image of a pattern. When an object is formed on the platform, the pattern can be transferred, from the platform to the bottom surface of the object.

In some embodiments, the patterned platform can be a support table of a 3D printer system. For example, in a linear xyz printer system, the print head can move in a vertical z direction, e.g., up and down from the support table. The support table can move in horizontal x and y directions. Thus multiple xy plane layers can be formed on each other in the z direction to form the 3D printed object. The bottom surface of the object, since being disposed on the platform, will have the pattern imprinted on it. The transferred pattern can be a reverse image, such as a mirror image of the pattern on the platform. Further, if the pattern on the platform is a recess or depression pattern, the transferred pattern on the object will be a hump or protruded pattern. Similarly, if the pattern on the platform is a hump or protruded pattern, the transferred pattern on the object will be a recess or depression pattern.

In some embodiments, the platform can be a substrate provided to generate a pattern on a printed surface of the object. The substrate can be disposed in any direction, e.g., parallel to the support table or forming an angle with the support table. The substrate can be a temporary substrate, provided only during the formation of the object surface having the pattern. For example, the pattern substrate can have a vertical surface, allowing a pattern transfer on a vertical surface of the object.

The patterned platform can also improve an adhesion of the object to the support table during the printing process, since the pattern can assist in keeping the object in place.

In some embodiments, the thickness of the pattern can be less than the thickness of a printing layer. For example, a printing layer can be 0.1-0.2 mm thick, and the thickness of the pattern, e.g., the depth of a recess pattern or the height of a protruded pattern, can be less than 0.1-0.2 mm, such as 0.05-0.08 mm, or 0.05-0.15 mm. The shallowness of the pattern can allow a formation of watermark pattern on the object, e.g., a pattern having thin impression.

In some embodiments, the first few printed layers of the object can have high thickness, such as less than 1-2 mm or even less than 5 mm thick. The high thickness can allow faster printing of an object, for example, when printing a solid base for the object. The high thickness of the base layers of the object can allow higher depth or height of the pattern, e.g., pattern having less than 5 mm, or less than 1-2 mm thick. In some embodiments, the thickness of the pattern can be higher than the thickness of a printing layer.

Figure 55A:
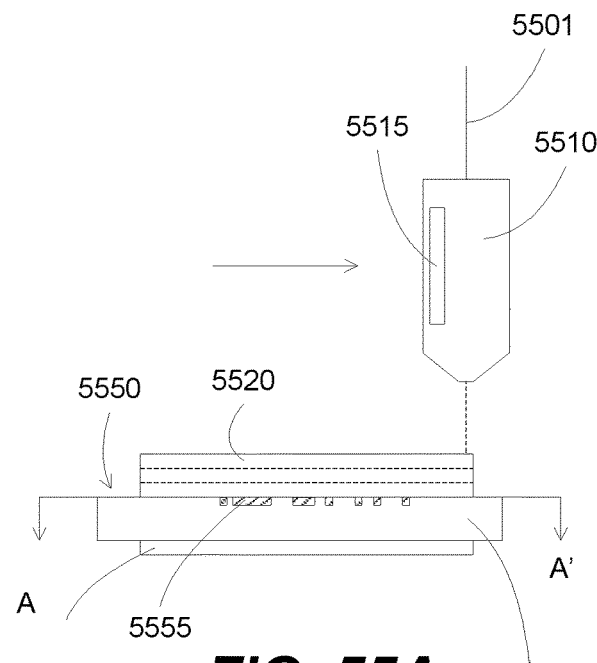
FIGS. 55A-55C illustrate 3D printer systems according to some embodiments.
Figure 55B:
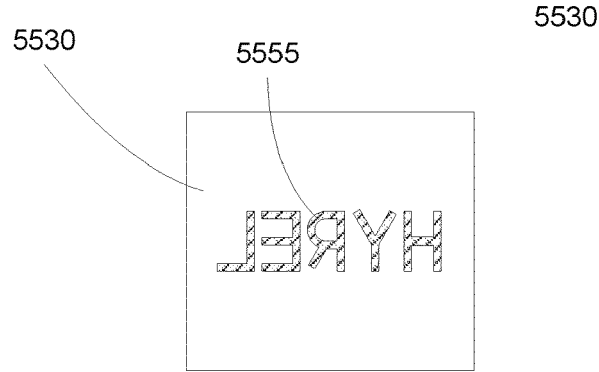
Figure 55C:
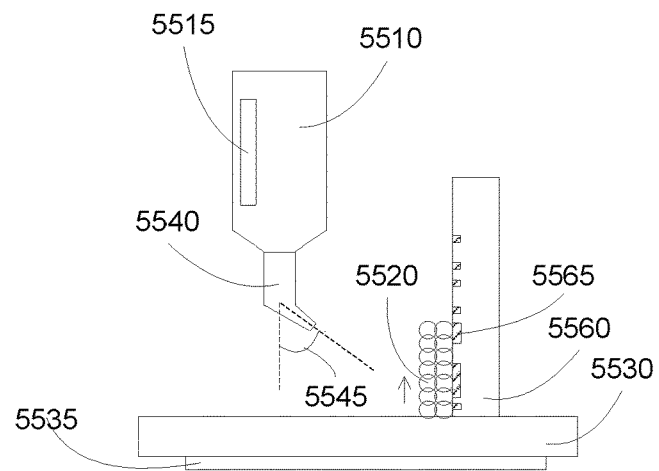

FIGS. 55A-55C illustrate 3D printer systems according to some embodiments. In FIG. 55A, a print head can include an extrusion head 5510 having a heater 5515 for heating the extruded material 5501 that is supplied to the extrusion head 5510. The printhead can print material 5520 on a platform, such as a support table 5530. A heater 5535 can be couple to the support table 5530 for heating the table surface 5550. The platform 5530 can have a pattern 5555, embedded on the surface 5550. As shown, the pattern 5555 is embedded to the platform surface 5550. Other configurations can be used, such as a pattern protruded from the platform surface. FIG. 55B shows a top view of the platform 5530, looking at line AA'. Embedded pattern 5555 can be provided on the surface of the platform 5530.

In FIG. 55C, a print head 5510 can have a tilted nozzle 5540. The tilted nozzle 5540 can form an angle 5545 with the support table 5530. A platform 5560 having pattern 5565 can be provided. The platform 5560 can be placed on the support table 5530, forming a perpendicular angle with the support table. The print head can be moved in a vertical direction to form a vertical wall 5520. For example, a first line can be formed, followed by a second line directly disposed on the first line. The lines can be directly placed on top of each other to form a vertical wall 5520. The vertical wall 5520, since being disposed on the platform 5560, can have the pattern 5565, which is transferred from the platform surface.

As shown, the platform 5560 is perpendicular to the support table and contacts the support table. Other configurations can be used, such as a platform forming an acute angle or an obtuse angle. Further, the platform can be independent to the support table, e.g., having separate support and not coupled with the support table. As shown, a tilted nozzle 5540 is used to print a vertical wall 5520 in contact with a patterned platform 5560, but other configurations can be used, such as a straight nozzle.

Figure 56A:
FIGS. 56A-56B illustrate patterning processes on printed objects according to some embodiments.
Figure 56B:

FIGS. 56A-56B illustrate patterning processes on printed objects according to some embodiments. In FIG. 56A, a recess pattern 5651 can be embedded on a surface 5650 of a platform 5630. The recess pattern 5651 can include recesses or indentations on the surface 5650 to form a negative image of the pattern. When a first layer 5620 is printed on the pattern surface 5650, some material can fill the recesses of the recess pattern 5651, forming dimples 5661 on a top surface of the first layer 5620. In some embodiments, the recess depth is less than the thickness of the printed line 5621, so subsequent layers 5620 can smooth out the dimples. The filling of the recesses in the recess pattern 5651 can prevent the object from movement in a lateral direction, thus improve an adhesion of the printed object with the platform 5630. The filling of the recess pattern can transfer the pattern from the platform to the object, forming a protruded image.

In FIG. 56B, a protruded pattern 5656 can be imposed on a surface 5655 of a platform 5635. The protruded pattern 5656 can include protrusions or humps on the surface 5655 to form a negative image of the pattern. When a first layer 5625 is printed on the pattern surface 5655, some material can avoid the protrusions of the protruded pattern 5656, forming protrusion 5666 on a top surface of the printed line 5625. In some embodiments, the protrusion height is less than the thickness of the printed line, so subsequent layers 5626 can smooth out the irregularities. The protrusions in the protruded pattern 5656 can prevent the object from movement in a lateral direction, thus improve an adhesion of the printed object with the platform 5635. The printing on the protruded pattern can transfer the pattern from the platform to the object, forming a recess image.

In some embodiments, the present invention discloses a printer system having a patterned platform. The patterned platform can automatically provide a pattern on a surface on the printed objects. The patterned platform can provide a watermark on the printed objects, e.g., a shallow image. The platform can have a pattern directly applied on a surface. Alternatively, a platform can include a pattern layer on a top surface.

Figure 57A:
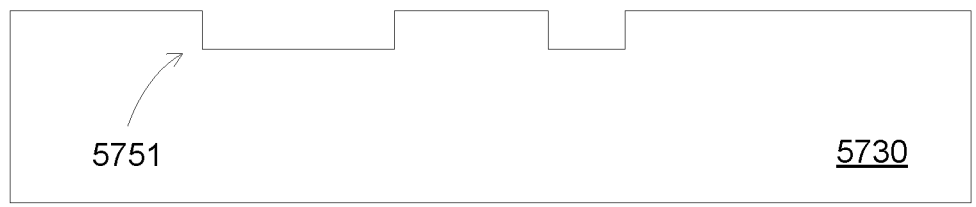
FIGS. 57A-57D illustrate patterned platforms according to some embodiments.
Figure 57B:
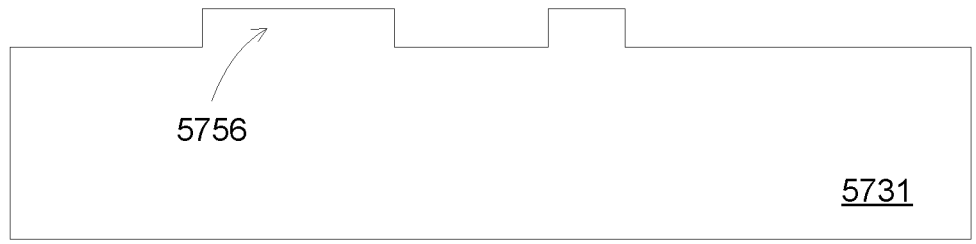

FIGS. 57A-57D illustrate patterned platforms according to some embodiments. In FIG. 57A, a recess pattern 5751 can be formed directly on a surface of a platform 5730. In FIG. 57B, a protruded pattern 5756 can be formed directly on a surface of a platform 5731.

Figure 57C:
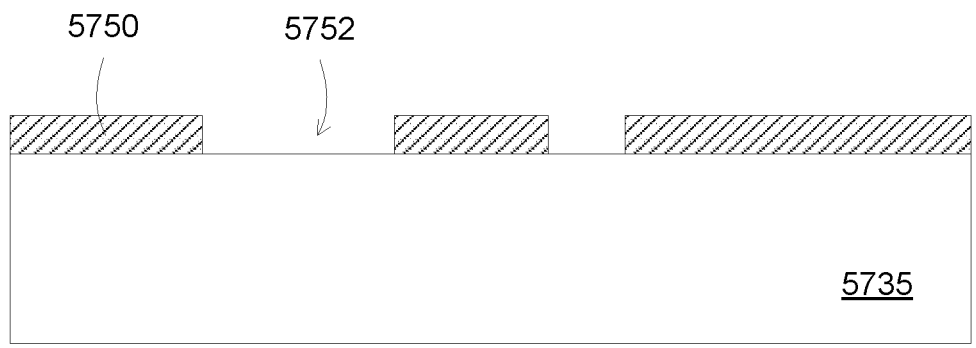
Figure 57D:
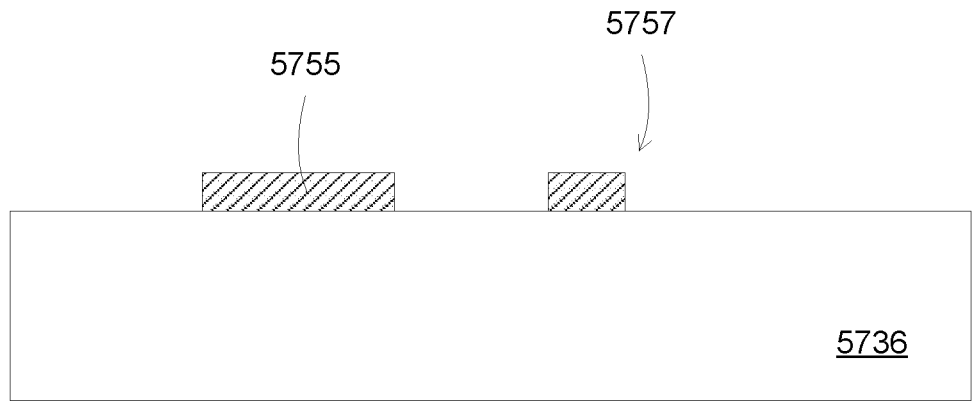

In some embodiments, a pattern can be provided in a layer, which is applied on a surface of a platform. The layer can provide a control for the depth or height of the pattern, e.g., the pattern is limited by the thickness of the layer. FIG. 57C shows a recess pattern 5752 on a layer 5750, which is deposited on a platform 5735. FIG. 57D shows a protruded pattern 5757 on a layer 5755, which is deposited on a platform 5736.

Figure 58A:
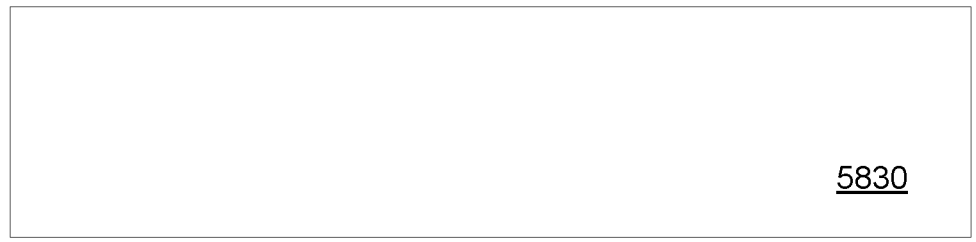
FIGS. 58A-58E illustrate a process of forming a recess pattern on a layer on a platform according to some embodiments.
Figure 58B:
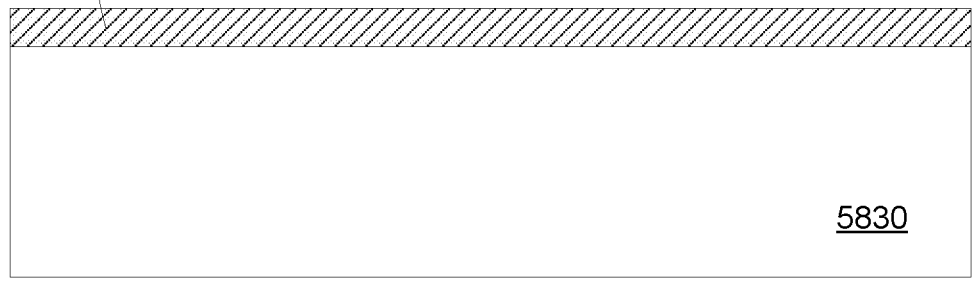
Figure 58C:
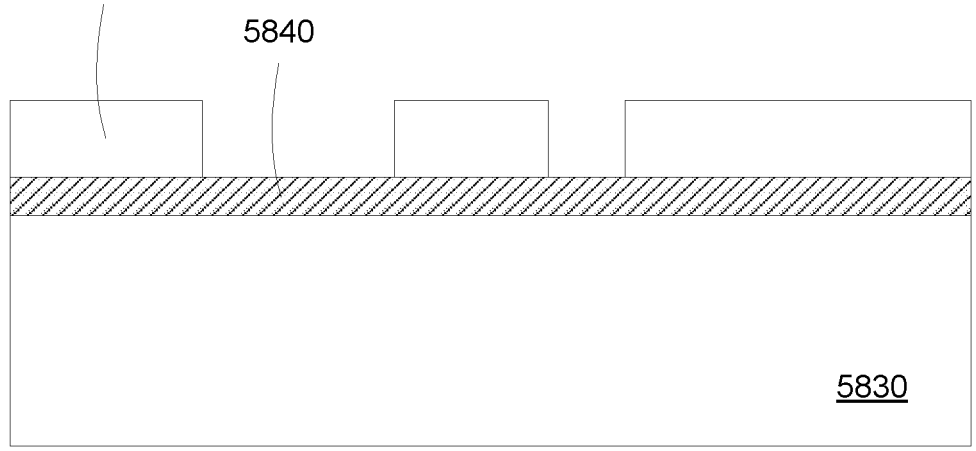

FIGS. 58A-58E illustrate a process of forming a recess pattern on a layer on a platform according to some embodiments. In FIG. 58A, a substrate 5830, which is configured to be a platform for a 3D printer system, can be provided. The substrate can be a high thermal conductive material. For example, the substrate 5830 can be an aluminum plate having thickness less than 10 mm, such as less than 5 mm, or about 3 mm. In FIG. 58B, a layer 5840 can be formed on the substrate 5830. The layer 5840 can be a high thermal conductive material. For example, the layer 5840 can be a copper layer having thickness of less than 2 mm, such as less than 0.5 mm, or less than 0.2 mm, or less than 0.1 mm, such as about 0.08 mm. The layer 5840 can be deposited on the substrate 5830. For example, an electroplating process can be used to deposit a copper layer on an aluminum substrate. In FIG. 58C, a pattern layer 5850 can be formed on the copper layer 5840. The pattern layer 5850 can be a photoresist pattern layer, formed by coating a photoresist layer, and then exposing a pattern on the photoresist layer through a mask. The exposed photoresist layer can be removed to form the pattern photoresist layer 5850. The pattern on the photoresist layer can be exposed to a laser writing process. For example, the printhead can be equipped with a laser source, which can run through the top surface of the photoresist layer to form the pattern. Alternatively, other pattern layers can be used. For example, the printhead can print a pattern on the copper layer 5840, using a plastic or polymer material.

Figure 58D:
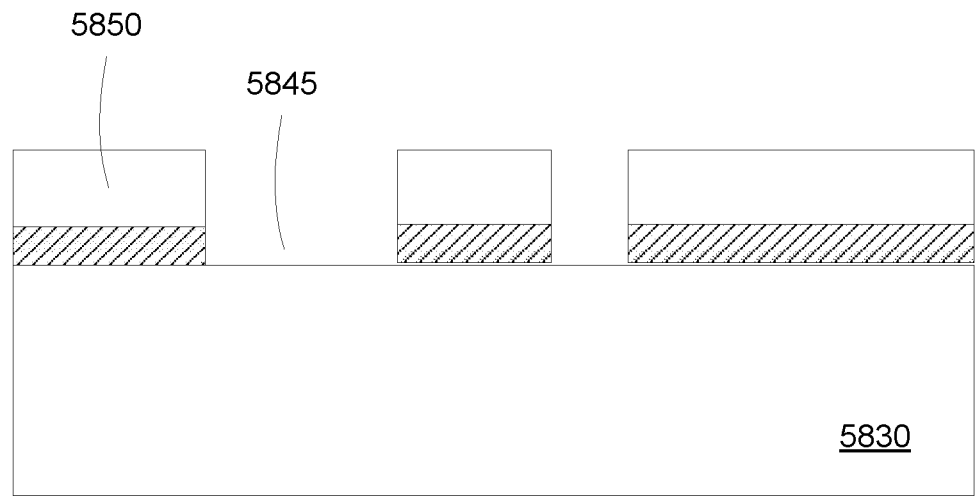
Figure 58E:
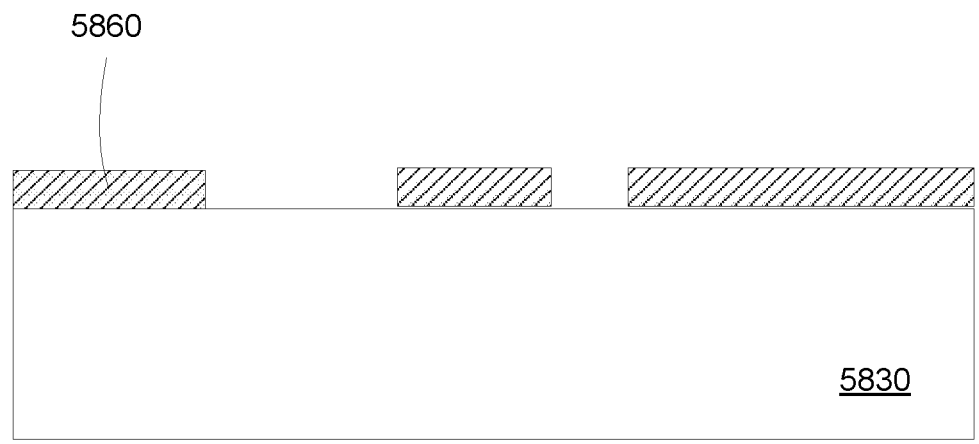

In FIG. 58D, the pattern 5850 can be used to as a mask to etch the copper layer 5840, e.g., removing portions 5845 of the copper layer 5840 that are not protected by the pattern 5850. In FIG. 5E, the layer 5850 is removed, for example, by an oxygen ashing process to remove photoresist, or by cooling the platform to reduce adhesion of the printed plastic pattern, or by heating the platform to melt or vaporize the pattern layer 5850, leaving a pattern copper layer 5860. Other patterning process can be used.

Figure 59A:
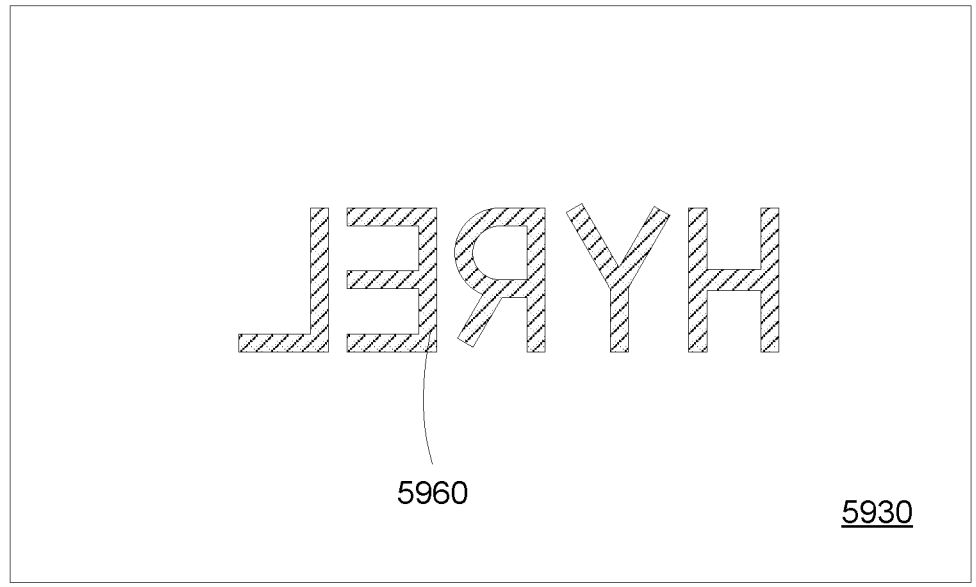
FIGS. 59A-59B illustrate top surfaces of patterned platforms according to some embodiments.
Figure 59B:
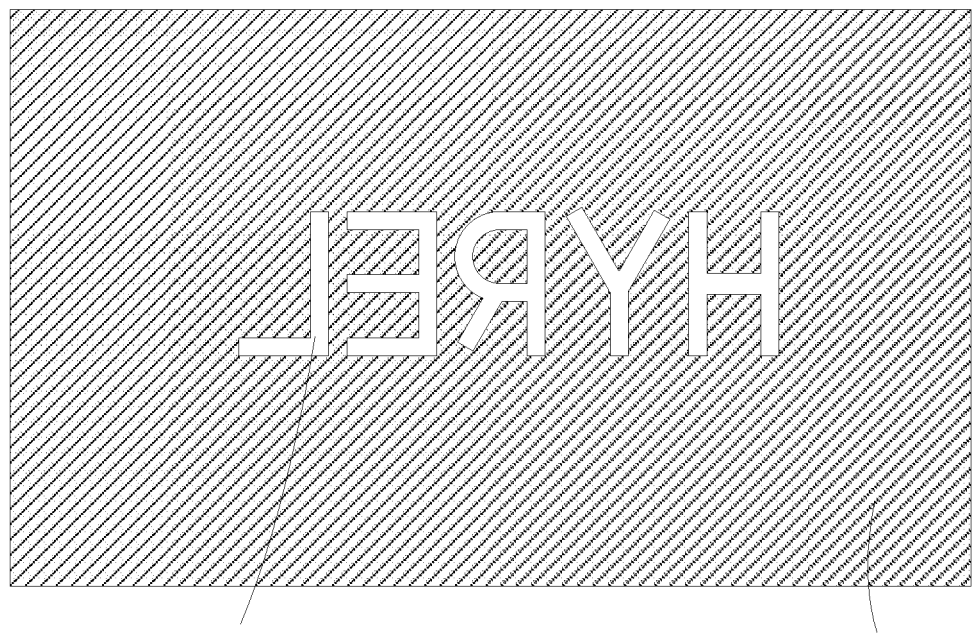

FIGS. 59A-59B illustrate top surfaces of patterned platforms according to some embodiments. In FIG. 59A, negative (e.g., reverse) protruded pattern 5960 can be formed on platform 5930. In FIG. 6B, negative (e.g., reverse) recess pattern 5965 can be formed on platform 5935.

In some embodiments, the present invention discloses a 3D printer system having a patterned platform, such as a pattern support table or a pattern wall or substrate. The patterned platform can be used to create patterns, such as watermarks, on the surfaces of the printed material. The patterned platform can assist in improving adhesion of the object with the platform, for example, reducing or preventing lateral motions of the object relative to the platform.

In some embodiments, a user can prepare the pattern on a coated platform. A platform can be precoated with a thermal conductive layer, such as a copper layer. The user can load the platform to a 3D printer. The 3D printer can print a pattern of the platform, such as a plastic pattern. The platform can be exposed to an etch solution, such as sulfuric acid to etch the copper layer. The pattern then can be removed, such as by cooling the platform to reduce the adhesion of the plastic layer with the platform so that the plastic layer can be removed. Alternatively, another etch solution can be used to etch the plastic layer, such as acetone or a solvent chemical.

In some embodiments, a platform can be precoated with a thermal conductive layer, such as a copper layer, and a photosensitive layer, such as a photoresist layer. The user can load the platform to a 3D printer. The 3D printer can have a laser head, which can expose the photosensitive layer to the laser light. The platform can be exposed to an etch solution, such as sulfuric acid to etch the copper layer. The pattern then can be removed, such as by ashing the photosensitive layer or by etching the photosensitive layer with an etch solution.

FIGS. 60A-60C illustrate flow charts for 3D printer systems having patterned platforms according to some embodiments. In FIG. 60A, operation 6000 patterns a platform to achieve a negative image. Operation 6010 assembles the platform in a 3D printer system, wherein the platform is operable to generate the image on a printed object. For example, the platform has an embedded or protruded image, which can be transferred to the object during the printing process. The depth of the embedded image, or the height of the protruded image, can be less than the dimension of a printed layer, such as less than 1 mm, or less than 0.5 mm, or less than 0.1 mm, such as about 0.78 mm.

In FIG. 60B, operation 6030 coats a layer on a platform. The layer can be a copper layer, having thickness less than 1 mm, or less than 0.5 mm, or less than 0.1 mm, such as about 0.78 mm. The platform can be an aluminum substrate, having thickness less than 10 mm, such as less than 5 mm, or about 3 mm. Operation 6040 patterns the copper layer to achieve a negative image. Operation 6050 assembles the platform in a 3D printer system.

In FIG. 60C, operation 6070 provides a 3D printer having a patterned platform. Operation 6080 3D prints an object on the patterned platform, wherein the patterned platform is configured to imprint an image on the printed object.

In some embodiments, the temperature controlled platform can include a Peltier device, which is a device that can heat or cool a substrate based on the polarity of an applied voltage to the Peltier device. The Peltier heated build platform can provide both heating and cooling capability. During operation, a voltage or current is applied to the Peltier device to heat the platform. When the object is printed, a controller can simply reverse the voltage or current that is applied to the Peltier device. The Peltier device would become cold and that could make the object pop off, assisting in factory automation.

In some embodiments, a voltage having a first polarity is applied to the Peltier device to heat the platform. The printer system can be operable to print an object on the heated platform. The heated platform can assist in improving an adhesion between the printed object and the platform during the printing process. After the printing is completed, a voltage having a reverse polarity is applied to the Peltier device to cool the platform. The cooled platform can reduce the adhesion between the printed object and the cooled platform, allowing removing the printed object from the platform.

Figure 61A:
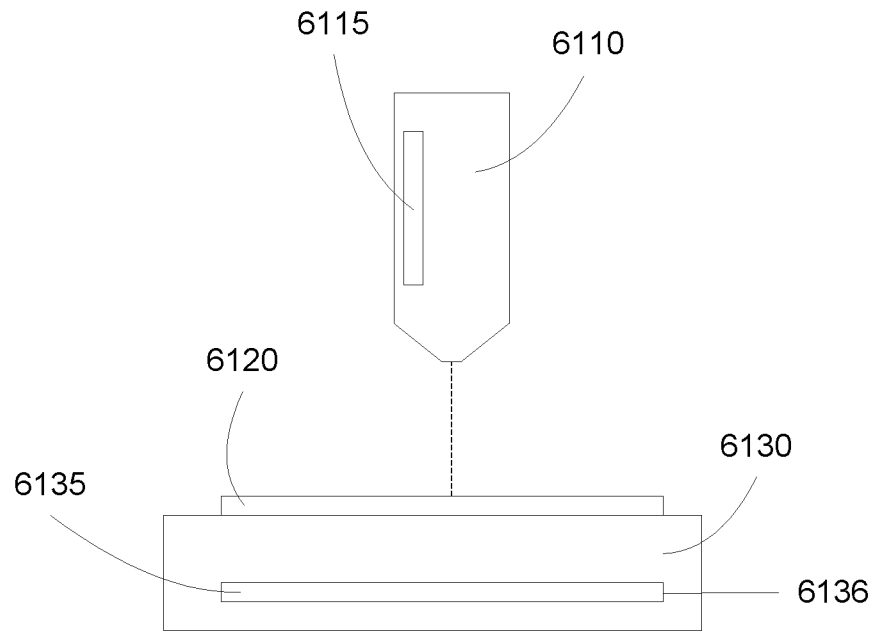
FIGS. 61A-61B illustrate a printing process for a printer having a temperature controlled platform according to some embodiments.
Figure 61B:
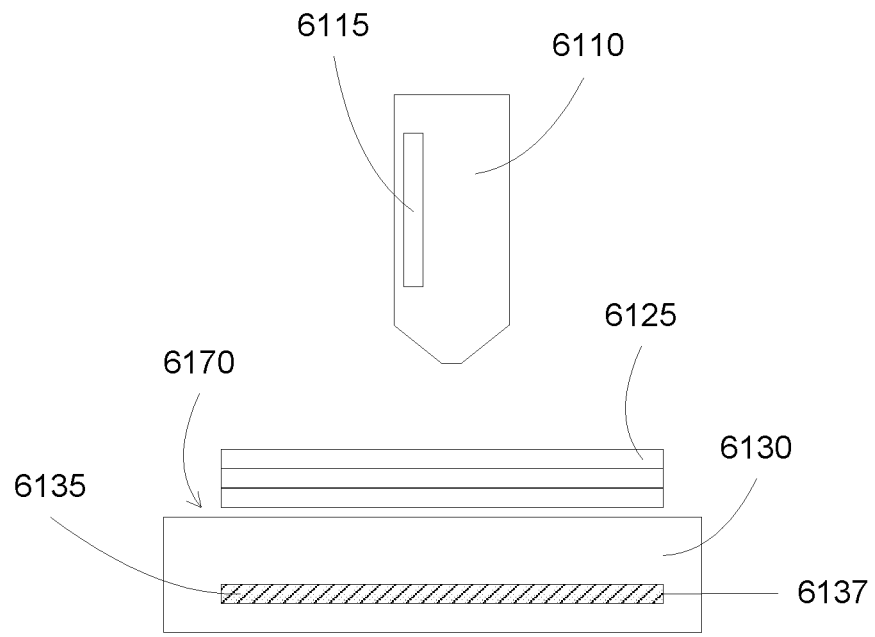

FIGS. 61A-61B illustrate a printing process for a printer having a temperature controlled platform according to some embodiments. In FIG. 61A, a printhead 6110 can include a heater 6115 for heating the material delivered to the printhead. A Peltier device 6135 can accept a voltage having a first polarity 6136 for heating the support platform 6130. After the platform 6130 is heated, the printhead 6110 can start printing object 6120 on the platform. The heated platform can cause the object 6120 to stick to the platform.

In FIG. 61B, the printing process is complete, forming object 6125. The Peltier device 6135 can accept a voltage having a reverse polarity 6137 for cooling the platform 6130. The cooled platform can cause the object 6125 to lose adhesion 6170 between the object and the platform. The reduced adhesion can assist in removing the object from the platform.

In some embodiments, the present invention discloses a platform having a Peltier device to control the temperature of the platform. The Peltier device can provide an easy way to remove a printed object from the platform, for example, by reversing a polarity of the Peltier device.

FIGS. 62A-62B illustrate flow charts for printer systems having a Peltier device platform according to some embodiments. In FIG. 62A, a printer system platform can be incorporated with a Peltier device for controlling the temperature. Operation 6200 couples a Peltier device to a 3D printer platform. The Peltier device can be configured to heat the platform during printing and to cool the platform when printing is completed.

In FIG. 62B, an operation of a printer system can include applying a voltage having a first polarity during printing, and then reverse the polarity for removing the printed object. Operation 6220 applies a voltage having a first polarity to a Peltier device to heat a platform. Operation 6230 prints, by a 3D printhead, an object on the heated platform. Operation 6240 switches polarity of the voltage to cool the platform. The cooled platform can cause the object to lose adhesion with the platform.

What is claimed is:

1. A 3D printer system for printing an object, the 3D printer system comprising
   a printhead module,
      wherein the printhead module comprises at least a first mechanical interface and at least a first electrical interface,
      wherein the at least a first mechanical interface and the at least a first electrical interface are configured to be removably coupled with at least a printhead of two or more printheads,
      wherein the at least a first printhead of the two or more printheads comprises a printing characteristic different from at least a second printhead of the two or more printheads;
   a platform module, wherein the platform module is configured to support a workpiece;
   a motion module, wherein the motion module is configured to move the printhead module relative to the platform module; and
   a controller module,
      wherein the controller module is configured to communicate with the at least a first printhead by recognizing a printing characteristic of the at least a first printhead when the at least a first printhead is installed in the printhead module.

2. A 3D printer system as in claim 1, wherein each of the two or more printheads is configured to be removably and exchangeably installed in the printhead module through the at least a first mechanical interface and the at least a first electrical interface.

3. A 3D printer system as in claim 1, wherein each of the two or more printheads comprises a second mechanical interface and a second electrical interface,
   wherein the second mechanical interface is configured for removably coupling with the at least a first mechanical interface of the printhead module, and
   wherein the second electrical interface is configured for removably coupling with the at least a first electrical interface of the printhead module.

4. A 3D printer system as in claim 1, wherein the at least a first printhead of the two or more printheads is installed in the printhead module, and
   wherein the at least a second printhead of the two or more printheads is not installed in the printhead module.

5. A 3D printer system as in claim 1, wherein at least one of
   the difference in the printing characteristic comprises a difference in printing materials of the at least a first printhead and the at least a second printhead,
   the difference in the printing characteristic comprises a difference in a maximum temperature of the at least a first printhead and the at least a second printhead,
   the difference in the printing characteristic comprises a difference in a configuration of the at least a first printhead and the at least a second printhead, or
   the difference in the printing characteristic comprises a difference in a delivery system configured to deliver a printing material of the at least a first printhead and the at least a second printhead.

6. A 3D printer system as in claim 1,
   wherein the controller module comprises a first characteristic profile for the at least a first printhead of the two or more printheads, and
   wherein at least a characteristic of the first characteristic profile is different from a corresponding characteristic of the second characteristic profile for the at least a second printhead of the two or more printheads.

7. A 3D printer system as in claim 1,
   wherein the controller module comprises a first characteristic profile for the at least a first printhead of the two or more printheads,
   wherein the controller module comprises a second characteristic profile for the at least a second printhead of the two or more printheads, and
   wherein at least a characteristic of the first characteristic profile is different from a corresponding characteristic of the second characteristic profile.

8. A 3D printer system as in claim 1,
   wherein the controller module is configured to communicate with the at least a second printhead by recognizing a printing characteristic of the at least a second printhead when the at least a second printhead is exchanged with an installed printhead in the printhead module.

9. A 3D printer system as in claim 1,
   wherein the mechanical interfaces and the electrical interfaces are integrated.

10. A 3D printer system as in claim 1,
    wherein the at least a first electrical interface comprises a wireless communication for a non-contact electrical connection between an installed printhead of the two or more printheads and the printhead module or the controller.

11. A 3D printer system as in claim 1,
    wherein the at least a first electrical interface is configured to be hot-swappable with the at least a first print head.

12. A 3D printer system as in claim 1, further comprising an electrical alignment circuit coupled to at least one of the printhead module and an installed printhead of the one or more printheads, wherein the electrical alignment circuit is configured to provide an offset distance of the installed printhead configured for the controller to locate locations of the installed printhead.

13. A 3D printer system as in claim 1, further comprising an automatic printhead exchanger mechanism, wherein the automatic printhead exchanger mechanism is configured to automatically exchange an installed printhead of the two or more printheads in the printhead module.

14. A 3D printer system as in claim 1, further comprising two or more workpiece supports,
    wherein the two or more workpiece supports are configured to be exchangeably installed in the platform module,
    wherein at least a first workpiece support of the two or more workpiece supports comprises a characteristic different from at least a second workpiece support of the two or more workpiece supports.

15. A 3D printer system as in claim 1, further comprising two or more workpiece supports,
    wherein the platform module comprises a third electrical interface for removably coupling with a workpiece support of the two or more workpiece supports,
    wherein the two or more workpiece supports are configured to be exchangeably installed in the platform module through the third electrical interface,
    wherein at least a first workpiece support of the two or more workpiece supports comprises a characteristic different from at least a second workpiece support of the two or more workpiece supports.

16. A 3D printer system as in claim 1,
wherein the controller module is coupled to a controlled area network bus (CAN bus),
wherein the CAN bus is coupled to the at least first electrical interfaces;
wherein the controller module is configured to automatically configure an installed printhead through the CAN bus,
wherein the automatic configuration comprises loading printing characteristics of the installed printhead.

17. A 3D printer system as in claim 1,
wherein the controller module is coupled to a controlled area network bus (CAN bus),
wherein each of the two or more printheads comprises a controlled area network (CAN) node for coupling to the CAN bus through the first electrical interfaces for communicating with the controller module,
wherein the CAN node comprises a controller having information related to configurations of the printheads.

18. A 3D printer system as in claim 1,
wherein the controller module is coupled to a controlled area network bus (CAN bus),
wherein the printhead module comprises a controlled area network (CAN) node coupled to the CAN bus for communicate with the controller module.

19. A 3D printer system for printing an object, the 3D printer system comprising
a printhead module,
wherein the printhead module comprises at least a first mechanical interface and at least a first electrical interface,
wherein the at least a first mechanical interface and the at least a first electrical interface are configured to be removably coupled with at least a printhead of two or more printheads through at least a second mechanical interface and at least a second electrical interface of the at least a printhead,
wherein the at least a first printhead of the two or more printheads comprises a printing characteristic different from at least a second printhead of the two or more printheads,
a platform module, wherein the platform module is configured to support a workpiece;
a motion module, wherein the motion module is configured to move the printhead module relative to the platform module;
a controller module,
wherein the controller module comprises a first characteristic profile for the at least a first printhead of the two or more printheads and a second characteristic profile for the at least a second printhead of the two or more printheads,
wherein the first characteristic profile is different from the second characteristic profile,
wherein the controller module is configured to communicate with the at least a first printhead by assessing the first characteristic profile of the at least a first printhead when the at least a first printhead is installed in the printhead module.

20. A 3D printer system for printing an object, the 3D printer system comprising
a printhead module,
wherein the printhead module comprises at least a first mechanical interface and at least a first electrical interface,
wherein the at least a first mechanical interface and the at least a first electrical interface are configured to be removably coupled with at least a printhead of two or more printheads,
wherein the at least a first printhead of the two or more printheads comprises a printing characteristic different from at least a second printhead of the two or more printheads,
a platform module, wherein the platform module is configured to support a workpiece;
a motion module, wherein the motion module is configured to move the printhead module relative to the platform module;
a controller module,
wherein the controller module is coupled to a controlled area network bus (CAN bus),
wherein each of the two or more printheads comprises a controlled area network (CAN) node for coupling to the CAN bus through the at least a first electrical interface,
wherein the controller module is configured to automatically communicate with the at least a first printhead through the CAN bus by recognizing a printing characteristic of the at least a first printhead when the at least a first printhead is installed in the printhead module.

* * * * *